US007058476B2

(12) United States Patent
Takamura et al.

(10) Patent No.: US 7,058,476 B2
(45) Date of Patent: *Jun. 6, 2006

(54) ROBOT APPARATUS, CONTROL METHOD FOR ROBOT APPARATUS, AND TOY FOR ROBOT APPARATUS

(75) Inventors: Seiichi Takamura, Tokyo (JP); Wataru Kokubo, Tokyo (JP); Shingo Tsurumi, Saitama (JP)

(73) Assignee: Sony Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 11/081,540

(22) Filed: Mar. 17, 2005

(65) Prior Publication Data

US 2005/0182519 A1 Aug. 18, 2005

Related U.S. Application Data

(63) Continuation of application No. 10/919,315, filed on Aug. 17, 2004, now Pat. No. 6,952,629.

(30) Foreign Application Priority Data

Aug. 28, 2003 (JP) .............................. 2003-305308

(51) Int. Cl.
*G05B 15/00* (2006.01)
*G05B 19/00* (2006.01)
(52) U.S. Cl. ...................... 700/259; 700/245; 700/246; 700/250; 700/254; 700/257; 700/258; 700/259; 700/260; 700/261; 700/262; 250/208.1; 250/221

(58) Field of Classification Search ................ 700/245, 700/246, 250, 254, 257, 258, 259, 260–262; 715/757; 250/208.1, 221; 345/419; 434/236; 436/1
See application file for complete search history.

(56) References Cited

U.S. PATENT DOCUMENTS 6,438,457 B1 * 8/2002 Yokoo et al. ................ 700/245

(Continued)

OTHER PUBLICATIONS

Aoki et al., An animal psychological approach for personal robot design—Interaction between a rat and ra-robot, 2000, IEEE, p. 365-370.*

(Continued)

*Primary Examiner*—Thomas G. Black
*Assistant Examiner*—McDieunel Marc
(74) *Attorney, Agent, or Firm*—Oblon, Spivak, McClelland, Maier & Neustadt, P.C.

(57) ABSTRACT

A robot apparatus 1 is a four-legged mobile robot, and leg units 3A, 3B, 3C, and 3D are connected to the left and side parts in the front and rear sides of a body unit 2. Ahead unit 4 is connected to the front end of the body unit 2. The head unit 4 has a mouth (jaw) part capable of biting and holding a toy 200 shaped like a bone. The mouth part is constituted by upper and lower jaw parts, and adopts a structure capable of biting and securely holding a bite part 203 of the bone 200. A CPU as a control part executes programs according to an image recognition processing algorithm for recognizing the bone 200, a bone-bite control algorithm for biting the bone, and a bone-bite detection algorithm for detecting the bone.

1 Claim, 44 Drawing Sheets

U.S. PATENT DOCUMENTS

| | | | |
|---|---|---|---|
| 6,449,518 B1 * | 9/2002 | Yokoo et al. | 700/86 |
| 6,708,081 B1 * | 3/2004 | Yoshida | 700/245 |
| 6,773,344 B1 * | 8/2004 | Gabai et al. | 463/1 |
| 6,952,629 B1 * | 10/2005 | Takamura et al. | 700/259 |
| 2004/0153211 A1 | 8/2004 | Kamoto et al. | |
| 2004/0175680 A1 | 9/2004 | Hlavac et al. | |
| 2004/0189702 A1 | 9/2004 | Hlavac et al. | |
| 2004/0210347 A1 | 10/2004 | Sawada et al. | |
| 2004/0211883 A1 | 10/2004 | Imagawa et al. | |

OTHER PUBLICATIONS

Ogata et al., Human-robot communication by physical interaction—Distributed agent control system and the learning algorithm, 1999, IEEE, p. II-1005-II-1010.*

CS.umd.edu, Furby and Pooc-Chi in the News, 2002, Internet, pp. 1-10.

Hayashi et al., Control mechanism of an autonomous jaw-movement simulator, JSN/1C, during open-close movement, 1996, IEEE, pp. 1-2.

* cited by examiner

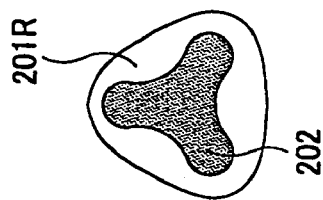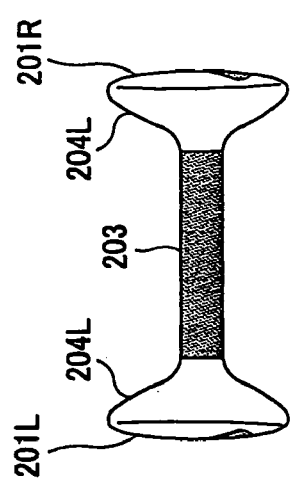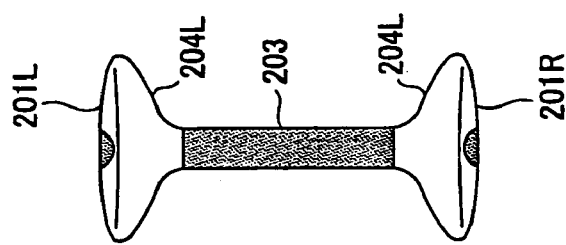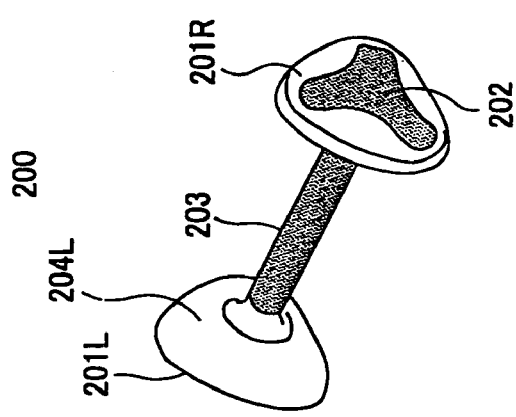

| FIGURE TYPE | CIRCLE | SQUARE | REGULAR TRIANGLE |
|---|---|---|---|
| AREA | $\pi r \times r$ | $r \times r$ | $\sqrt{3}/4 \times r \times r$ |
| BOUNDARY LENGTH | $2\pi r$ | $4r$ | $3r$ |
| CIRCULARITY | 1.0 | $\pi/4 = 0.79$ | $\pi\sqrt{3}/9 = 0.60$ |

FIG.4

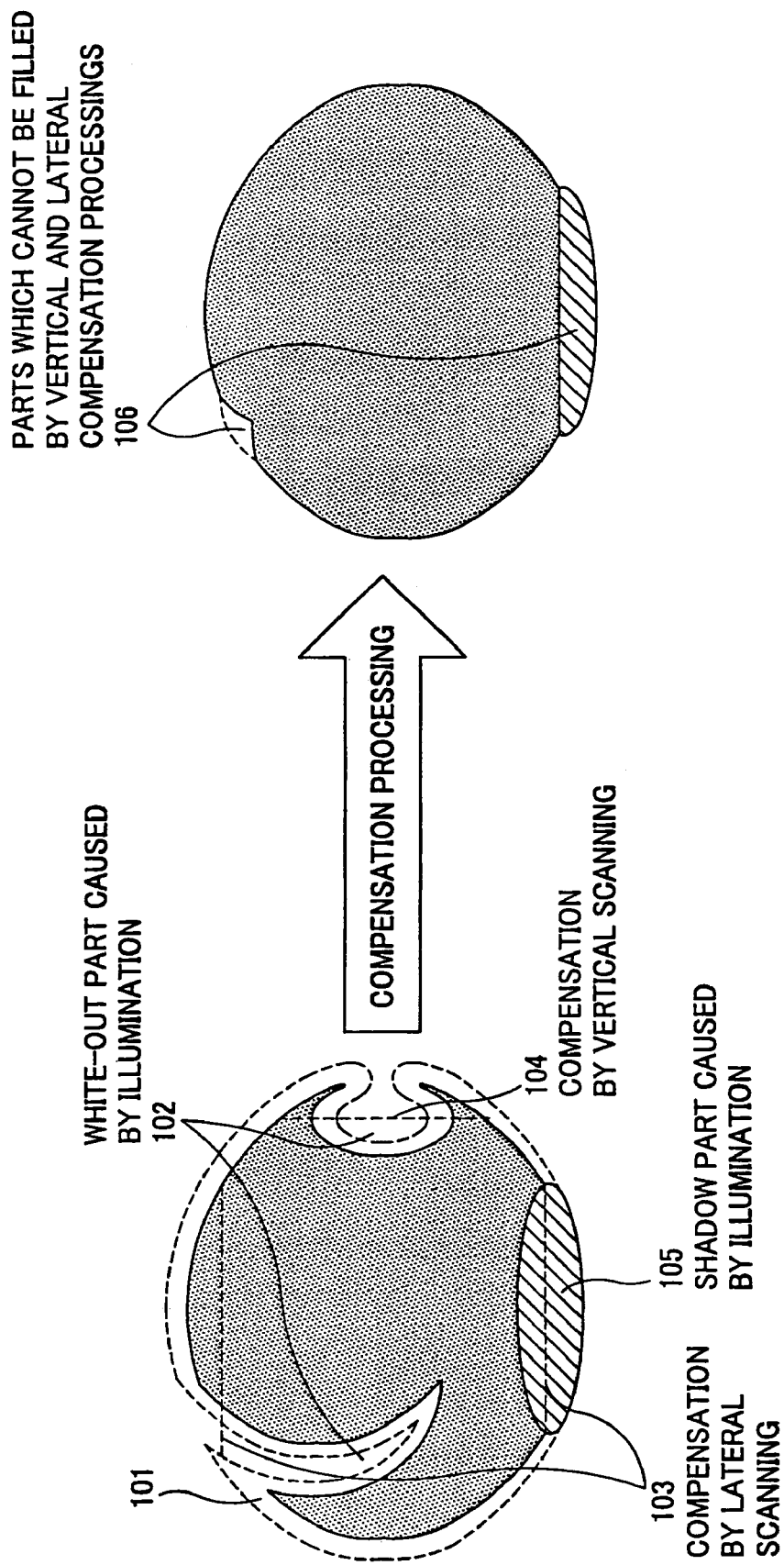
FIG.9A PINK BALL BEFORE COMPENSATION
FIG.9B PINK BALL AFTER COMPENSATION

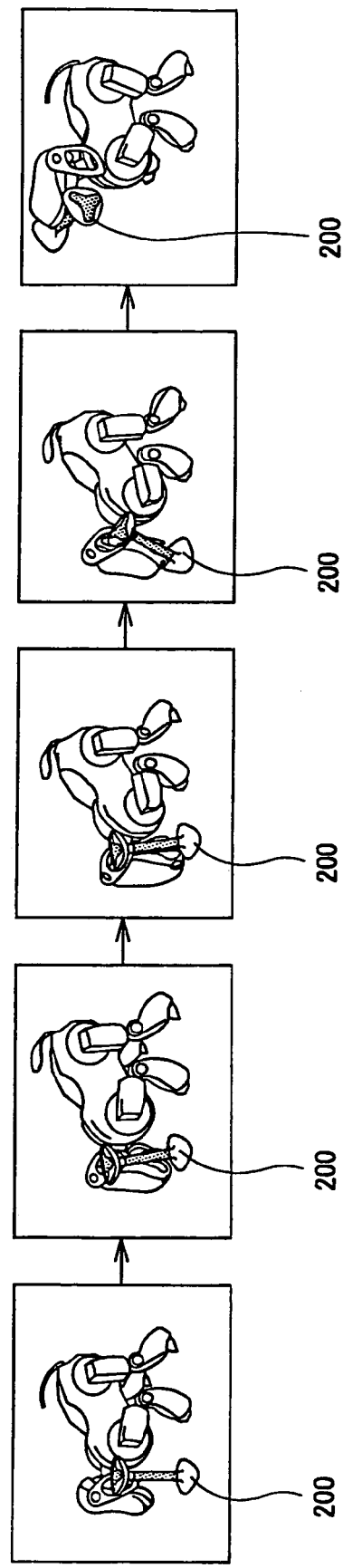

| INPUT EVENT NAME | DATA NAME | DATA RANGE | TRANSIT PROBABILITY TO OTHER NODES | | | | | n |
|---|---|---|---|---|---|---|---|---|
| | | | A | B | C | D | | |
| node 100 | | | node 120 | node 120 | node 1000 | | | node 600 |
| TRANSIT DESTINATION NODE | | | | | | | | |
| OUTPUT ACTION | | | ACTION 1 | ACTION 2 | MOVE BACK | | | ACTION 4 |
| 1 | BALL | SIZE | 0.1000 | 30% | | | | |
| 2 | PAT | | | 40% | | | | |
| 3 | HIT | | | 20% | | | | |
| 4 | MOTION | | | | | | | |
| 5 | OBSTACLE | DISTANCE | 0.100 | | 50% | | | |
| 6 | | JOY | 50.100 | | 100% | | | |
| 7 | | SURPRISE | 50.100 | | | | | |
| 8 | | SADNESS | 50.100 | | | | | |

FIG.44

ROBOT APPARATUS, CONTROL METHOD FOR ROBOT APPARATUS, AND TOY FOR ROBOT APPARATUS

CROSS-REFERENCE TO RELATED APPLICATIONS

This application claims priority to Japanese Application No. 2003-305308, filed Aug. 28, 2003 and a Continuation of U.S. application Ser. No. 10/919,315, filed Aug. 17, 2004 now U.S. Pat. No. 6,952,629, the entire content of both of which is hereby incorporated by reference.

BACKGROUND OF THE INVENTION

1. Field of the Invention

The present invention relates to a robot apparatus, a method for controlling the robot apparatus, and a toy for the robot apparatus, which are preferably applicable to an entertainment robot and in which the robot apparatus is capable of identification by image recognition processing and can bark by the mouth, carry an object, and play, and the method relates to control of the robot apparatus.

A "robot" means a mechanical apparatus which makes actions like human actions through electric or magnetic operations. The etymological origin of "robot" is said to be Slavic "ROBOTA (slavery machine)". In Japan, robots started spreading from the end of 1960's. Most of those robots were industrial robots such as manipulators, conveyor robots, and the like which aimed at automation and unmanned operations in production works in factories.

Recently, studies and developments have been made in the structures and the stable walk control of legged robots, e.g., a pet robot which imitates the body mechanisms of four-legged animals such as a dog, cat, bear, and the like or the motions of them, and a humanoid robot which imitates the body mechanisms of two-legged animals such as apes, human beings, and the like. Expectation of practical use of these robots have been rising. These legged robots are more unstable than crawler-type robots and have difficulties in attitude control and walk control. However, these robots are more excellent because these robots can realize flexible walk and run, e.g., the robots can climb upstairs and uphill.

A fixed robot like a robot arm which is used secured to a specific place works only at a fixed local work space for assembly works and selection works of components. In contrast, work spaces for a mobile robot are not limited but a mobile robot freely moves on a predetermined route or without routes, to substitutively execute predetermined or arbitrary human works or provide various services in place of a human being, dog, or any other creature.

A utility of a legged robot will be substitutive execution of various hard works in industrial and productive activities. For example, substitutive execution of dangerous services and hard works such as maintenance services in atomic power plants, thermal power plants, and petrochemical plants, conveyance and assembly services in manufacturing factories, cleanings of high-rise buildings, rescue in fires or other disasters, etc.

Another utility of a legged robot is a kind of close fit to human life rather than assistant services as described above, i.e., "symbiosis" with human beings or "entertainment". With high-fidelity, this kind of robot replicates motion mechanisms of a legged animal, such as a human being, dog (or pet), bear, or the like who is relatively intelligent. In addition, this kind of robot is demanded not only to execute patterned motions inputted previously with high fidelity but also to realize expressions of lively responses dynamically to words and attitudes ("praise", "scolding", "hit", etc.) of users (or other robots).

The present applicants disclosed in Japanese Patent Application Laid-Open Publication No. 2001-191280 and other materials a control method for executing a motion in which a robot apparatus having plural legs recognizes a pink ball and goes up to and kicks the ball.

However, the robot apparatus described above cannot hold a ball in its mouth or the like or move or play with a ball held in its mouth although the robot apparatus can move a ball away by kicking or picking the ball. Richer and livelier actions could be expressed if the robot apparatus could lift or carry a toy held in his mouth or roll over holding it.

SUMMARY OF THE INVENTION

The present invention has been made in view of the above situation and has an object of providing a robot apparatus capable of performing rich and lively actions by lifting or carrying a toy held in its mouth or roll over holding the toy, a control method thereof and the toy for the robot apparatus.

To achieve the above object, a robot apparatus according to an aspect of the present invention autonomously makes actions, based on external environment, and comprises: an image pick-up means for picking up an image of an object in the external environment; a calculation means for calculating a circularity of a label included in image data based on the image picked up by the image pickup means; and a distinguish means for distinguishing a characteristic part of the object, depending on the circularity calculated by the calculation means, wherein when the object is a toy having a rod-like bite part to be bitten and held by a mouth part formed in a head unit of the robot apparatus, and two side parts each formed in a substantially triangular shape and both formed respectively at two ends of the toy with the bite part interposed between the two side parts, circularities of labels based on a color applied to predetermined areas of the bite part and the two side parts are calculated by the calculation means, and the distinguish means distinguishes the bite part and the side parts from each other, based on the circularities.

The calculation means calculates the circularities of labels based on a color applied to predetermined areas of the bite part and the two side parts, and the distinguish means distinguishes the bite part and the side parts from each other, based on the circularities.

To achieve also the above object, a control method for a robot apparatus according to another aspect of the present invention is for a robot apparatus which autonomously makes actions, based on external environment, and comprises: an image pick-up step of picking up an image of an object in the external environment; a calculation step of calculating a circularity of a label included in image data based on the image picked up in the image pickup step; and a distinguish step of distinguishing a characteristic part of the object, depending on the circularity calculated in the calculation step, wherein when the object is a toy having a rod-like bite part to be bitten and held by a mouth part formed in a head unit of the robot apparatus, and two side parts each formed in a substantially triangular shape and both formed respectively at two ends of the toy with the bite part interposed between the two side parts, circularities of labels based on a color applied to predetermined areas of the bite part and the two side parts are calculated in the calculation step, and the bite part and the side parts are distinguished from each other in the distinguish step, based on the circularities calculated in the calculation step.

In the calculation step, the circularities of labels based on a color applied to predetermined areas of the bite part and the two side parts are calculated, and in the distinguish step, the bite part and the side parts are distinguished from each other, based on the circularities.

To achieve also the above object, a toy for a robot apparatus according to further another aspect of the present invention is for a robot apparatus which autonomously makes actions, based on external environment, and comprises: a rod-like bite part to be bitten and held by a mouth part formed in a head unit of the robot apparatus; and two side parts each formed in a substantially triangular shape and both formed respectively at two ends of the toy with the bite part interposed between the two side parts, wherein predetermined areas of the bite part and the two side parts are each colored in a color applied with a label by an image recognition processing of the robot apparatus, circularities of labels are calculated, and the bite part and the side parts are distinguished from each other, based on the circularities.

According to the robot apparatus according to the present invention, the calculation means calculates the circularities of labels based on a color applied to predetermined regions of the bite part and two side parts, and the distinguish means distinguishes the bite part and the side parts from each other, based on the circularities. Therefore, the robot apparatus can recognize a special toy, bite and hold the toy, carry the toy kept held, and roll over holding the toy held in its mouth. Thus, richer and livelier actions can be performed.

According to the control method for a robot apparatus according to the present invention, the circularities of labels based on a color applied to predetermined regions of the bite part and two side parts are calculated in the calculation step, and the bite part and the side parts are distinguished from each other, based on the circularities, in the distinguish step. Therefore, it is possible to recognize a special toy, bite and hold the toy, carry the toy kept held, and roll over holding the toy held in its mouth. Thus, richer and livelier actions can be performed.

The toy for a robot apparatus according to the present invention is provided with a rod-like bite part to be bitten and held by a mouth part formed in a head unit of a robot apparatus, and two side parts each formed in a substantially triangular shape and both formed respectively at two ends of the toy with the bite part interposed between the two side parts. Predetermined areas of the bite part and the two side parts are each colored in a color to which a label is applied by an image recognition processing of the robot apparatus. The circularities of labels are calculated to distinguish the bite part and the side parts from each other, so that the robot apparatus can bite or carry the toy held in the mouth part.

BRIEF DESCRIPTION OF THE DRAWINGS

FIG. 3A and FIG. 3D show outer appearances of a toy (bone);

FIG. 4 is a table for explaining circularity,

FIG. 9A and FIG. 9B are views for explaining a compensation processing and an expansion processing;

FIG. 30A to FIG. 30E are views showing an interaction example of the robot apparatus biting a bone standing vertically;

FIG. 44 shows a state transit table prepared for each node of the definite probability automaton.

DETAILED DESCRIPTION OF THE PREFERRED EMBODIMENTS

An embodiment of the present invention will now be described with reference to the drawings. The embodiment relates to an autonomous robot apparatus which performs autonomous actions in response to environments (or external stimuli) or internal conditions. In particular, the robot apparatus appropriately drives its four legs to move its body part in relation to the ground plane.

This robot apparatus recognizes a special toy which will be described later by an image recognition processing algorithm, a bone-bite control algorithm, and a bite detection algorithm which are executed by a CPU (Central Processing Unit) also described later. Then, the robot apparatus makes motions of going up to the toy, holding in its mouth, walking with the toy in its mouth, etc.

Described first will be the structure of the robot apparatus.

Figure 1:
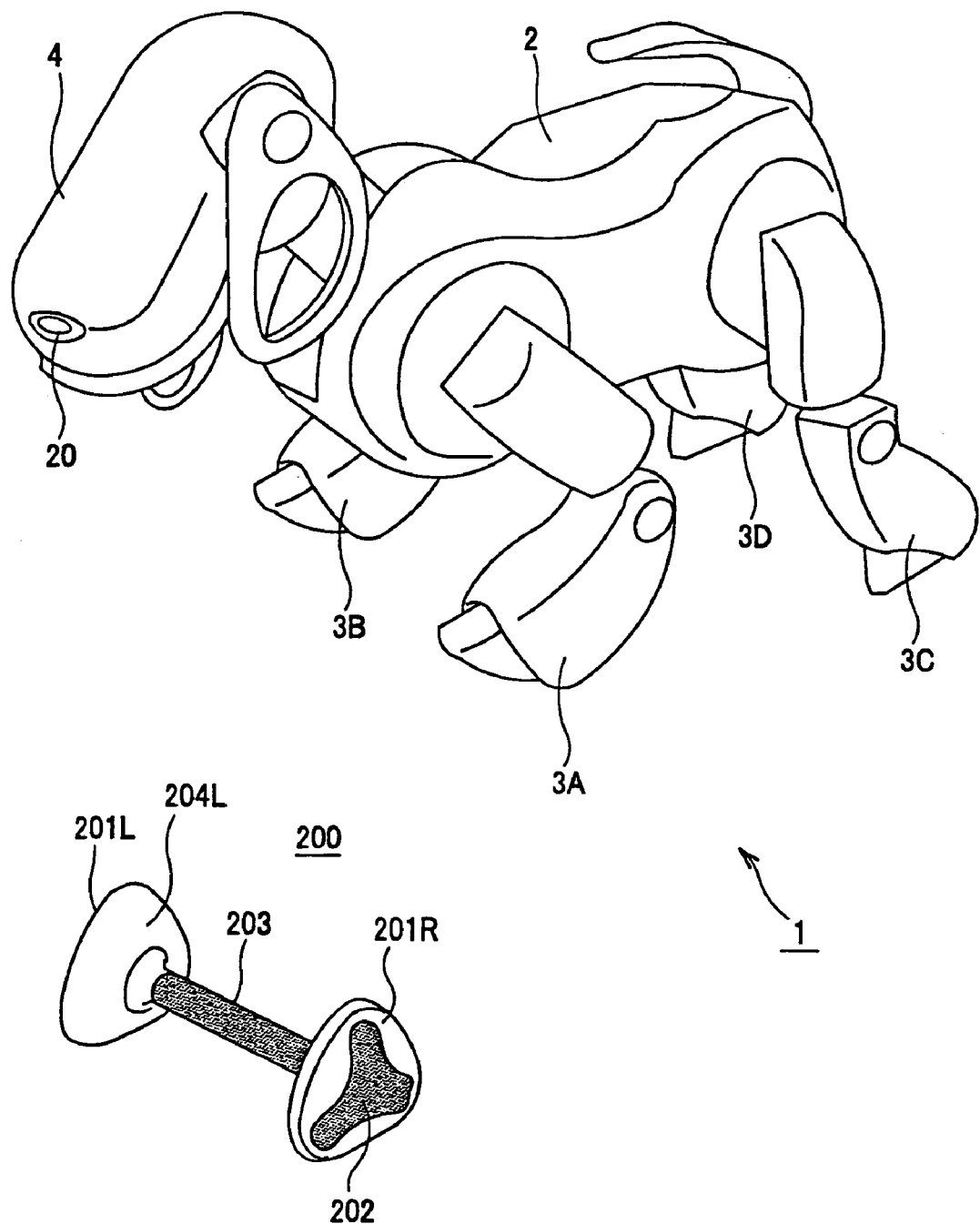
FIG. 1 is a perspective view showing an outer appearance of a robot apparatus.

As shown in FIG. 1, the robot apparatus 1 according to the present embodiment is a legged robot of a quadrupedal walking type. Leg units 3A, 3B, 3C, and 3D are connected to front and rear parts of a body unit 2 in the left and right sides thereof, and a head unit 4 is connected to the front end of the body unit 2. The head unit 4 has a mouth (jaw) part which can bite and hold a bone-shaped toy (hereinafter abbreviated simply as a bone where appropriate) as a concrete example of the toy according to the present invention. The mouth part has an upper jaw part and a lower jaw part and adopts a structure of biting a bitable part 203 of the bone 200 to securely hold the bone. The structure of the mouth part will be described later in more details.

Figure 2:
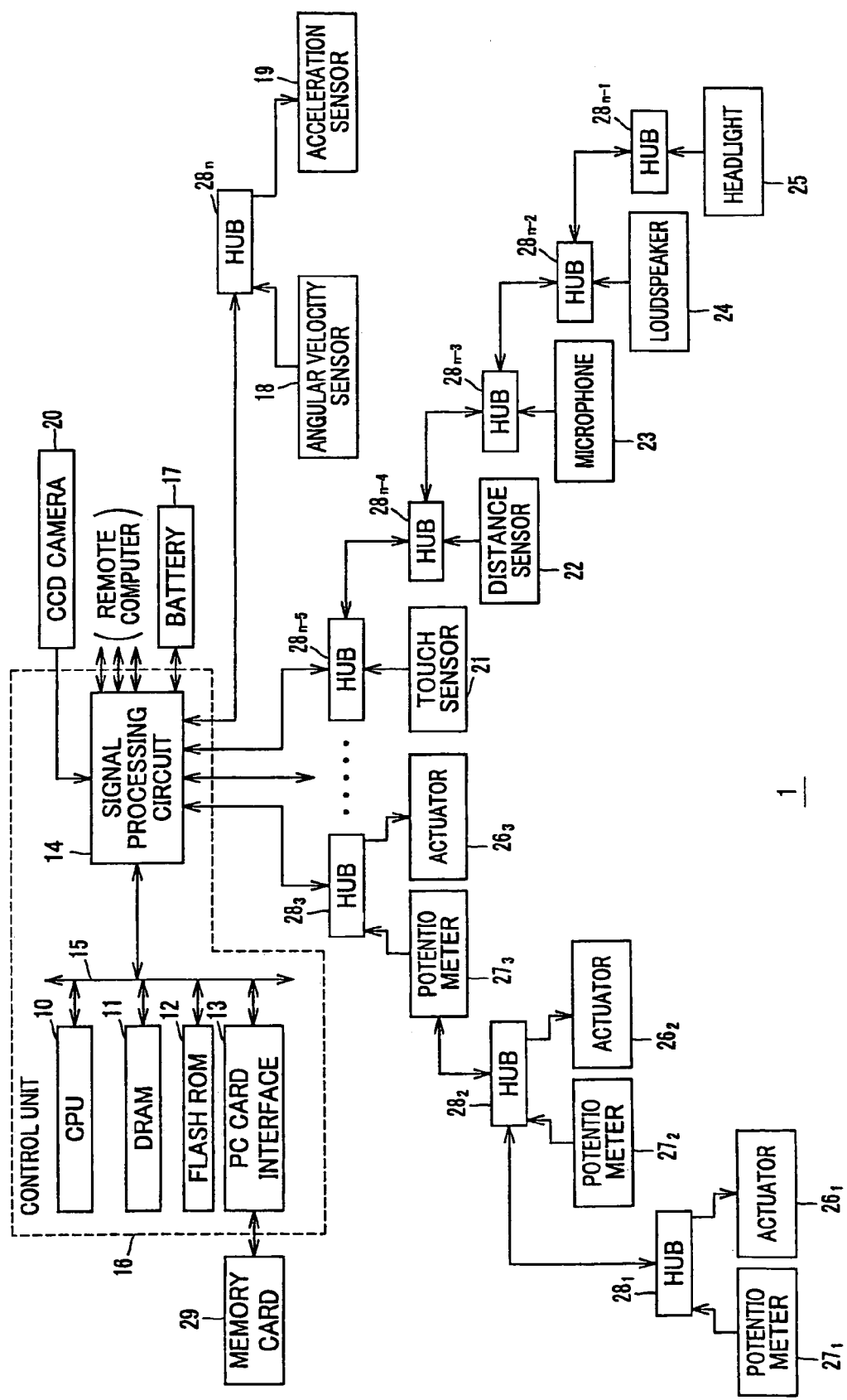
FIG. 2 is a block diagram showing a circuit configuration of the robot apparatus.

As shown in FIG. 2, the body unit 2 contains a control part 16 in which a CPU 10, a DRAM (Dynamic Random Access Memory) 11, a flash ROM (Read Only Memory) 12, a PC (Personal Computer) card interface circuit 13, and a signal processing circuit 14 are connected mutually via an internal bus 15, and a battery 17 as a power supply source of the robot apparatus 1. Also, the body unit 2 contains an angular velocity sensor 18 and an acceleration sensor 19 to detect the orientation of the robot apparatus 1 and the acceleration of motion.

At predetermined positions in the head unit 4, there are provided a CCD (Charge Coupled Device) camera 20 for detecting environmental luminance, a distance sensor 22 for measuring the distance to any object in the front side, a microphone 23 for collecting external sounds, a loudspeaker 24 for outputting various voices, and an LED (Light Emitting Diode) (not shown) equivalent to "eyes" of the robot apparatus 1.

Further, joint parts of the leg units 3A to 3D, connection parts between the leg units 3A to 3D and the body unit 2, and a connection part between the head unit 4 and the body unit 2 are each provided with one of actuators $26_1$ to $26_n$ and one of potentiometers $27_1$ to $27_n$. For example, the actuators $26_1$ to $26_n$ each include a servo motor in its own structure. By driving the servo motors, the leg units 3A to 3D are controlled to transit to an aimed attitude or operation. Of course, the walk motion is constituted by free motions of the leg units 3A to 3D relative to the ground plane.

Further, various sensors including the angular velocity sensors 18, the acceleration sensors 19, a touch sensor 21, the distance sensor 22, the microphone 23, the loudspeaker 24, and the potentiometers $27_1$ to $27_n$, and LEDs and the actuators $26_1$ to $26_n$ are connected to the signal processing circuit 14 of the control part 16 via corresponding hubs $28_1$ to $28_n$, respectively. The CCD camera 20 and the battery 17 are each connected directly to the signal processing circuit 14.

The signal processing circuit 14 orderly takes in sensor data, image data, and audio data supplied from the sensors described above, and stores the data into predetermined locations in the DRAM 11 via the internal buses 15, respectively. In the present embodiment, an image signal of an object picked up by the CCD camera 20 is subjected to a predetermined video signal processing by the signal processing circuit 14, and stored as image data at a predetermined location in the DRAM 11. The signal processing circuit 14 orderly takes in residual battery data indicative of residual battery, which is supplied from the battery 17, and stores this data at a predetermined location in the DRAM 11.

The sensor data, image data, audio data, and residual battery data stored in the DRAM 11 are used when the CPU 10 thereafter performs operation control of the robot apparatus 1. The operation control performed by the CPU 10 is control using programs (e.g., an image recognition processing program, a bone-bite detection program, and a bite detection program) based on an image recognition processing algorithm, a bone-bite control algorithm, and a bite detection algorithm which characterize the present invention. These algorithms will be described in detail later.

In practice, in the initial stage after the power source of the robot apparatus 1 is turned on, the CPU 10 reads the programs for the above-described control processings stored in a memory card 29 or flash ROM 12 inserted in a PC card slot not shown of the body unit 2, through the PC card interface circuit 13 or directly. The CPU 10 stores the programs into the DRAM 11.

Also, the CPU 10 determines conditions of the robot apparatus itself, environmental situation, and presence or absence of instructions and actions from a user, based on the sensor data, image data, audio data, and residual battery data which have been orderly stored in the DRAM 11 by the signal processing circuit 14, as described above.

The CPU 10 further makes decisions based on the determination results and also drives necessary ones of the actuators $26_1$ to $26_n$, based on the programs described above. The robot apparatus is thus let behave, e.g., hold the bone in its mouth part of the head unit 4, nod or shake the head unit 4, or drive the leg units 3A to 3D to walk.

At this time, the CPU 10 generates audio data where necessary, and supplies the data as an audio signal to the loudspeaker 24 through the signal processing circuit 14, to output the audio based on the audio signal to the outside or to turn on/off or flicker the LEDs. The robot apparatus 1 is thus constructed to behave autonomously in response to the condition of itself, environmental situation, and instructions and actions from the user.

FIG. 3A and FIG. 3D show appearances of the toy with which the robot apparatus 1 plays holding the toy in its mouth. This toy is shaped like a bone which generally makes people imagine a dog playing with a bone in its mouth. FIG. 3A shows the toy stably placed on the floor. FIG. 3B shows the toy standing vertically on the floor. FIG. 3C is a front view showing the toy placed stably on the floor. FIG. 3D is a side view of the toy placed stably on the floor. This bone-shaped toy is provided with substantially triangular side parts 201L and 201R at two ends of a stick-like bite part 203. The bite part 203 is colored in pink. Y-shaped pink regions 202 are provided on the outer sides of the side parts 201L and 201R The insides 204L and 204R of the side parts 201L and 201R are formed to thicken from the outer circumferences toward the bite part 203. The bite part 203 is long enough to be bitten by and held in the mouth part of the head unit 4 of the robot apparatus 1. The insides 204L and 204R are thus formed to thicken toward the bite part 203 from the outer circumferences. Therefore, if the robot apparatus bites a portion close to either one of the side parts, the slope of the thickness makes the biting position shift to the center part.

The robot apparatus 1 picks up an image of the toy 200 by the CCD camera 20, and processes the signal of the image by the signal processing circuit 14, and stores image data thereof into the DRAM 11. The robot apparatus 1 obtains image data from the DRAM 11, and recognizes the toy of its own in accordance with the image recognition processing program executed by the CPU 10. The image-based recognition can be achieved by identifying the shapes of the bite part 203 and the pink regions of the side parts 201L and 201R. It is further possible to determine the orientation of the bite part 203 and whether the robot apparatus 1 can bite and hold the toy by identifying the shapes of the pink regions. Based on the orientation of a label on the bite part 203, the angle of the bone can be detected.

The recognition method in which the robot apparatus 1 recognizes the toy will now be described. Although the method is executed in accordance with the image recognition processing program, the description will start from the principle of the recognition method. The robot apparatus 1 calculates the circularity of a pink area from the image data picked up by the CCD camera 20, and recognizes the toy with use of the circularity value. The robot apparatus distinguishes the bite part and side parts which are characteristic parts of the toy. The circularity R is obtained by the following expression from the area of the pink region and the boundary length thereof.

$$R = 4\pi area/(boundary\ length * boundary\ length) \quad (1)$$

The pink region may be subjected to an extension processing and a compensation processing, to improve the recognition performance.

Figure 5B:
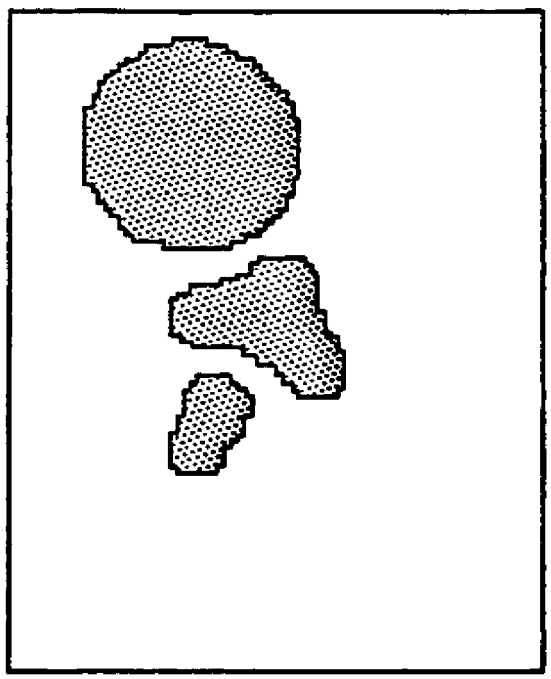
FIG. 5A and FIG. 5B show a real image of the toy (bone) and a calculation result of pink-color-table areas.
Figure 5A:
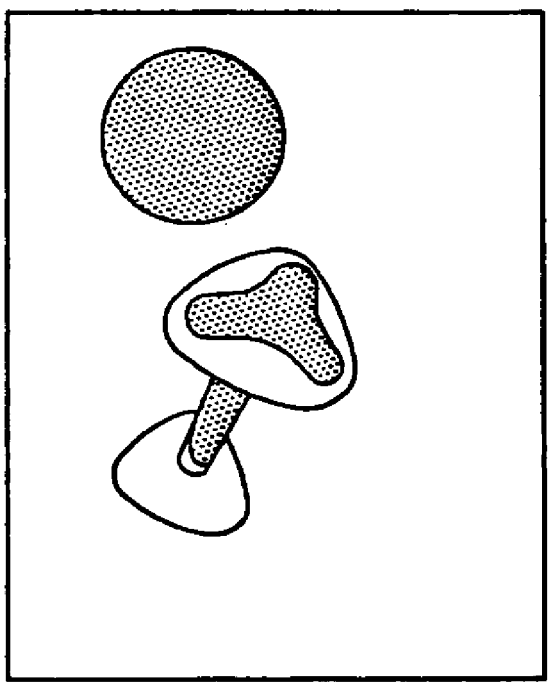

FIG. 4 shows areas, boundary lengths, and circularities in case of a "circle", "square", and "regular triangle". FIG. 5A and FIG. 5B show a real image showing the toy and a pink ball, and an image processing result thereof (a calculation result showing pink-color-table areas).

Figure 6:
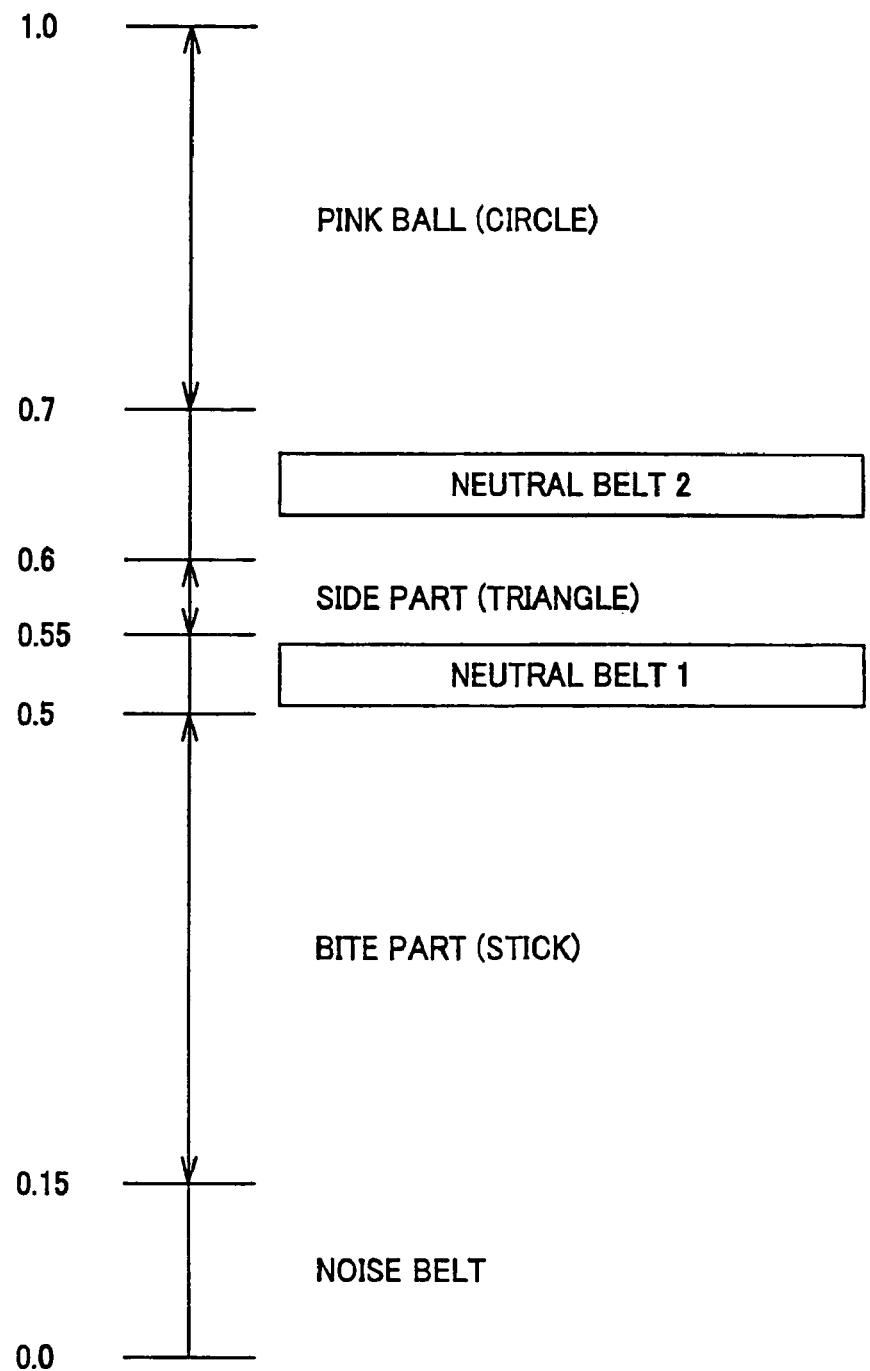
FIG. 6 is a chart for explaining recognition based on circularity.

Actually, the robot apparatus 1 classifies objects picked up, based on the circularities obtained by the expression (1) and further data stored in a short time period. As shown in FIG. 6, the circularity increases from 0.0 to 1.0 as a shape approximates to a circle. In other words, the circularity decreases as a shape is more different from a circle.

Figure 7B:
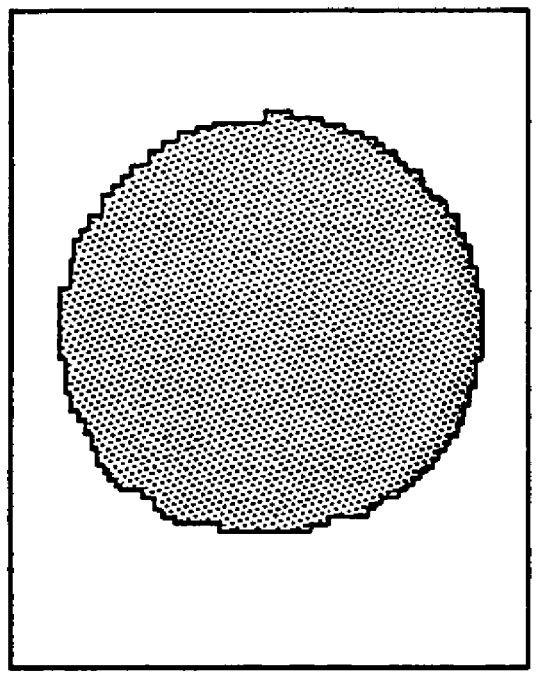
FIG. 7A and FIG. 7B show a real image of a ball and a calculation result of a pink-color-table area.
Figure 7A:
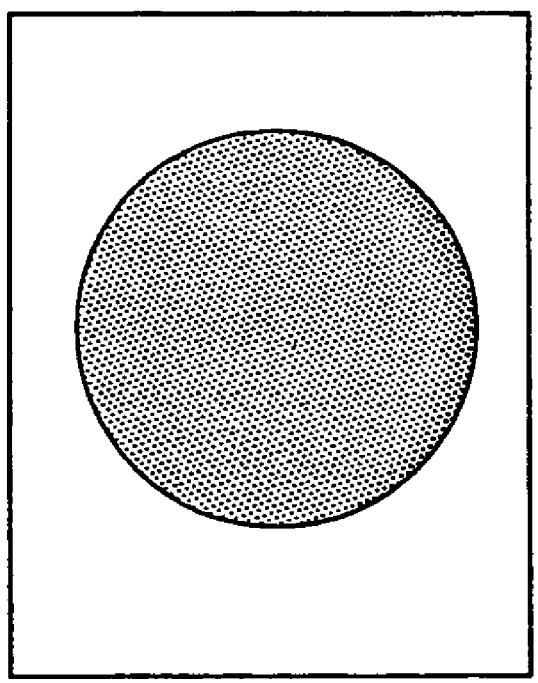
Figure 8B:
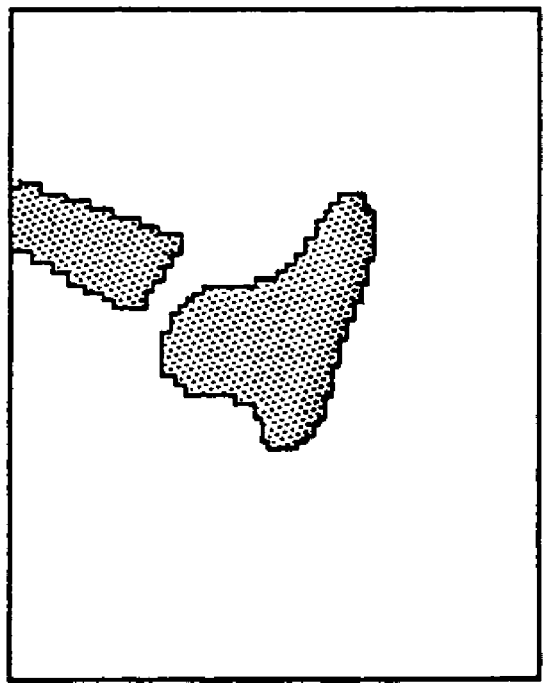
FIG. 8A and FIG. 8B show a real image of a side part and a bite part of the toy (bone) and a calculation result of pink-color-table areas.
Figure 8A:
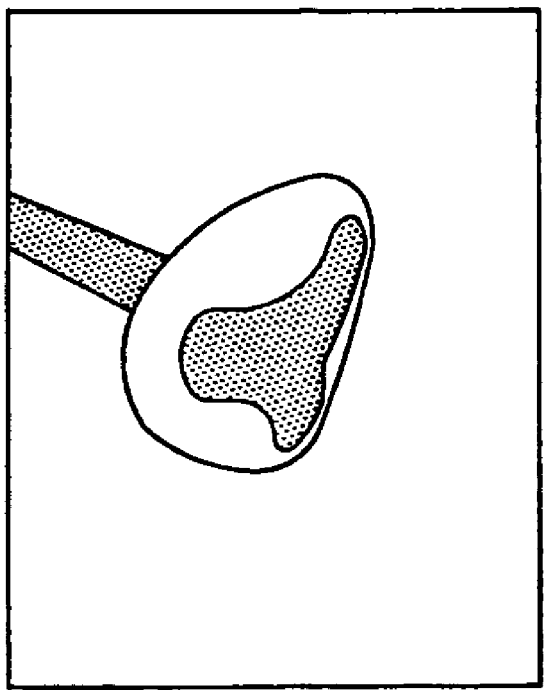
Figure 10:
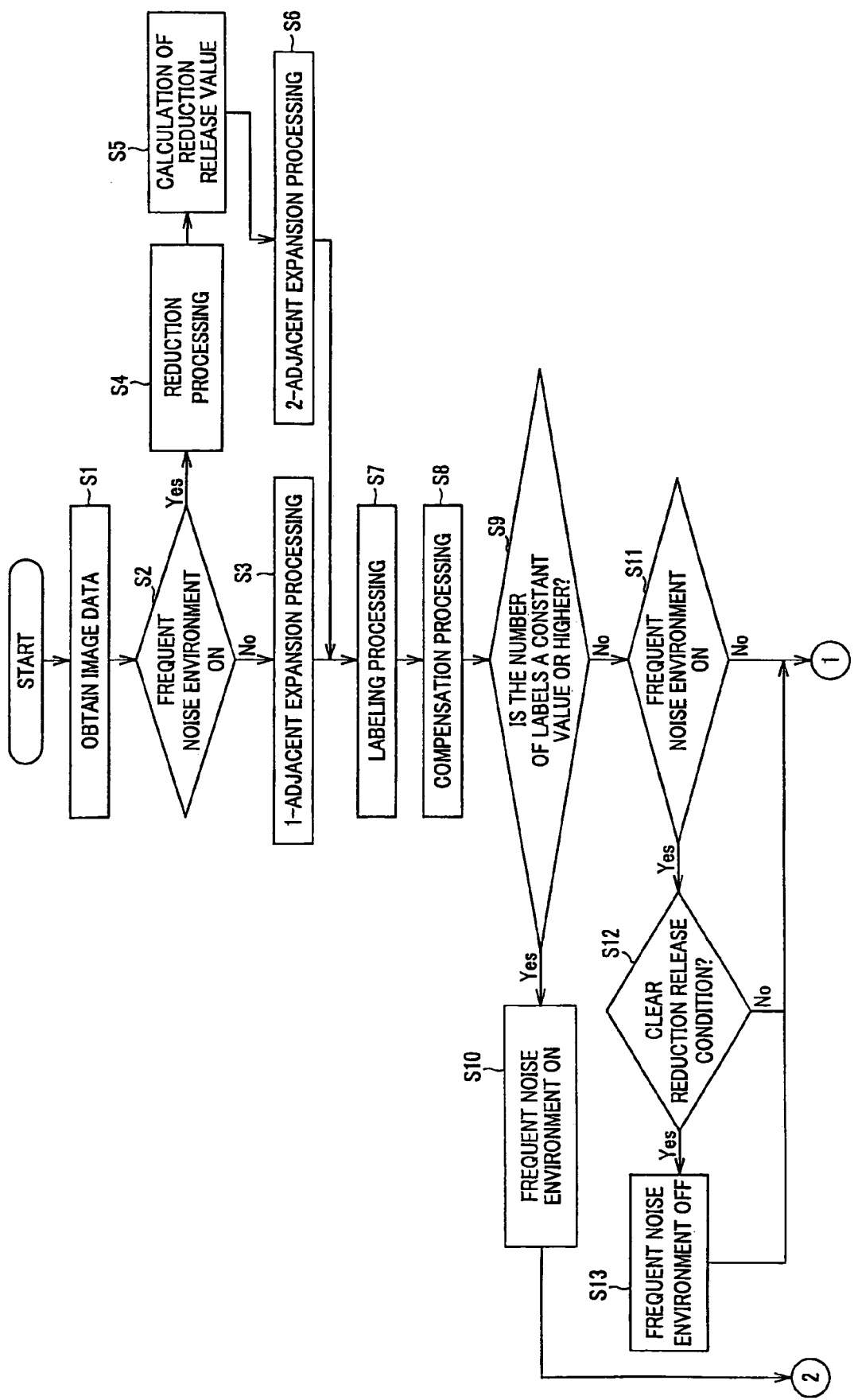
FIG. 10 is a part of a flowchart of the entire image recognition processing procedure for recognizing a bone, ball, and pink.

For example, if the circularity R is within a range of 0.7 to 1.0, the pink ball whose actual image and image processing result are shown in FIG. 7A and FIG. 7B is identified. If the circularity R is within a range of 0.55 to 0.6, the side part 201L or 201R of the toy whose actual image and image processing result are shown in FIG. 8A and FIG. 8B are identified. If the circularity R is within a range of 0.15 to 0.5, the bite part 203 of the toy whose actual image and image processing result are shown in FIG. 8A and FIG. 8B are identified.

The circularity R of 0.0 to 0.15 indicates a noise belt. The circularity R of 0.5 to 0.55 indicates a neutral belt 1. The circularity R of 0.6 to 0.7 indicates a neutral belt 2. Depending on the illumination condition and the view angle, the circularity R may vary along time. Even if the circularity R falls within the noise belt, the object is classified into a pink unconfirmed object as long as the pink region has a constant area or more. Although the circularity R falls currently within the neutral belt 1, the bite part 203 is identified as long as there is a memory that the circularity R once fell within the range of 0.15 to 0.5 where the bite part 203 could be identified. Similarly, the side part 201 is identified as long as there is a memory that the circularity R once fell within the range of 0.55 to 0.6. If there is no memory, a pink unconfirmed object is identified. Although the circularity R is also currently within the neutral belt 2, the pink ball is identified as long as there is a memory that the circularity R once fell within the range of 0.7 to 1.0 where the pink ball could be identified. Similarly, the side part 201 is identified if there is a memory that the circularity R once fell within the range of 0.55 to 0.6. If there is no memory, a pink unconfirmed object is identified.

By thus making classification according to the circularity R and short-term memories, misidentification of the toy (bone 200) with the pink ball can be eliminated. It is further possible to respond to environmental robustness.

Next, a description will be made of the principle of a compensation processing and an expansion processing to improve the recognition performance with reference to FIG. 9A and FIG. 9B. Under influence from illumination, white-out spots 102 and a shadow 105 are created at parts of the pick ball or toy, so that the ball or the toy appear to be partially chipped. Then, the measured value of the circularity tends to disagree with the logical value, causing an erroneous recognition of the shape. Therefore, the inside of the label is scanned in the lateral and vertical directions, and the label is forcedly assigned to those pixels that have not been labeled, between two lateral ends and between two vertical ends. The reference symbol 103 indicates compensation based on the scanning in the lateral direction, and the reference symbol 104 indicates compensation based on the scanning in the vertical direction. The parts of the white-out spots 102 and the dark part of the shadow 105 are over painted in the same color as that of the label. As a result, the circularity of the compensated label approximates to a logical value, so that the recognition accuracy improves. In some cases, there remain parts 106 which could not be made up by the compensation processing. Of course, the level may be applied more forcedly by spending a longer time to perform oblique scanning. Alternatively, an expansion processing for painting over, for example, eight surrounding pixels in the same color. In the expansion processing, the pink area is expanded to the region indicated by a broken line.

Next, with reference to FIG. 10 to FIG. 21, a description will be made of the flow of an image recognition processing which the robot apparatus 1 performs by executing the image recognition processing program by the CPU 10. At first, image data is obtained in step S1 in FIG. 10. The image data is of an image which has been picked up by the CCD camera 20, subjected to a video signal processing by the signal processing circuit 14, and stored into the DRAM 11. Next, data of a pink channel is obtained from a color data table (CDT). Hardware can calculate what parts of the image are pink. Therefore, if the image of the pink channel is accessed, whether a pixel defined by what number pixel in the x-direction and what number pixel in the y-direction is pink or not can be detected as data expressed by 1 or 0. For example, if the pixel is pink, the data is 1. Otherwise, the data is 0.

The flowchart shows a branch processing from step S2 in which whether a frequent-noise-environment processing is turned on or off, as will be described later. In step S3, an expansion processing is performed only one time on the data of the pink channel of the CDT. This expansion processing has already described with reference to FIG. 9A and FIG. 9B. This is a processing in which eight surrounding pixels surrounding a pink pixel at a boundary part are also colored in pink to make up white-out spots caused under influence from illumination. Steps S4 to S6 are subsequent to step S2, and a description thereof will be omitted herefrom.

Next, in step S7, a labeling processing is carried out. The labeling processing is a method of obtaining how many pink clusters exist in one image. For example, two pink clusters exist if there are a pink cluster corresponding to the bite part 203 of the toy and a pink cluster corresponding to the side part 201R, as shown in FIG. 8B.

In step S8, the compensation processing is carried out. This compensation processing has already been described with reference to FIG. 9A and FIG. 9B, and a description thereof will be omitted herefrom. This processing is to fill up those white-out spots which could not been made up even by the expansion processing executed in step S3.

However, if the robot apparatus 1 erroneously recognizes a wooden floor and skin color as pink due to color temperature and the like from the obtaining of image data in step S1 to the data obtaining processing for the pink channel, a huge amount of data processings have to be done in the later expansion processing, labeling processing, and compensation processing. To avoid this, a reduction is carried out in when the robot apparatus 1 comes into an environment in which noise frequently occurs. The reduction is a processing opposite to the expansion. If a pixel is not pink, eight surrounding pixels surrounding the pixel are painted in color different from pink. In this manner, small noise can be eliminated, and the number of labelings can be reduced.

Therefore, whether or not the number of labels is a constant number or higher is checked in step S9. If the number of labels is determined to be a constant number (10) or higher, the frequent noise-environment-processing is turned on (step S10). Further, when next image data is obtained, it is determined in step S2 that the frequent-noise environment processing has been turned on. The processing goes to step S4, and performs a reduction processing to eliminate small noise. By this reduction, the pink region is reduced to be smaller. Therefore, a reduction release value is calculated in step S5, and the expansion processing is performed twice in step S6.

In step S5, a difference expressing how much the pink region is reduced from the state before the reduction, when a reduction is carried out in step S4. An accumulation of pixels which are not pink after the reduction processing is calculated. In case where noise consists of pink dots, the color of the noise is changed into a different color by a reduction. If pink noise disappears and further environmental illumination changes to show up only the pink ball, only the contour of the pink ball changes through the reduction. As a result of this, the amount by which the pink region is reduced is totally smaller than in the case of pink noise. Thus, step S5 is to perform a processing of calculating the percentage by which pink pixels are painted over through a reduction.

If it is determined in step S9 that the number of labels is still greater than the constant number, a reduction processing is carried out in step S4 when next image data is obtained. Otherwise, if it is determined in step S9 that the number of levels is smaller than the constant number and if it is determined in step S11 that the frequent-noise-environment processing is ON, the processing goes to step S12. In step S12, whether it is possible to clear the reduction release condition or not is determined. If it is possible, the frequent-noise-environment processing is turned off in step S13.

Figure 11:
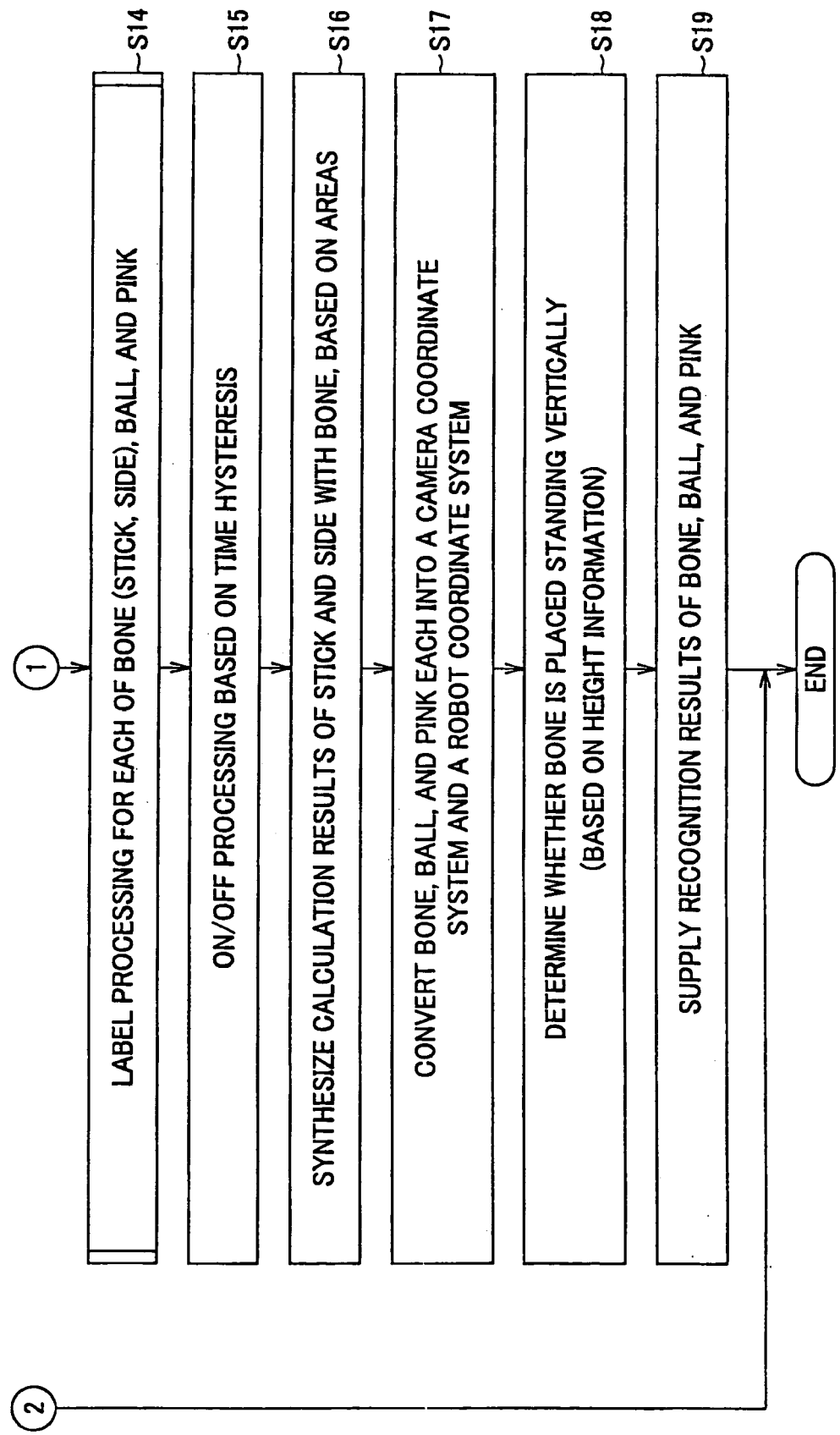
FIG. 11 is the remaining part of the flowchart of the entire image recognition processing procedure for recognizing a bone, ball, and pink.
Figure 22A:
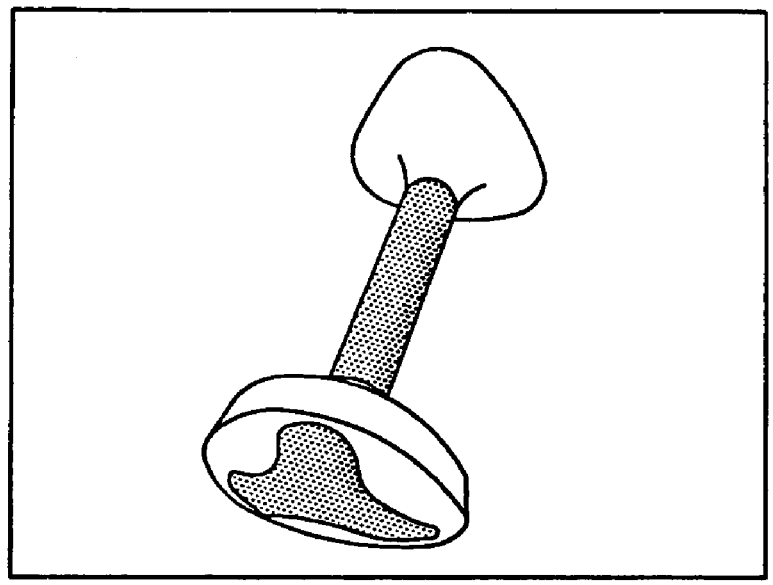
FIG. 22A and FIG. 22B are a real image of the entire bone and an image processing result.
Figure 22B:
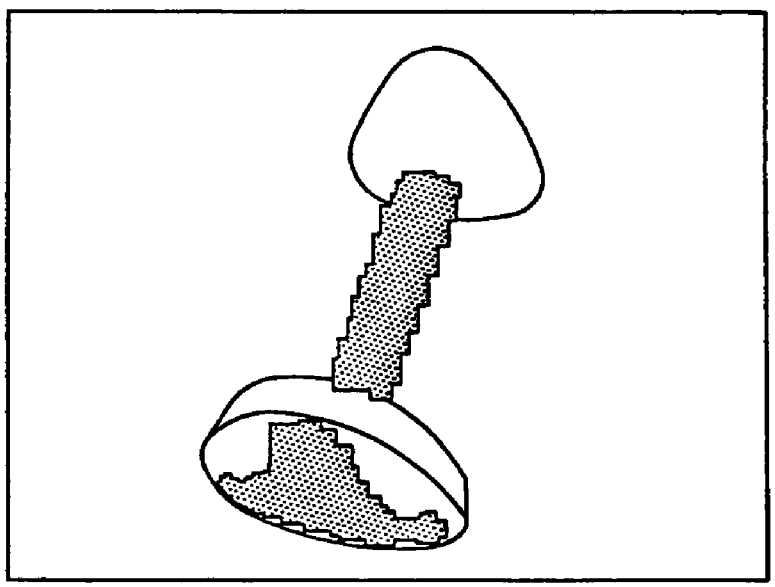
Figure 23A:
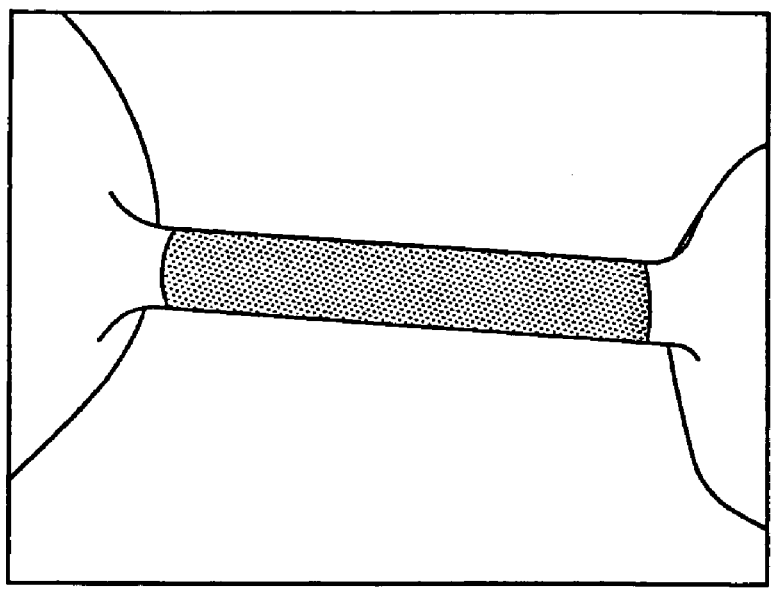
FIG. 23A and FIG. 23B are a real image of the bite part of the bone and an image processing result.
Figure 23B:
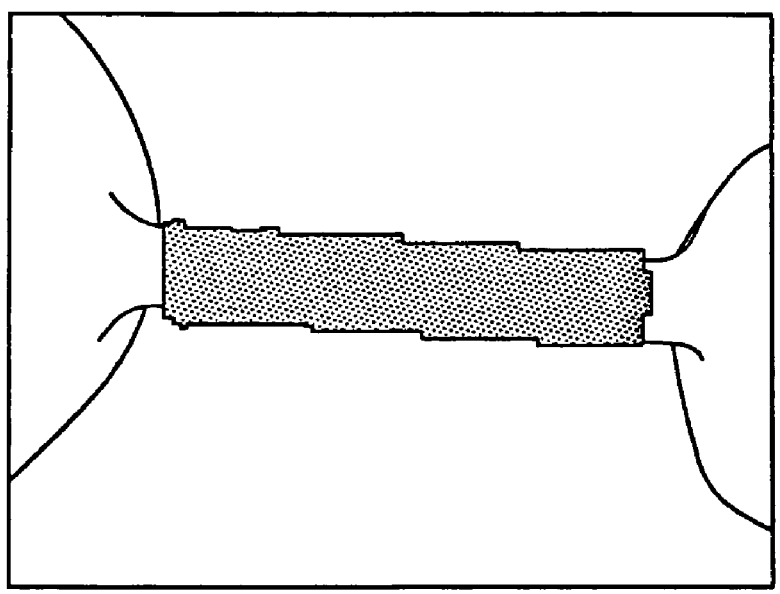
Figure 24A:
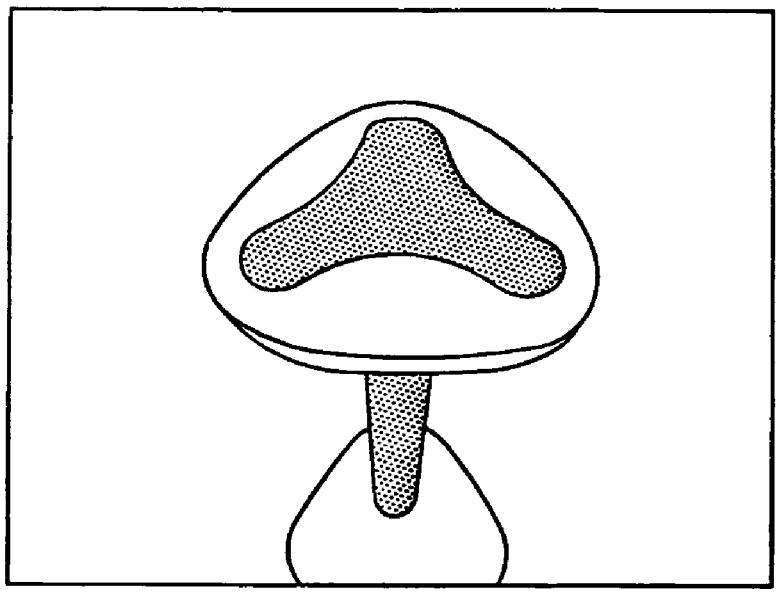
FIG. 24A and FIG. 24B are a real image of the bone standing vertically and an image processing result.
Figure 24B:
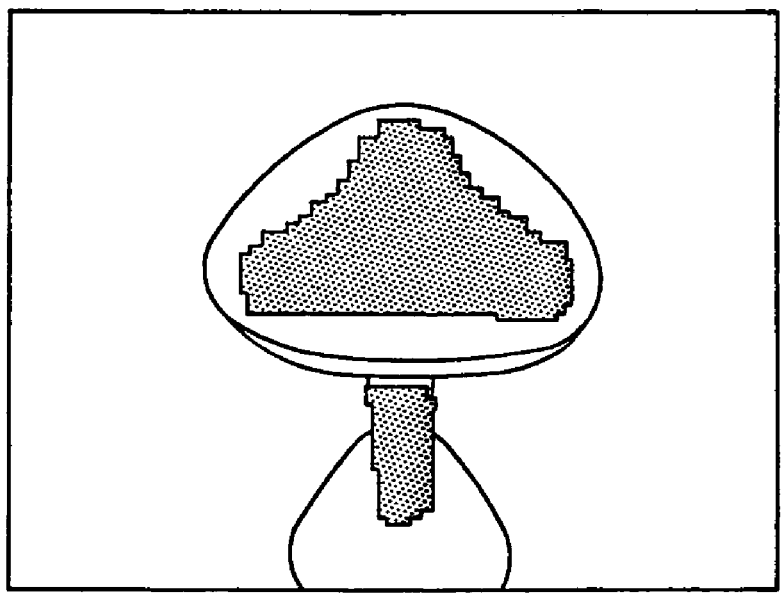
Figure 25A:
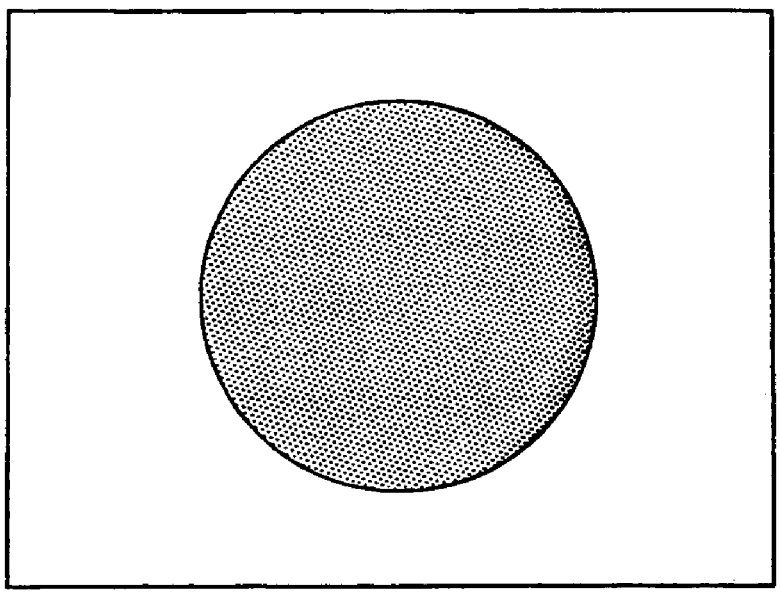
FIG. 25A and FIG. 25B are a real image of the ball and an image processing result.
Figure 25B:
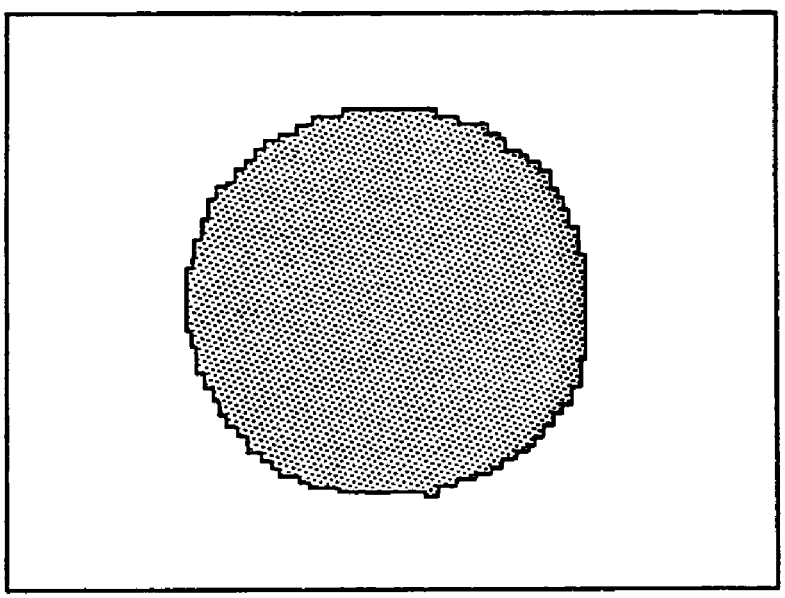
Figure 26A:
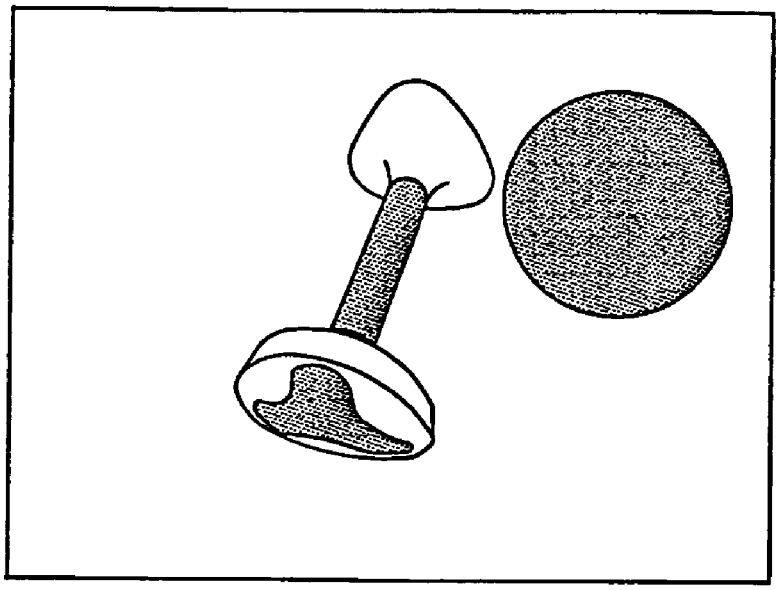
FIG. 26A and FIG. 26B are a real image of the ball and the bone and an image processing result.
Figure 26B:
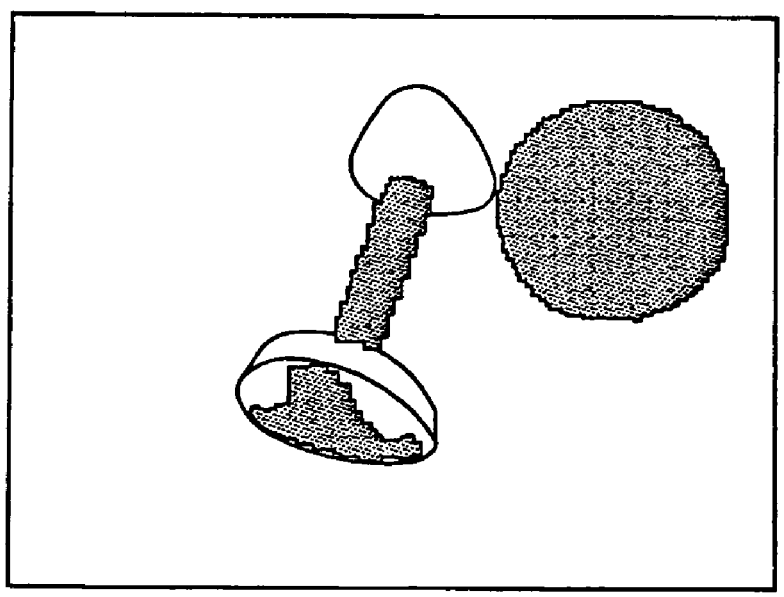

FIG. 22A and FIG. 22B to FIG. 26A and FIG. 26B show image processing results of the bone and the ball. These are image processing results obtained through the processing procedure up to step S13 in FIG. 10. Based on these image processing results, the processing procedure of steps S14 to S19 in FIG. 11 is carried out, as will be described later. FIG. 22A shows an image of the whole bone. FIG. 22B shows an image processing result. As can be seen from the figure, the bite part and the pink part of a side part are slightly expanded. FIG. 23A is an image of the bite part of the bone substantially observed from the front side. White-out can be found. FIG. 23B shows an image processing result in which white-out spots are eliminated as a result of performing a compensation processing and an expansion processing. FIG. 24A is an image of the bone standing vertically. FIG. 24B shows an image processing result in which the bottom part of the triangle changes to be substantially linear as a result of performing a compensation processing on a side part. FIG. 25A is an image of the ball. White-out occurs due to influence from illumination. From the image processing result of FIG. 25B, it is found that white-out spots are eliminated by a compensation processing and an expansion processing, and the pink region is expanded. FIG. 26A is an image showing the bone and the ball together. From the image processing result of FIG. 26B, each pink part is subjected to a compensation processing and an expansion processing.

Next, the procedure goes to step S14 in FIG. 11. As written in step S14, the area, barycenter, boundary length, circularity, and inclination angle on the image are calculated for each of the labels, e.g., labels of the bite part (stick) and side parts of a toy (bone), a ball, a pink unconfirmed object. From the information described above and history (past memories), each label is classified into the bite part of a bone, side parts of a bone, a pink ball, a pink unconfirmed object, and noise. This label processing in step S14 in FIG. 11 has a subroutine as shown in FIG. 12.

Figure 12:
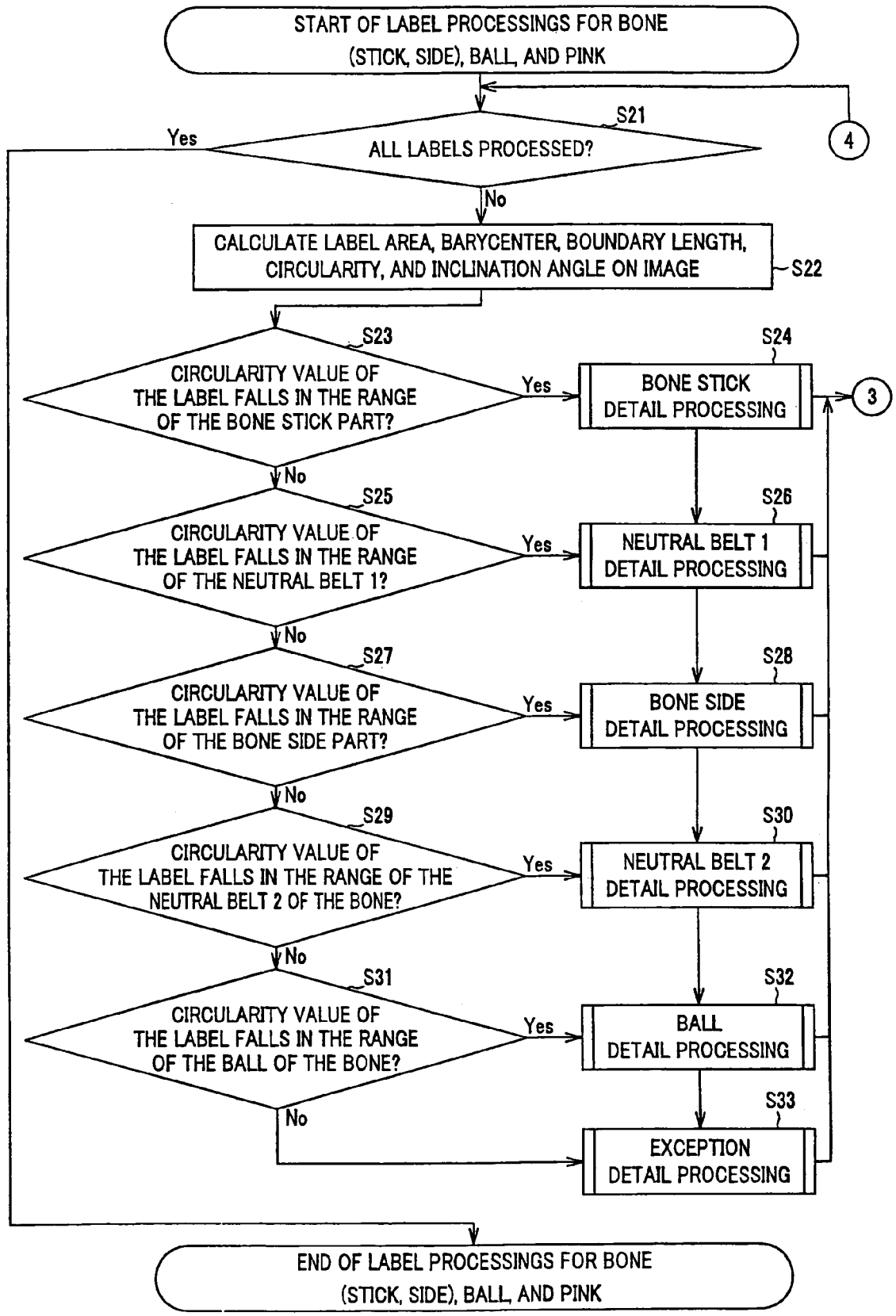
FIG. 12 is a part of a flowchart of showing a label processing procedure for a bone, ball, and pink.

In the subroutine in FIG. 12, step S21 branches depending on whether processings of all the labels have been completed or not. If the number of processed labels does not yet reach the number of all labels, the area of each label S, the barycenter (x, y), the boundary length L, the circularity $R = 4\pi S/(L*L)$, and the inclination angle $\theta$ (secondary moment method) on the image are calculated in step S22.

Further, the above-described information obtained in step S22 is used to check whether the value of the circularity R falls within the range of the stick part of the toy (bone) or not. For example, if it is determined that the circularity R is 0.4 and falls within the range of the stick part in FIG. 6, the procedure goes to step S24 and a bone-stick detail processing is performed. The bone-stick detail processing in step S24 will be described later.

If it is determined in step S23 that the value of the circularity of a label is not within the range of the stick part of the bone and if it is determined in step S25 that this value is within the range of the neutral belt 1, the procedure goes to step S26 and a neutral belt 1 detail processing is performed. The neutral belt 1 detail processing in step S26 will also be described later.

If it is determined in step S25 that the value of circularity is not within the range of the neutral belt 1 and if it is determined in step S27 that this value is within the range of a side part of the bone, the procedure goes to step S28 and a bone side part processing is performed. The bone side part processing in step S28 will also be described later.

If it is determined in step S27 that the value of the circularity of a label is not within the range of the side part of the bone and if it is determined in step S29 that this value is within the range of the neutral belt 2, the procedure goes to step S30 and a neutral belt 2 detail processing is performed. The neutral belt 2 detail processing in step S30 will also be described later.

If it is determined in step S29 that the value of the circularity of a label is not within the range of the neutral belt 2 and if it is determined in step S31 that this value is within the range of the ball, the procedure goes to step S32 and a ball detail processing is performed. The ball detail processing in step S32 will also be described later.

If it is determined in step S29 that the value of the circularity of the label is not within the range of the neutral belt 2 and if it is determined in step S31 that this value is not within the range of the ball, the procedure goes to step S33 and an exception detail processing is performed. The exception detail processing in step S33 will also be described later.

Figure 13:
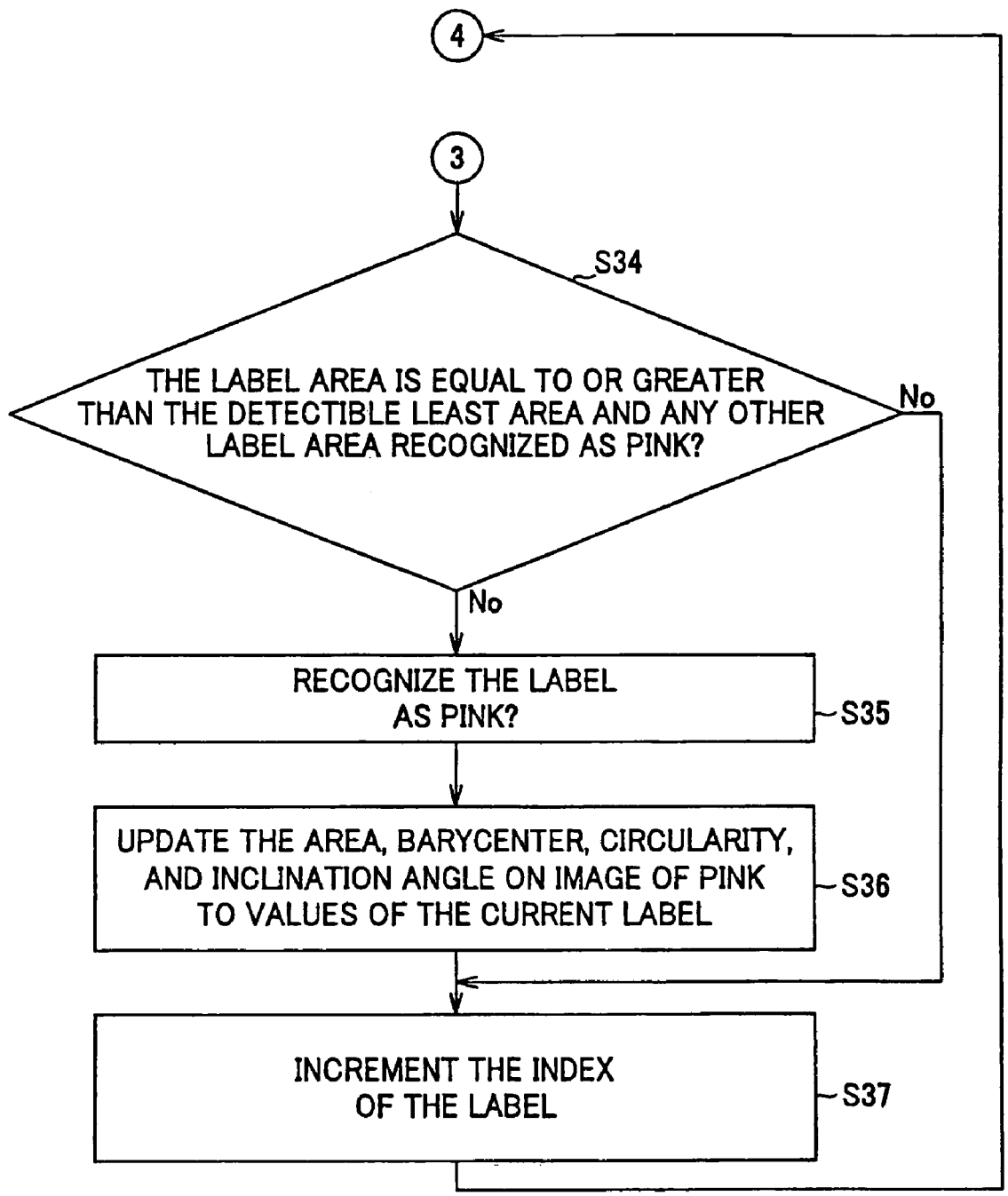
FIG. 13 is the remaining part of the flowchart of showing the label processing procedure for a bone, ball, and pink.

Upon completion of the bone stick detail processing in step S24, the neutral belt 1 detail processing in step S26, the bone side part detail processing in step S28, the neutral belt 2 detail processing in step S30, the ball detail processing in step S32, and the exception detail processing in step S33, steps S34, S35, S36, and S37 in FIG. 13 are executed and the procedure then returns to step S21. If it is determined in step S21 that processings of all the labels have been completed, the processings on each label end.

Figure 14:
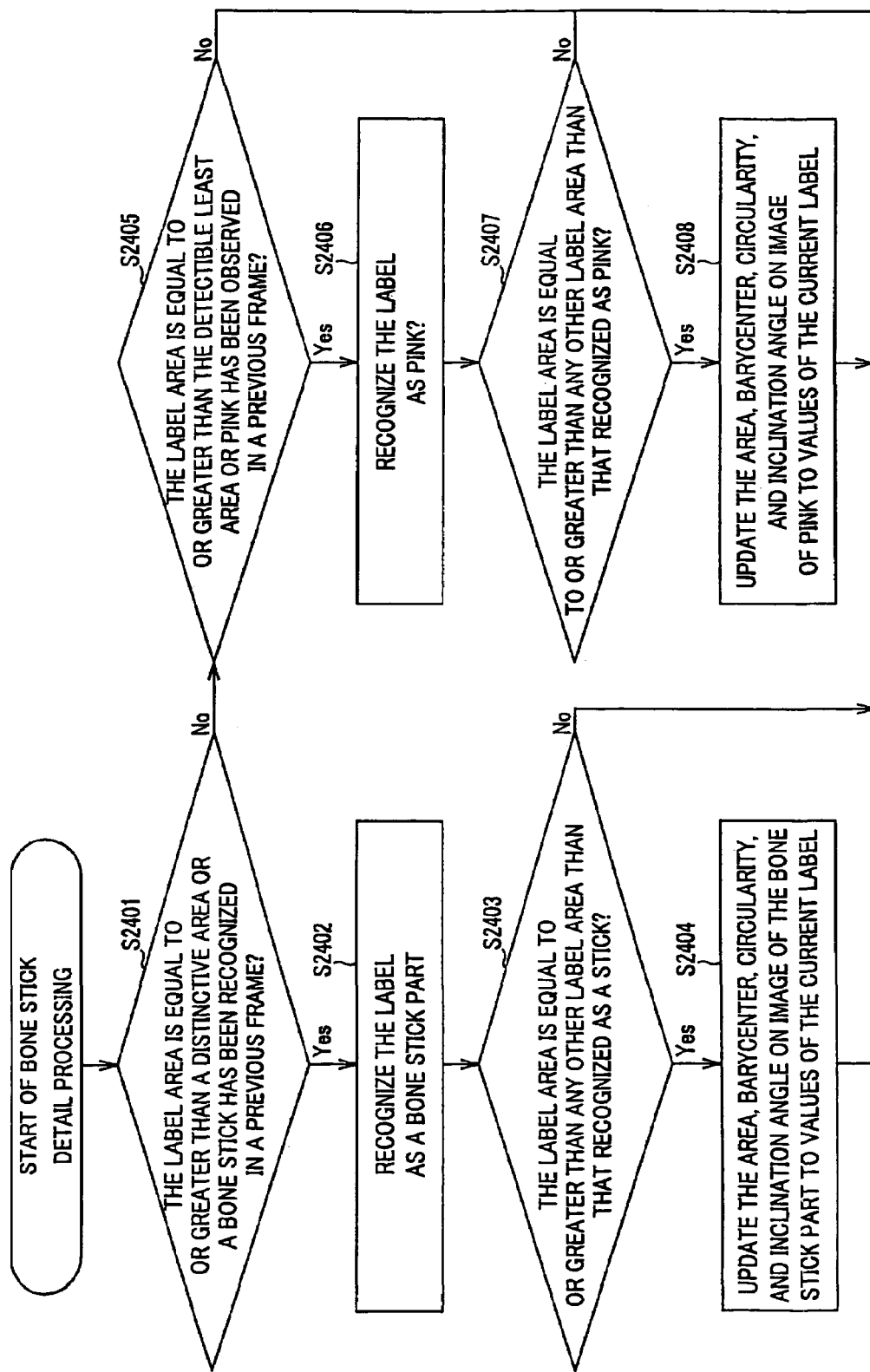
FIG. 14 is a flowchart of a bone stick detail processing procedure.

FIG. 14 shows the subroutine of the bone stick detail processing in step S24. At first, in step S2401, a determination is made on whether a condition that the label area is equal to or greater than a distinctive area (a predetermined threshold value) or a condition that the bone stick has been recognized in a preceding frame is satisfied. Although the label area S has already been calculated, it is intended to guarantee higher reliability, depending on whether or not the label area S is equal to or greater than the predetermined threshold value (for example, 50 pixels, 100 pixels, or so). If an object is distant from the robot apparatus, the object looks small to the robot apparatus. At this time, the ball and the bone are recognized erroneously. Actually, how the pixels appear when the object is 40 or 50 cm distant has been found in advance. The value thereof is used as threshold value to determine whether or not the label area S is equal to or greater than the threshold value. Thus, a situation is prepared to cause no erroneous recognition. Then, the label is recognized as the stick part of a bone (step S2402). Alternatively, it is possible to use past data (short-term memories) telling, for example, that the object was recognized as a bone in the past. Hence, it may be supposed that a person might have picked up the bone thereafter and moved the bone away from the robot apparatus. In this case, the label area is small. If it is memorized that the object has been once recognized as a bone stick in the past, the object should be recognized as a stick even if it is currently small (step S2402).

In step S2403, a determination is made on whether or not the label area is equal to or greater than any other label area than that recognized as a stick. The purpose is to compare the area of the label currently subjected to the recognition processing with the area of a processed label and to retain a greater one, if plural labels are recognized each as the stick part of a bone. If the label currently subjected to the recognition processing is greater, the area, barycenter, circularity, and inclination angle on the image of the stick part of the bone are updated by the values of the current label, in step S2404.

If it is determined in step S2401 that the label area S is not equal to or greater than the distinctive area or that no bone stick has been recognized in a previous frame, the procedure goes to step S2405. In step S2405, whether or not the label area is equal to or greater than the smallest detectable area or whether or not pink (an unconfirmed pink object) has been seen in a previous frame is determined. For example, in case where 50 pixels are recognized in step S2401 and 10 pixels are the smallest detectable area, YES is determined if the area of the label being currently observed is 20 pixels. Then, the procedure goes to step S2406 and the area is not recognized as a ball or bone but is recognized as an unconfirmed pink object. A label whose area is smaller than 10 pixels is disposed of as noise. Pink color can be recognized at most within the distance of 80 cm from the camera. This is based on a precondition that, when a pink area comes close to, for example, 40 to 50 cm from the camera, the pink area can be clearly recognized as a bone or ball. Further, in step S2407, a determination is made on whether or not the label area is equal to or greater than any other label area than the label area recognized as a pink unconfirmed object. The purpose is to compare the area of the label currently subjected to the recognition processing with the area of a processed label and to retain a greater one, if plural labels are recognized each as a pink unconfirmed object. If the label currently subjected to the recognition processing is greater, the area, barycenter, circularity, and inclination angle on the image of the pink unconfirmed object are updated by the values of the current label, in step S2407.

Figure 15:
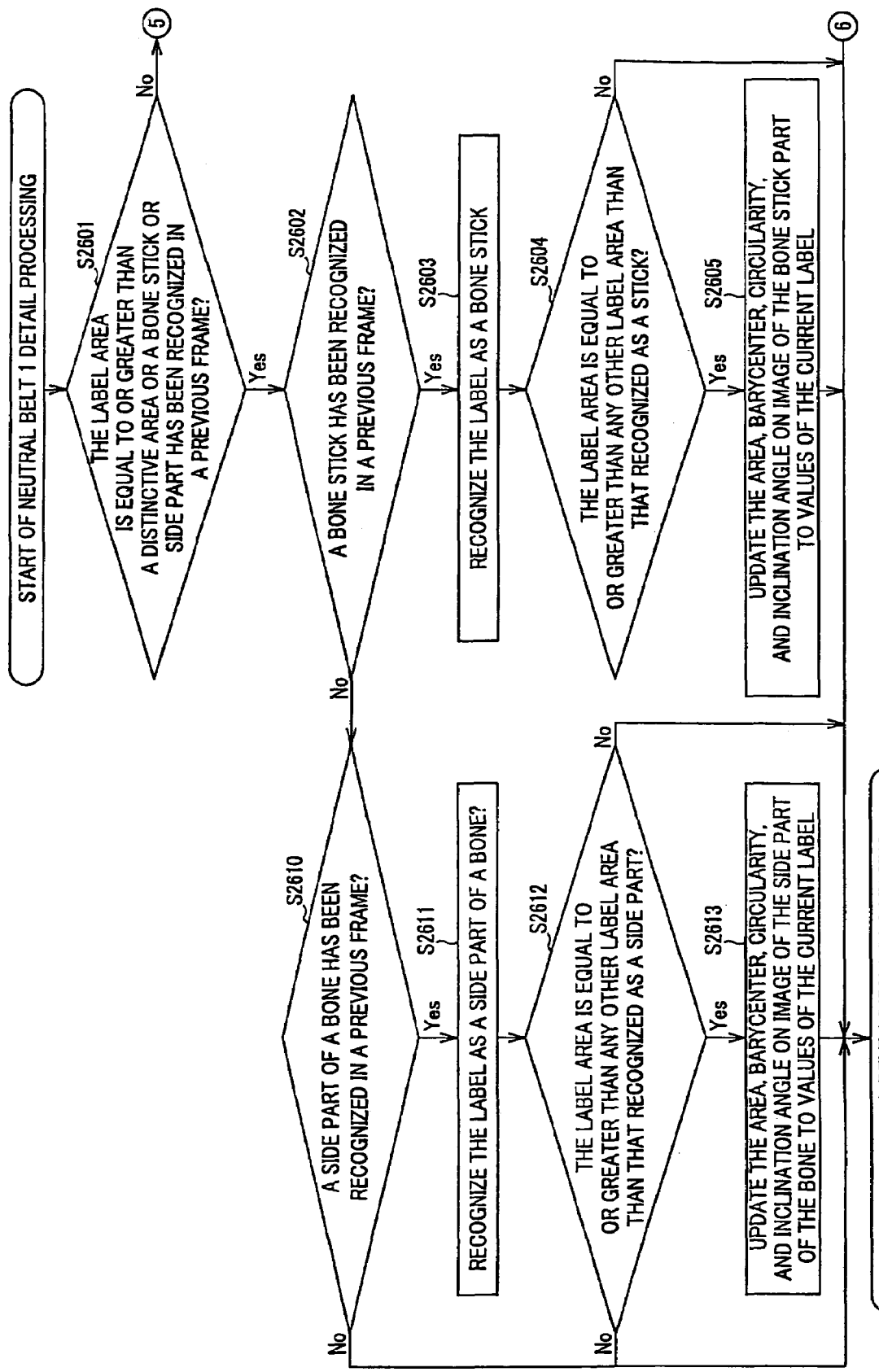
FIG. 15 is a part of a flowchart of a neutral belt 1 detail processing procedure.

Next, the subroutine of the neutral belt 1 detail processing in step S26 will be described with reference to FIG. 15 and FIG. 16. At first, whether or not the label area is equal to or greater than a distinctive area (a predetermined threshold value) or whether or not a bone stick or a side part has been recognized in a previous frame is determined. Whether or not the label area is equal to or greater than the distinctive area is determined to prepare a situation in which no erroneous recognition occurs. In addition, whether or not a bone stick or side part has been recognized in a previous frame is determined because of the reason similar to step S2401. That is, if it is memorized that an area has been once recognized as a bone stick or side part in the past, the area should be recognized as a stick or side part even if it is currently small.

In step S2602, a determination is made on whether or not a bone stick has been recognized in a previous frame. If it is determined, the procedure goes to step S2603 to recognized the label as a bone stick. In step S2604, a determination is made on whether or not the label area is equal to or greater than any other label area than that recognized as a stick. The purpose is to compare the area of the label currently subjected to the recognition processing with the area of a processed label and to retain a greater one, if plural labels are recognized each as the stick part of a bone. If the label currently subjected to the recognition processing is greater, the area, barycenter, circularity, and inclination angle on the image of the stick part of the bone are updated by the values of the current label, in step S2405.

Figure 16:
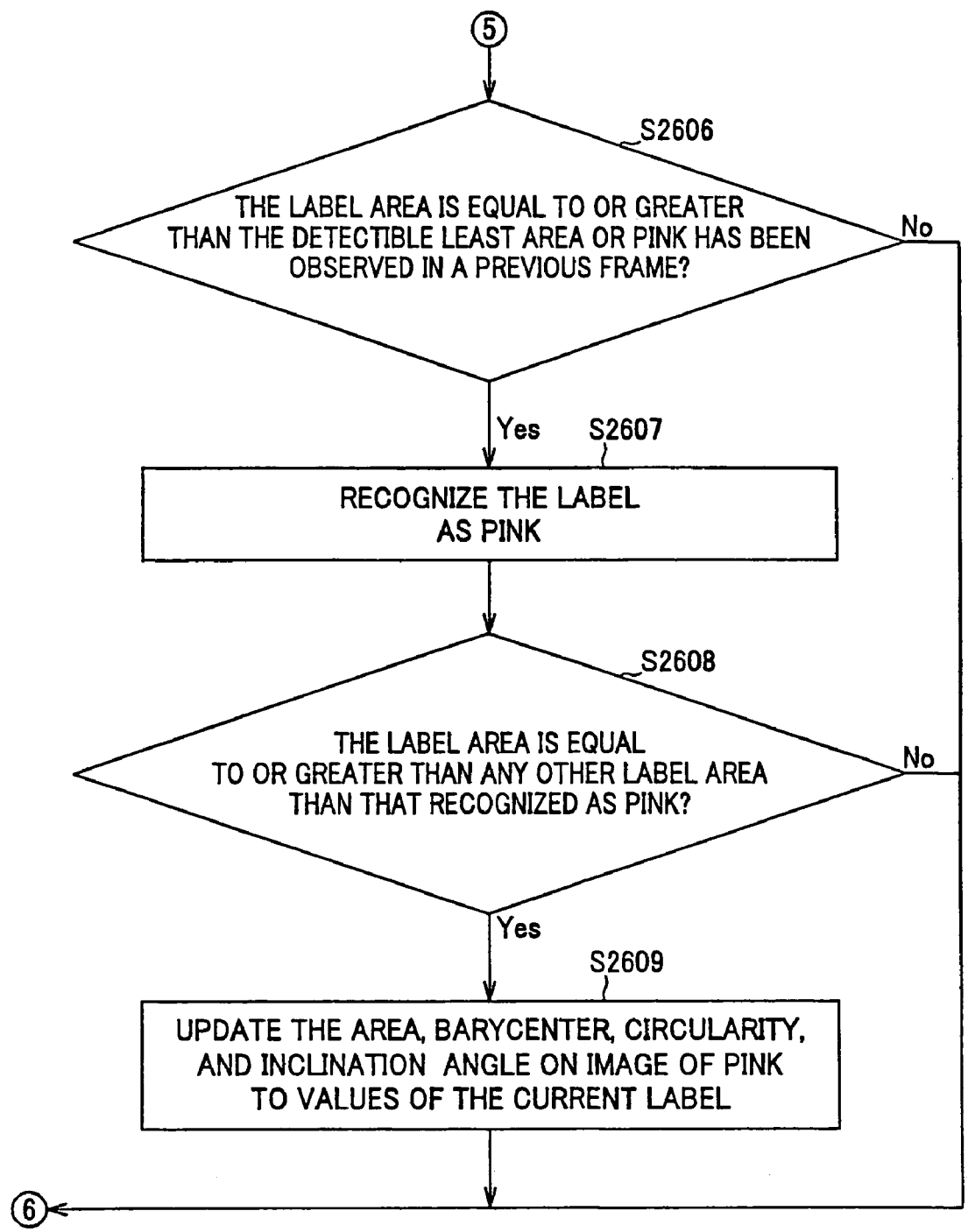
FIG. 16 is the remaining part of the flowchart of the neutral belt 1 detail processing procedure.

If it is determined in step S2601 that the label area S is not equal to or greater than the distinctive area or that neither a bone stick nor a side part has been recognized in a previous frame, the procedure goes to step S2606 in FIG. 16. Then, whether or not the label area is equal to or greater than the smallest detectable area or whether or not pink has been observed in a previous frame is determined. If it is determined in step S2606 that the label area is equal to or greater than the smallest detectable area or that pink has been observed in a previous frame, the procedure goes to step S2607 and the label is not recognized as a ball or bone but is recognized as an unconfirmed pink object. In step S2608, a determination is made on whether or not the label area is equal to or greater than any other label area than the label area recognized as a pink unconfirmed object. The purpose is to compare the area of the label currently subjected to the recognition processing with the area of a processed label and to retain a greater one, if plural labels are recognized each as a pink unconfirmed object. If the label currently subjected to the recognition processing is greater, the area, barycenter, circularity, and inclination angle on the image of the pink unconfirmed object are updated by the values of the current label, in step S2609.

If it is determined in step S2602 that no bone stick has not been recognized in a previous frame, the procedure goes to step S2610 to determine whether or not a side part of a bone has been recognized. If a side part of a bone has been recognized in a previous frame, the procedure goes to step S2611 and the label is recognized as a side part of a bone. In step S2612, a determination is made on whether or not the label area is equal to or greater than any other label area than the label area recognized as a side part. The purpose is to compare the area of the label currently subjected to the recognition processing with the area of a processed label and to retain a greater one, if plural labels are recognized each as a side part. If the label currently subjected to the recognition processing is greater, the area, barycenter, circularity, and inclination angle on the image of the side part of the bone are updated by the values of the current label, in step S2613. If the processings in steps S2605, S2609, and S2613 are completed or if NO is determined in each of branch processings in steps S2601, S2604, S2606, S2608, S2610, and S2612, the neutral belt 1 detail processing ends.

Figure 17:
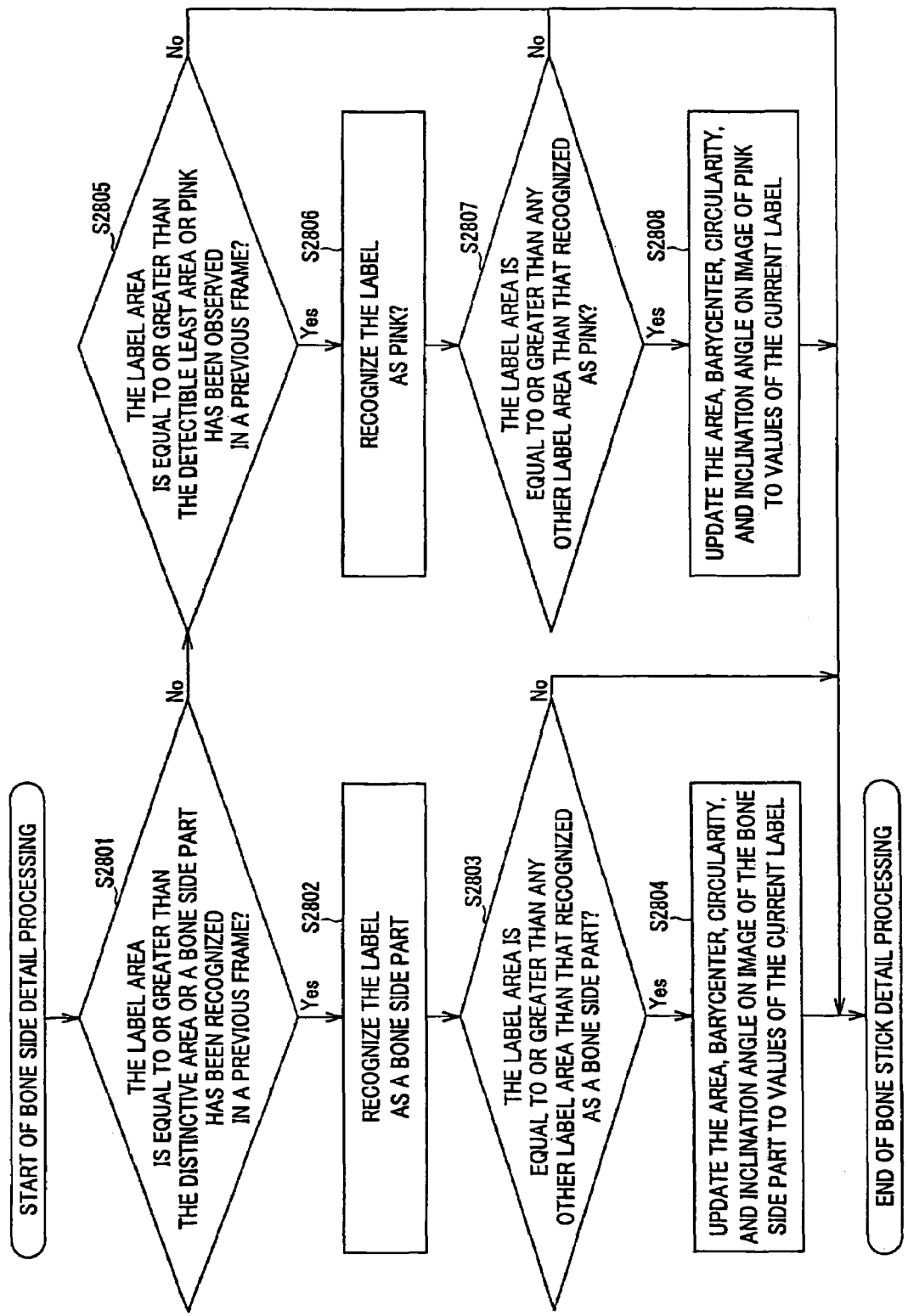
FIG. 17 is a part of a flowchart of a bone side detail processing procedure.

Next, with reference to FIG. 17, the subroutine of the bone side detail processing in step S28 will be described. At fist, in step S2801, whether or not the label area is equal to or greater than a distinctive area (a predetermined threshold value) or whether or not a side part has been recognized in a previous frame is determined. Whether or not the label area is equal to or greater than the distinctive area is determined to prepare a situation in which no erroneous recognition occurs because of the reason similar to step S2401. In addition, whether or not a side part of a bone has been recognized in a previous frame is determined because of the reason similar to step S2401. That is, if it is memorized that an area has been once recognized as a side part of a bone in the past, the area should be recognized as a side part even if it is currently small.

In step S2802, the label is recognized as a side part of a bone. In step S2803, a determination is made on whether or not the label area is equal to or greater than any other label area than the label area recognized as a side part. This is a processing performed when plural labels are recognized each as a side part. If the label currently subjected to the recognition processing is greater, the area, barycenter, circularity, and inclination angle on the image of the side part of the bone are updated by the values of the current label, in step S2804.

If it is determined in step S2601 that the label area S is not equal to or greater than the distinctive area or that no side part of a bone has been recognized in a previous frame, the procedure goes to step S2805. Then, whether or not the label area is equal to or greater than the smallest detectable area or whether or not pink has been observed in a previous frame is determined. If it is determined in step S2805 that the label area is equal to or greater than the smallest detectable area or that pink has been observed in a previous frame, the procedure goes to step S2806 and the label is not recognized as a ball or bone but is recognized as an unconfirmed pink object. In step S2807, a determination is made on whether or not the label area is equal to or greater than any other label area than the label area recognized as a pink unconfirmed object. This is a processing performed when plural labels are recognized each as a pink unconfirmed object. If the label currently subjected to the recognition processing is greater, the area, barycenter, circularity, and inclination angle on the image of the pink unconfirmed object are updated by the values of the current label, in step S2808.

Figure 18:
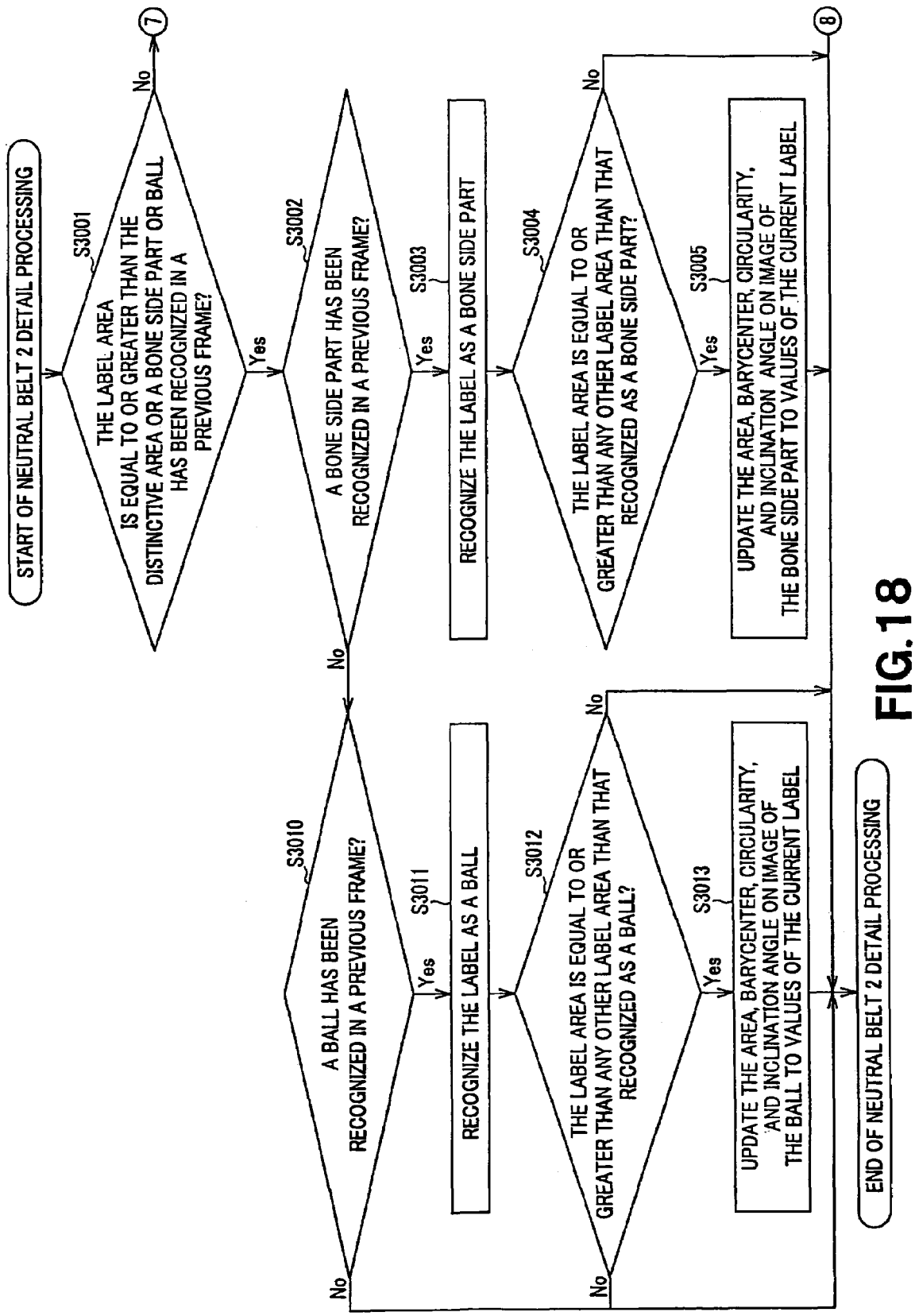
FIG. 18 is a part of a flowchart of a neutral belt 2 detail processing procedure.

Next, the subroutine of the neutral belt 2 detail processing in step S30 will be described with reference to FIG. 18 and FIG. 19. At first, whether or not the label area is equal to or greater than a distinctive area (a predetermined threshold value) or whether or not a side part of a bone has been recognized in a previous frame is determined in step S3001.

In step S3002, whether or not a side part of a bone has been recognized in a previous frame is determined. If it is determined positively, the procedure goes to step S3003 and the label is recognized as a side part of a bone. In step S3004, a determination is made on whether or not the label area is equal to or greater than any other label area than the label area recognized as a side part of a bone. This is a processing performed when plural labels are recognized each as a side part of a bone. If the label currently subjected to the recognition processing is greater, the area, barycenter, circularity, and inclination angle on the image of the side part of the bone are updated by the values of the current label, in step S3005.

Figure 19:
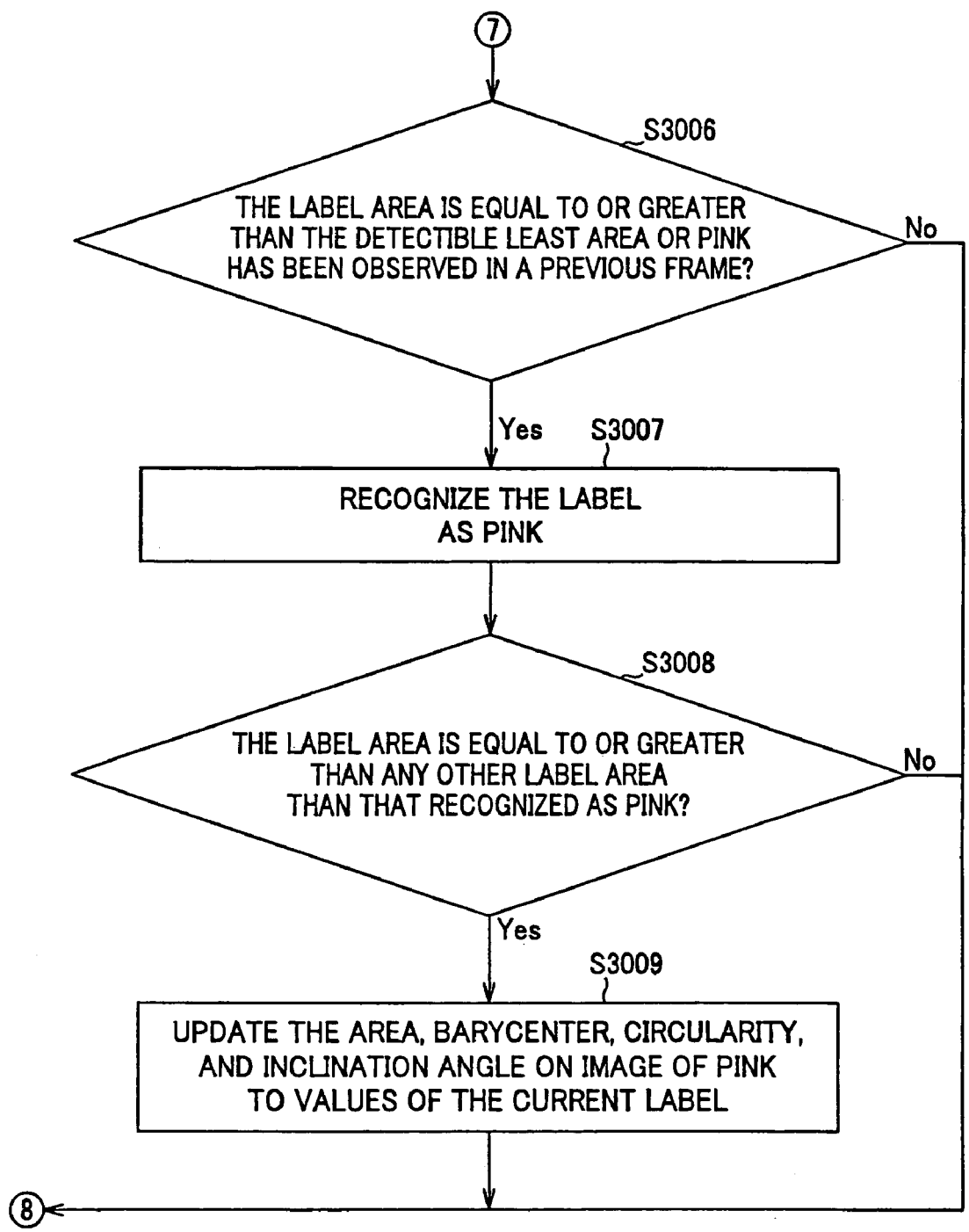
FIG. 19 is the remaining part of the flowchart of the neutral belt 2 detail processing procedure.

If it is determined in step S3001 that the label area S is not equal to or greater than the distinctive area or that neither a side part of a bone nor a ball has been recognized in a previous frame, the procedure goes to step S3006 in FIG. 19. Then, whether or not the label area is equal to or greater than the smallest detectable area or whether or not pink has been observed in a previous frame is determined. If it is determined in step S3006 that the label area is equal to or greater than the smallest detectable area or that pink has been observed in a previous frame, the procedure goes to step S3007 and the label is not recognized as a ball or bone but is recognized as an unconfirmed pink object. In step S3008, a determination is made on whether or not the label area is equal to or greater than any other label area than the label area recognized as a pink unconfirmed object. This is a processing performed when plural labels are recognized each as a pink unconfirmed object. If the label currently subjected to the recognition processing is greater, the area, barycenter, circularity, and inclination angle on the image of the pink unconfirmed object are updated by the values of the current label, in step S3009.

If it is determined in step S3002 that no side part of any bone has not been recognized in a previous frame, the procedure goes to step S3010 to determine whether or not a ball has been recognized in a previous frame. If a ball has been recognized in a previous frame, the procedure goes to step S3011 and the label is recognized as a ball. In step S3012, a determination is made on whether or not the label area is equal to or greater than any other label area than the label area recognized as a ball. This is a processing performed when plural labels are recognized each as a ball. If the label currently subjected to the recognition processing is greater, the area, barycenter, circularity, and inclination angle on the image of the ball are updated by the values of the current label, in step S3013. If the processings in steps S3005, S3009, and S3013 are completed or if NO is determined in each of branch processings in steps S3001, S3004, S3006, S3008, S3010, and S3012, the neutral belt 2 detail processing ends.

Figure 20:
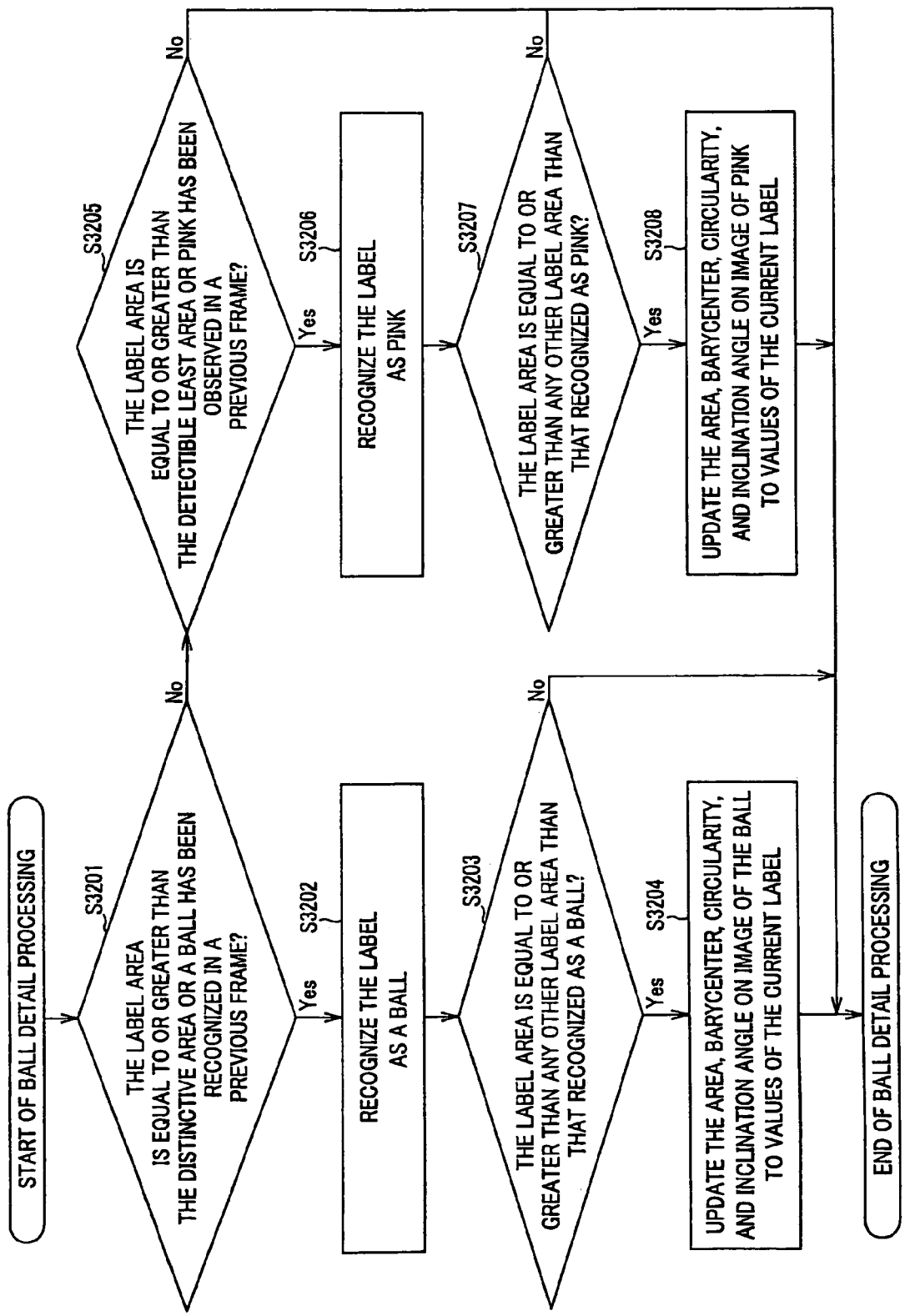
FIG. 20 is a flowchart of a ball detail processing procedure.

Next, with reference to FIG. 20, the subroutine of the ball detail processing in step S32 will be described. At first, in step S3201, whether or not the label area is equal to or greater than a distinctive area (a predetermined threshold value) or whether or not a ball has been recognized in a previous frame is determined. Whether or not the label area is equal to or greater than the distinctive area is determined to prepare a situation in which no erroneous recognition occurs because of the reason similar to step S2401. In addition, whether or not a ball has been recognized in a previous frame is determined because of the reason similar to step S2401. That is, if it is memorized that an area has been once recognized as a ball in the past, the area should be recognized as a ball even if it is currently small.

In step S3202, the label is recognized as a ball. In step S3203, a determination is made on whether or not the label area is equal to or greater than any other label area than the label area recognized as a ball. This is a processing performed when plural labels are recognized each as a ball. If the label currently subjected to the recognition processing is greater, the area, barycenter, circularity, and inclination angle on the image of the side part of the ball are updated by the values of the current label, in step S3204.

If it is determined in step S3201 that the label area S is not equal to or greater than the distinctive area or that no ball has been recognized in a previous frame, the procedure goes to step S3205. Then, whether or not the label area is equal to or greater than the smallest detectable area or whether or not pink has been observed in a previous frame is determined. If it is determined in step S3205 that the label area is equal to or greater than the smallest detectable area or that pink has been observed in a previous frame, the procedure goes to step S3206 and the label is not recognized as a ball or bone but is recognized as an unconfirmed pink object. In step S3207, a determination is made on whether or not the label area is equal to or greater than any other label area than the label area recognized as a pink unconfirmed object. This is a processing performed when plural labels are recognized each as a pink unconfirmed object. If the label currently subjected to the recognition processing is greater, the area, barycenter, circularity, and inclination angle on the image of the pink unconfirmed object are updated by the values of the current label, in step S3208.

Figure 21:
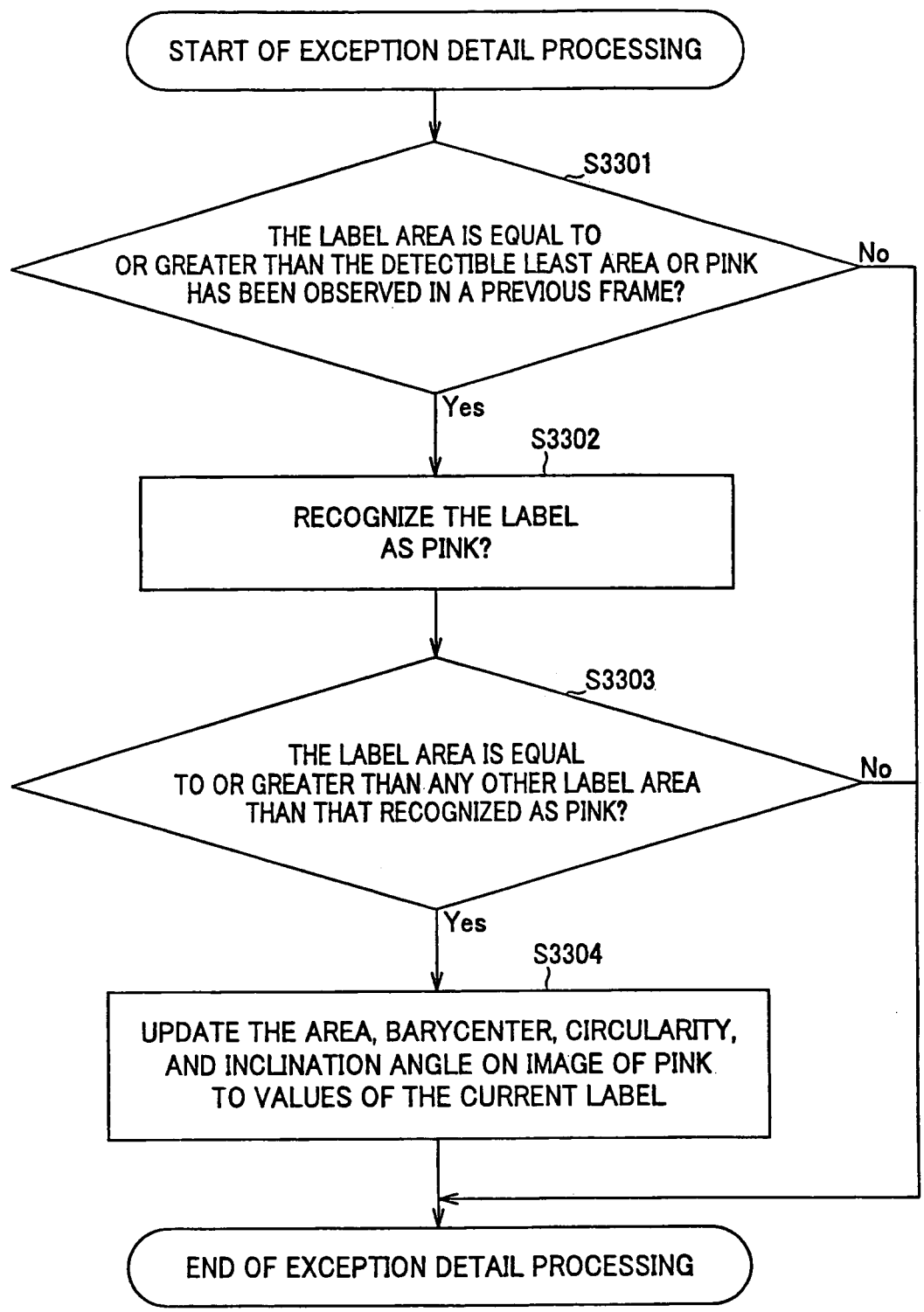
FIG. 21 is a flowchart of an exception detail processing procedure.

Next, with reference to FIG. 21, the subroutine of the exception detail processing in step S33 will be described. In step S3301, whether or not the label area is equal to or greater than the smallest detectable area or whether or not pink has been observed in a previous frame is determined. If it is determined in step S3301 that the label area is equal to or greater than the smallest detectable area or that pink has been observed in a previous frame, the procedure goes to step S3302 and the label is not recognized as a ball or bone but is recognized as an unconfirmed pink object. In step S3303, a determination is made on whether or not the label area is equal to or greater than any other label area than the label area recognized as a pink unconfirmed object. This is a processing performed when plural labels are recognized each as a pink unconfirmed object. If the label currently subjected to the recognition processing is greater, the area, barycenter, circularity, and inclination angle on the image of the pink unconfirmed object are updated by the values of the current label, in step S3304.

As described above, the bone-stick detail processing (step S24 in FIG. 12), the neutral belt 1 detail processing (step S26), the bone-side part detail processing (step S28), the neutral belt 2 detail processing (step S30), the ball detail processing (step S32), and the exception detail processing (step S33) are each completed, so the label area is classified into any of these categories. Then, the procedure goes to step S34 in FIG. 12. In step S34, a determination is made on whether or not the label area is equal to or greater than any other label area than the label area recognized as being equal to or greater than the smallest detectable area and being pink. This is a processing performed when plural labels are recognized each as a pink unconfirmed object. If the label currently subjected to the recognition processing is greater, the label is recognized as a pink unconfirmed object, in step S35, and the area, barycenter, circularity, and inclination angle on the image of the pink unconfirmed object are updated by the values of the current label, in step S36. The processing form step S34 to S37 is effective for the case where an instruction is given to simply track a pink item. This simply depends on the color of pink, regardless of the shape. Further in step S37, the index of the label is incremented, and the procedure returns to the processing in step S21.

After returning to FIG. 11, the processing from step S15 is carried out. At first, in step S15, an on/off processing based on time hysteresis is executed. When a bone is observed in an image frame, the application software side is not notified of this observation of a bone, at this time point. Time hysteresis is given. Suppose that, for example, a bone has come to be observed from a situation where no bone was observed. The observation of the bone is not notified before the bone is kept observed in three continuous frames or more. Inversely, suppose that a bone has disappeared from a situation where the bone was observed. The disappearance of the bone is notified after three frames or more continue after the bone has disappeared. For example, the frame rate is 30 fps where it is fast, or the frame rate is 15 fps where the CPU is executing another processing. Three frames are used for hysteresis.

Next in step S16, the calculation results of a stick and a side part are synthesized into a bone, based on the areas thereof. This is a processing which uses one of the stick and the side part which has a greater area, to recognize a bone. In step S17, the bone, ball, and pink unconfirmed object are each converted onto a camera coordinate system and a robot coordinate system. Conversion is carried out such that the height direction can be apparently understood, advantageously for determining how the bone, ball, and object are placed on the floor.

Next in step S18, whether or not the bone is placed standing vertically is determined, based on height information. Since the conversion processing in step S17 bases the determination, whether the bone is placed standing vertically or lying horizontally can be determined. The "vertically" means the state shown in FIG. 3B, and "horizontally" means the states as shown in FIG. 3A, FIG. 3C, or FIG. 3D. In FIG. 3A, FIG. 3C, and FIG. 3D showing the horizontal placement, respectively, the bone is placed obliquely, transversely, and longitudinally with respect to the robot apparatus. Therefore, the robot apparatus changes its behavior, e.g., keeps walking, tracks, barks, or the like, depending on which of the states of FIG. 3A and FIG. 3D the bone is in. Further in step S19, recognition results of the bone, ball, and pink unconfirmed object are provided for the application software.

The application software includes processings for going up closely, tracking, picking on the head, kicking down, and biting to hold in mouth. In the present embodiment, this series of processings will be described together as a control algorithm for biting to holding a bone. This bone-bite control algorithm includes a bite-detection algorithm.

Figure 27:
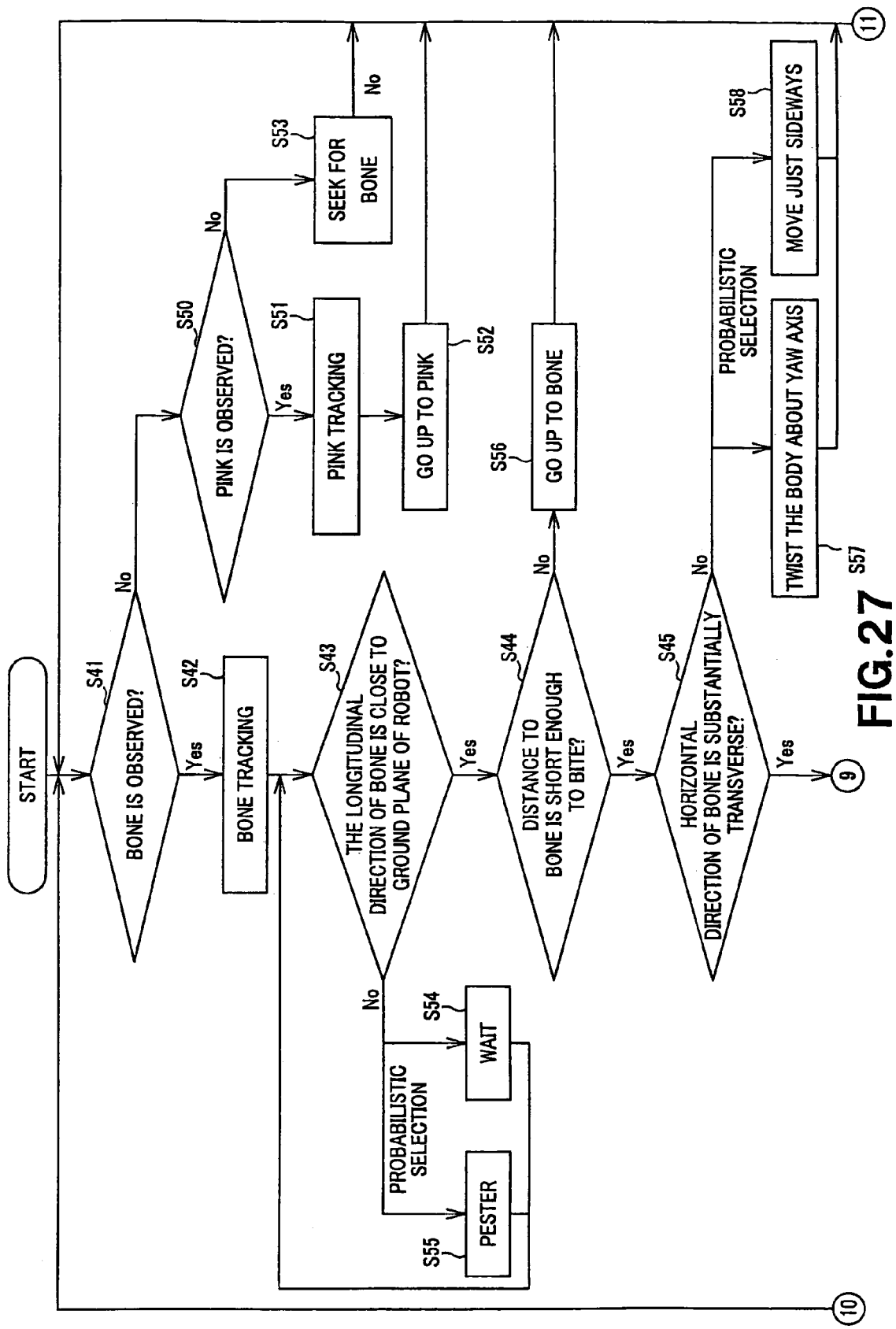
FIG. 27 is a part of a flowchart showing a processing procedure of a bone-bite control algorithm.

Next, with reference to FIG. 27 and FIG. 28, a description will be made of the bone-bite control algorithm on which the robot apparatus finds a bone, walks up to and tracks the bone, picking the bone on the head, kicking down the bone, or bites the bite part 203. The results of recognizing a bone, a ball, and a pink unconfirmed object according to the image recognition processing program are taken over, and the processings from step S41 are performed. At first, whether or not a bone is observed is determined in step S41. If no bone is observed, the procedure goes to step S50 and whether or not a pink unconfirmed object is observed is determined. Otherwise, if a bone is observed, tracking is carried out in step S51. This is control to chase what is observed, to be caught at the center of the image. Then, the robot apparatus goes up to the pink unconfirmed object (step S52) and returns to step S41.

If a bone is observed in step S41, the robot apparatus tracks the bone in step S42, and goes up to the bone, keeping the bone in the center of the image. In step S43, whether or not the vertical direction of the bone is close to the ground plane of the robot apparatus is determined. This is a processing to detect whether or not the bone is placed on a plane at a height substantially equal to the walking plane of the robot apparatus. If the bone is positioned on a plane at the substantially equal height, the procedure goes to step S44, and whether or not the distance to the bone is short enough to bite it is determined. Otherwise, if it is determined in step S43 that the bone is not placed on a plane at the height substantially equal to the walking plane of the robot apparatus. The robot apparatus waits in step S54 or begs that "give me a bone" in step S55. The processings in steps S54 and S55 are selected based on probability. Probability is calculated based on the processing made in the past, and a selection is carried out based on the probability.

If it is determined in step S44 that the distance to the bone is short enough to bite the bone, the procedure goes to step S45 and whether or not the horizontal direction (the longer-axis direction) of the bone is situated substantially transverse (to the frontal direction of the robot apparatus) is determined. If it is determined that the horizontal direction of the bone is situated substantially transverse, the procedure goes to step S46 in FIG. 28. If it is determined in step S45 that the horizontal direction of the bone is not situated substantially transverse, the robot apparatus rotates the body part to turn about the yaw axis of the body part in step S57, or moves just sideways and turns the direction of the robot apparatus itself in step S58, and the procedure then returns to step S41. The processings in steps S57 and S58 are selected based on probabilities.

Figure 28:
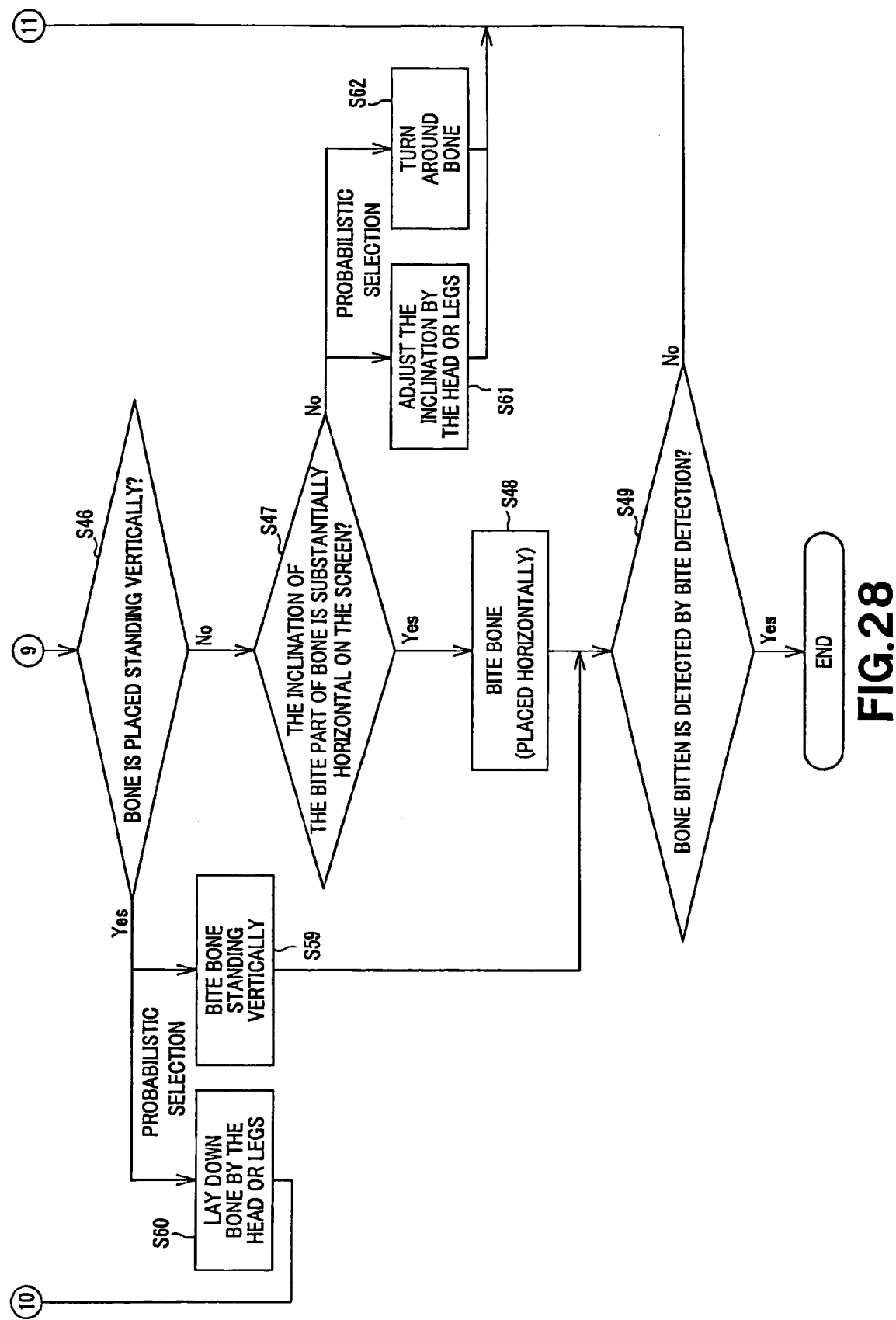
FIG. 28 is the remaining part of the flowchart showing the processing procedure of the bone-bite control algorithm.

Next, in step S46 in FIG. 28, a determination is made on whether or not the bone is placed standing vertically. If it is determined that the bone is placed vertically as in the state of FIG. 3B, the robot apparatus bites and holds the bone standing vertically in step S59 or lays down the bone by picking it on the head or leg in step S60. After the robot apparatus bites and holds the vertically standing bone in step S59, the procedure goes to step S49 described later. Alternatively, if the bone is laid down by the head or leg in step S60, the procedure returns to step S41. The processings in steps S59 and S60 are selected also based on probability.

If it is determined in step S46 that the bone is not placed standing vertically, the procedure goes to step S47, and whether or not the inclination of the bite part of the bone is substantially horizontal on the screen is determined. That is, whether the bone is in the state shown in FIG. 3C or not is determined. If the bite part is determined as being substantially horizontal on the screen, the procedure goes to step S48 and the robot apparatus bites the bone placed laterally. Otherwise, if it is determined in step S47 that the bite part is not substantially horizontal on the screen, the inclination is adjusted by the head or leg in step S61. Alternatively, the robot apparatus turns about the bone in step S62 and the procedure then returns to step S41. The processings in steps S61 and S62 are selected based on probability.

After the bone placed thus horizontally is bitten in step S48 or after the bone standing vertically is bitten in step S59, whether the bone bitten and held is recognized or not is determined in step S49. This bite detection processing will be described in detail later.

Next, with reference to FIG. 29A to FIG. 29C, FIG. 30A to FIG. 30E, and FIG. 31A to FIG. 31D, a description will be made of specific examples of interactions of the robot apparatus which is carried out by the control algorithm described above.

Figures 29A, 29B, 29C:
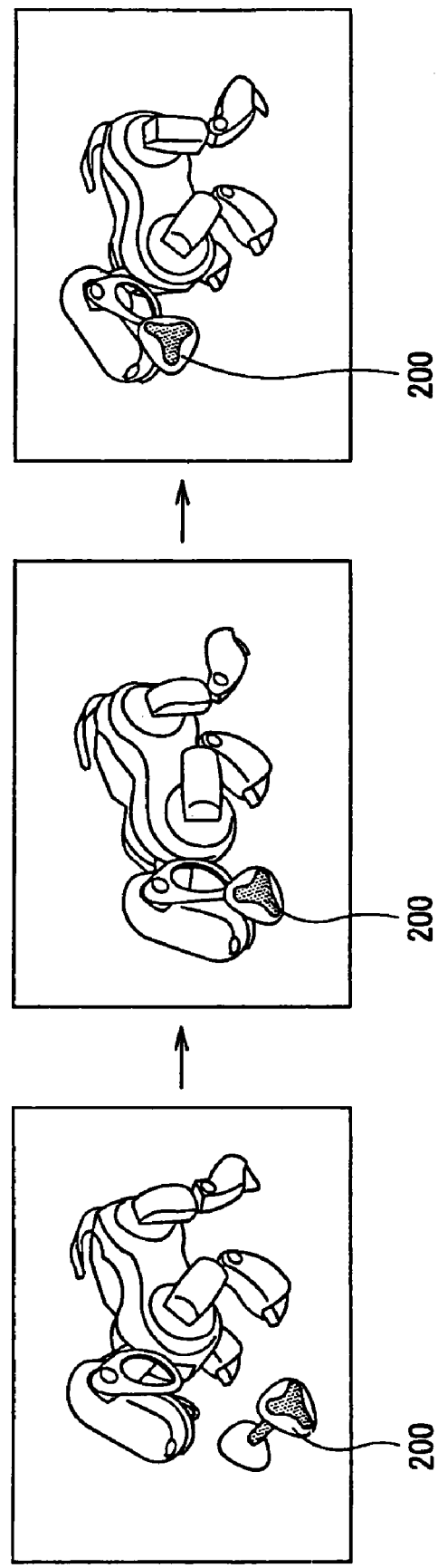
FIG. 29A to FIG. 29C are views showing an interaction example of the robot apparatus biting a bone placed horizontally.
Figures 31A, 31B, 31C, 31D:
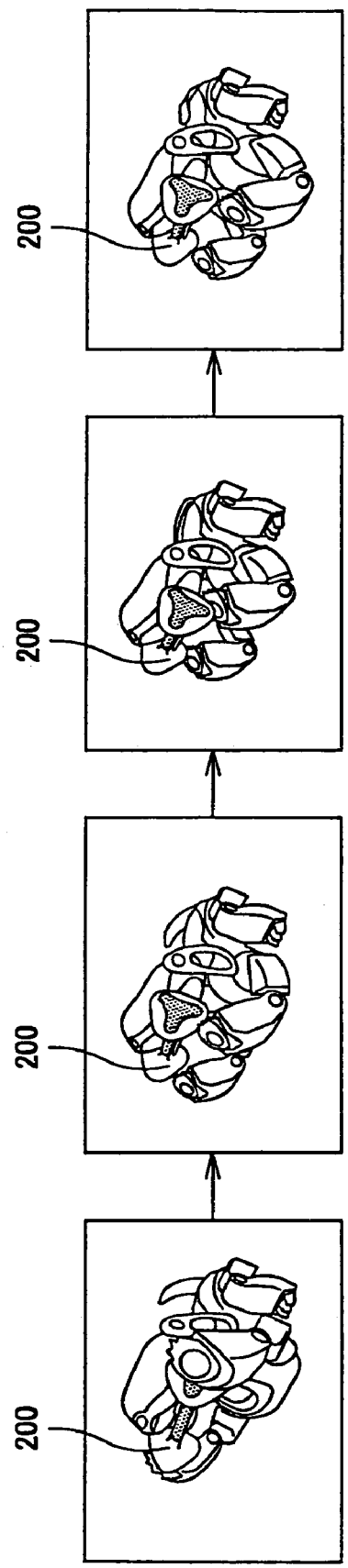
FIG. 31A to FIG. 31D are views showing another interaction example of the robot apparatus.

In the first example, the robot apparatus goes up to bite the horizontally (and transversely) placed bone (FIG. 29A) and crouches down and bites the bone (FIG. 29B). The robot apparatus thus successfully bites the bone placed horizontally (FIG. 29C). To explain this example along the flowcharts shown in FIG. 27 and FIG. 28, the horizontal direction of the bone is determined to be substantially transverse in step S45. Then in step S46, the bone is determined as not standing vertically. In step S47, it is determined that the bite part of the bone is not inclined but is substantially horizontal (i.e., transverse to the robot apparatus). In step S48, the robot apparatus crouches and bites the bone placed horizontally (i.e., transversely to the robot apparatus). Further, the bone is recognized as having been bitten and held through the bite detection processing in step S49, and the procedure ends.

If the bone is placed standing vertically on the floor, the robot apparatus twists its body (FIG. 30A), comes close to the vertically standing bone (FIG. 30B), and bites the vertically standing bone from the side (FIG. 30C). After biting the bone, the robot apparatus returns its body (FIG. 30D), and thus successfully bites and holds the vertically standing bone (FIG. 30E). This is another specific example. To explain this example, along the flowcharts shown in FIG. 27 and FIG. 28, the horizontal direction of the bone is determined to be substantially transverse in step S45. In step S46, it is determined that the bone is placed standing vertically. Then in step S59, the bone standing vertically is bitten. In step S49, it is recognized that the bone has been bitten and held, through the detection processing, and the procedure ends.

In further another specific example of interaction, as shown in FIG. 31A to FIG. 31D, the robot apparatus may make the following actions after biting the bone. That is, the robot apparatus may adjust the bone with legs (FIG. 31A), rub the side parts of the bone with the legs (FIG. 31B), or rotate the bone (FIG. 31C or FIG. 31D where the timing is matched).

Alternatively, after biting the bone, the robot apparatus may make an action of going up to a person and passing the bone. Voice recognition is adopted to recognize words and phrases such as "bring", "pick up", "give me", and the like. A series of processings for passing the bone are carried out by going up to the sound source, detecting a face by image processing, getting close to the face, and detecting a voice word of "good", a stroke (contact), a preferable distance, or the like.

Alternatively, it is possible to make the bone stand on the waling plane or throw the bone by a body reaction or by the legs. It is further possible to hit a ball with the bone held, roll the bone once held, or put the bone out of the mouth and hold it on a hand (or two hands).

Figure 32:
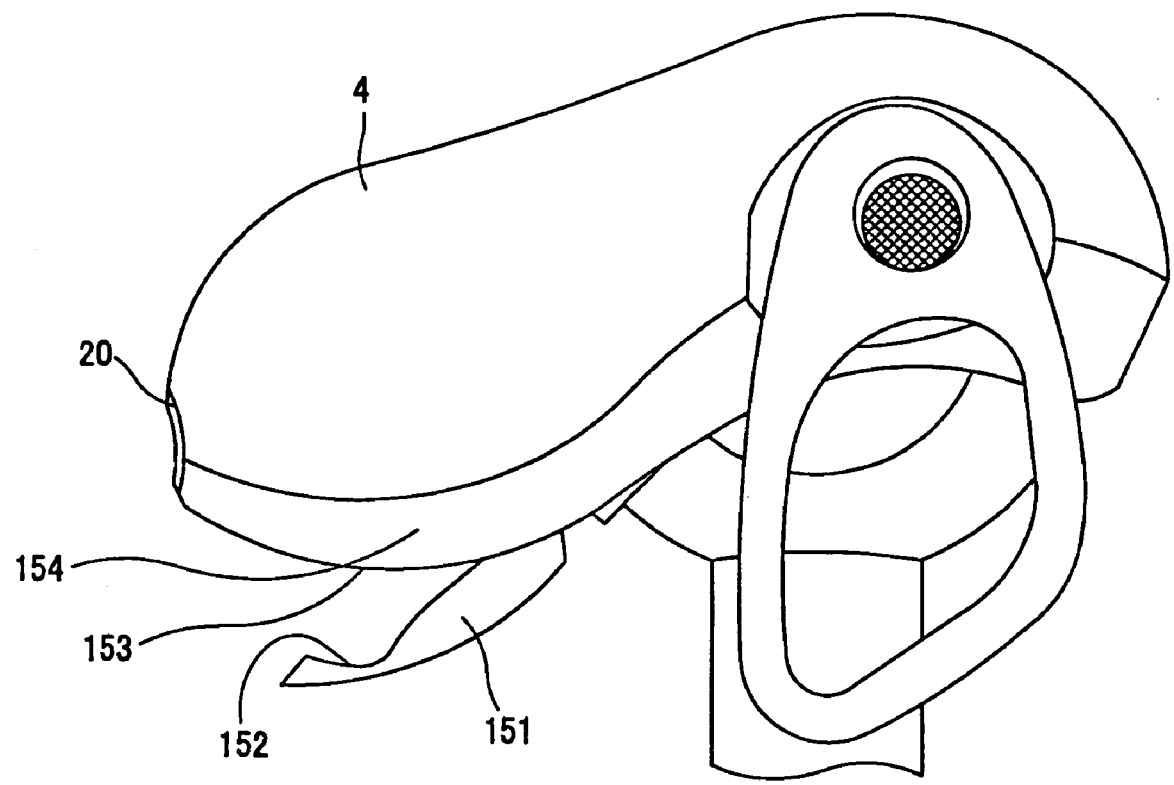
FIG. 32 is a side view for explaining the structure of a mouth (jaws) of the robot apparatus for biting a bone.
Figure 33:
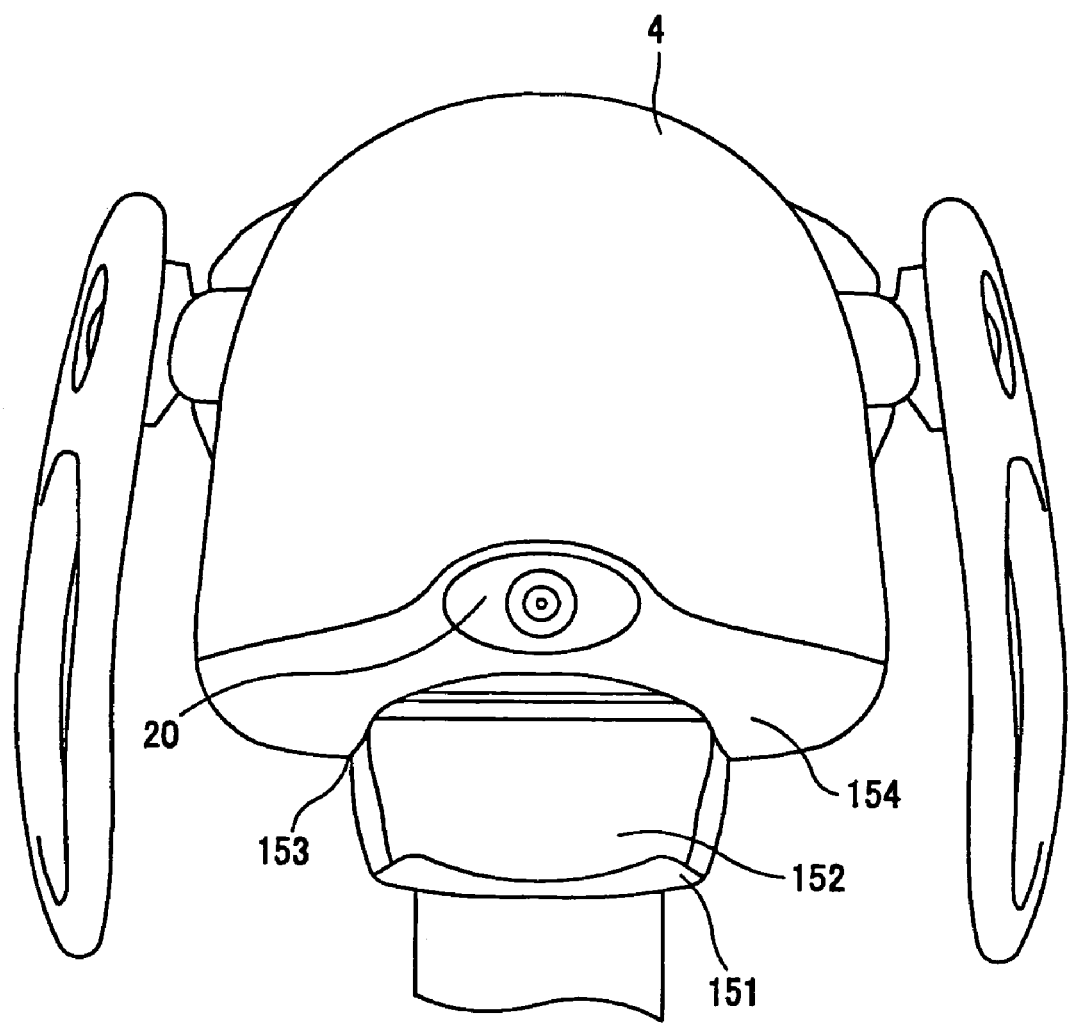
FIG. 33 is a front view for explaining the structure of the mouth (jaws) of the robot apparatus for biting a bone.
Figure 34:
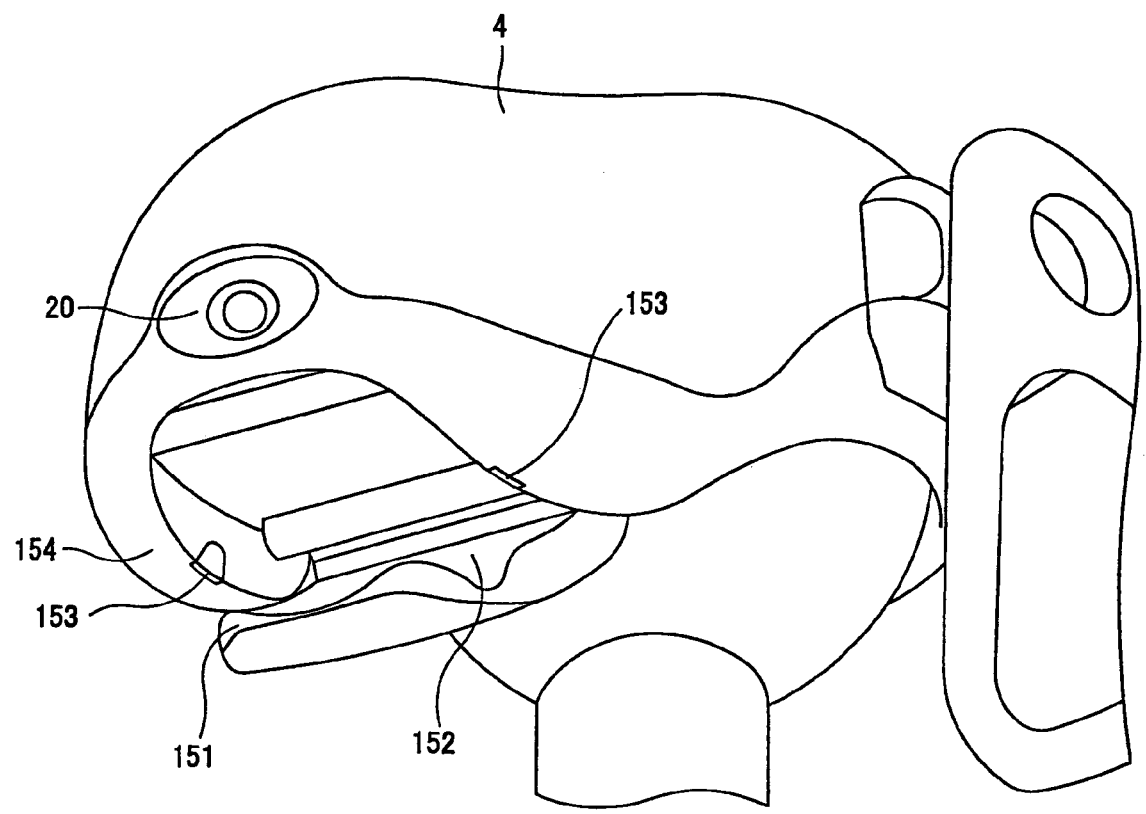
FIG. 34 is a perspective view for explaining the structure of the mouth (jaws) of the robot apparatus for biting a bone.
Figure 35:
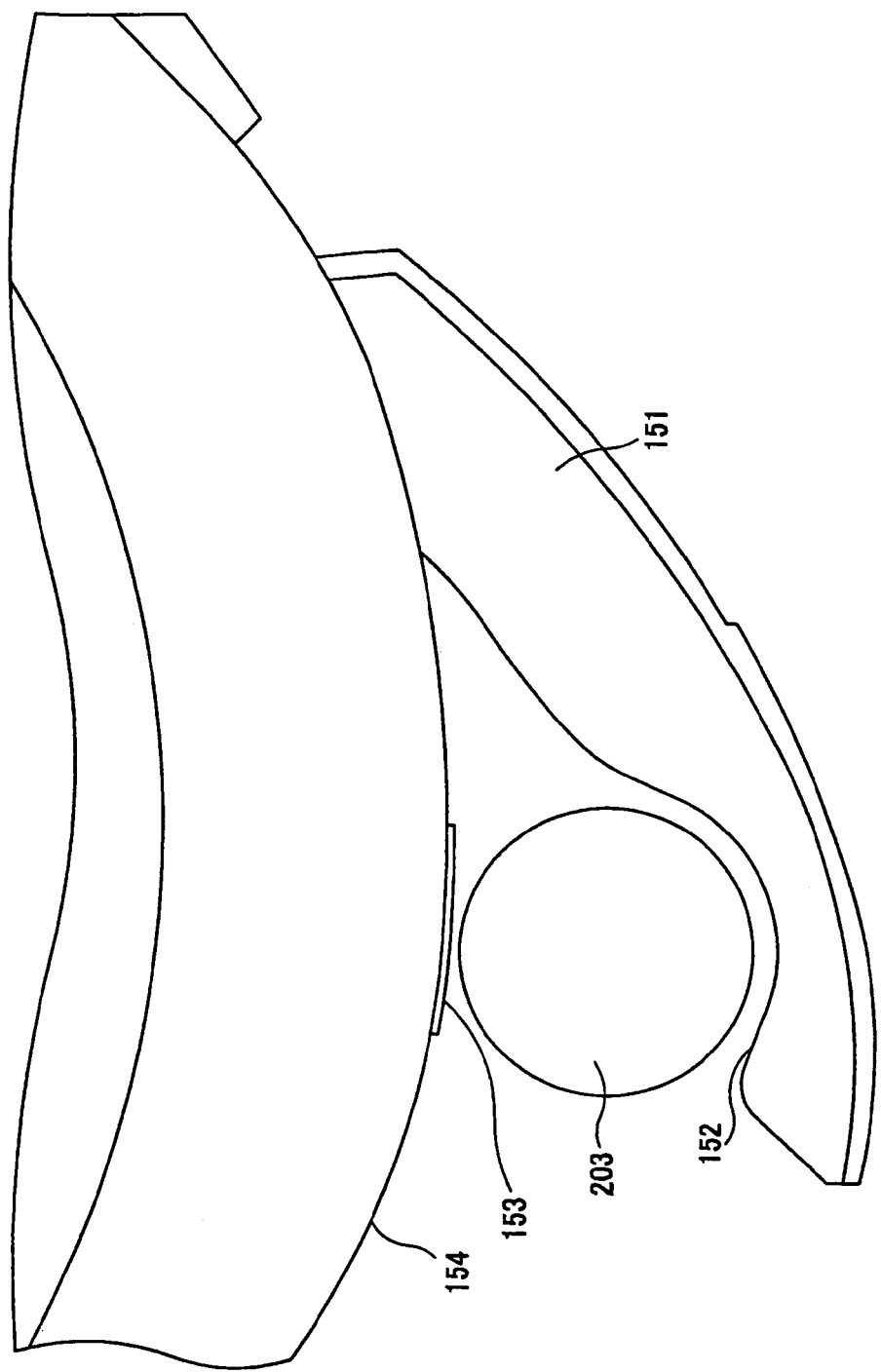
FIG. 35 is a side view for explaining a main part of the mouth (jaws) of the robot apparatus for biting a bone.
Figure 36:
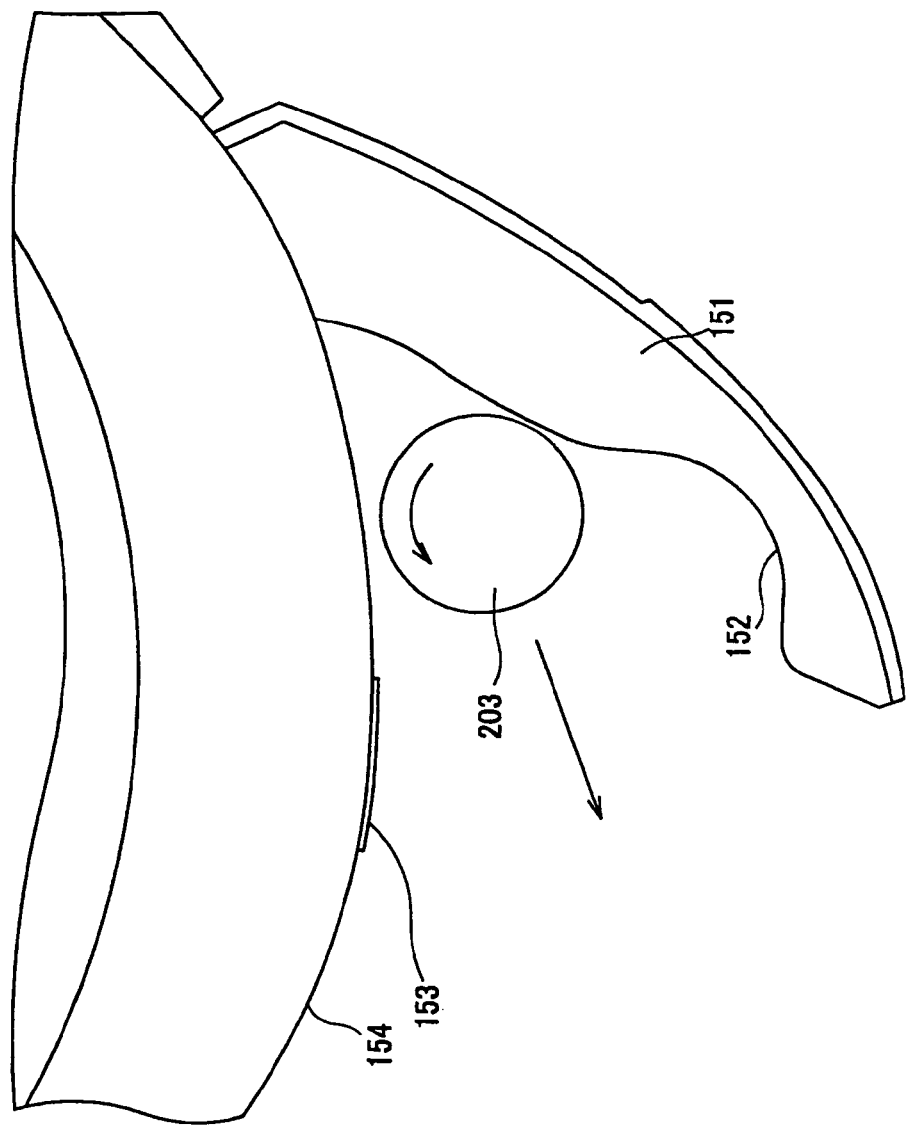
FIG. 36 is a side view for explaining the main part of the mouth (jaws) of the robot apparatus for biting a bone.

Next, the structure of the mouth (jaws) of the head unit 4 of the robot apparatus 1 will be described. As the robot apparatus takes an action of biting and holding up the bite part 203 of the bone 200, the structure of the mouth has a certain technical feature. As shown in FIG. 32 to FIG. 34, the robot apparatus has a lower jaw part 151 which is rotatable vertically, at the front lower end of the head unit 4. This lower jaw part 151 has a recess 152 suitable for holding the bite part 203 of the bone. This recess 152 is provided with a rubber material and therefore has a high friction coefficient, to avoid the held bone from falling easily. Another upper jaw part 154 is equipped with a press part 153 made of also a rubber material, so that the bite part 203 of the bone can be pressed securely when the lower jaw part 151 placing the bone is closed. As shown in FIG. 35, the bite part 203 of the bone is set in the recess 152 and then the lower jaw part 151 is closed. The bone can be securely held by the press part 153 and the recess 152. As shown in FIG. 36, even if the bite part 203 is once positioned to a too upper portion of the lower jaw part 151, the bone does not easily fall down on the floor if the bone is shifted back and set in the recess 152.

Described next will be the bite detection algorithm used in the bite detection processing in step S49 in FIG. 28. The CPU 10 of the robot apparatus shown in FIG. 2 calculates the size and direction of the external torque acting on the joint of the mouth, from the PWM, mouth joint angular velocity, and angular acceleration. The CPU 10 determines that something is bitten when torque above a certain size is applied in the direction in which the bone is bitten. If it is determined that something is bitten, the CPU 10 loosens the gain to protect human fingers or the like from being injured. From the joint angle at this time, whether a bone or any other object is bitten is determined. If any other object is bitten, the gain is turned off to prevent occurrence of injuries. If it is determined that a bone is bitten, the gain is varied to a value suitable for keeping the bone bitten in order to protect the motor.

Figure 37:
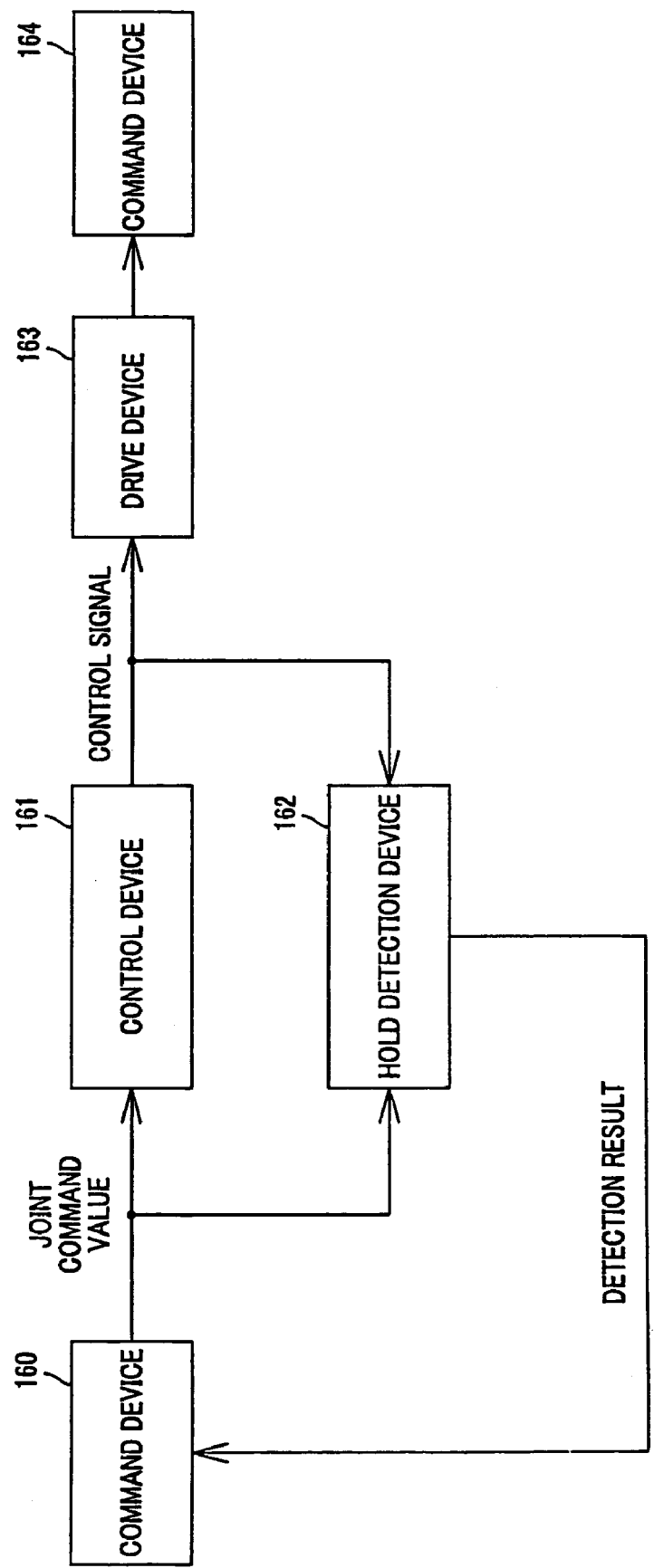
FIG. 37 is a block diagram of a bite detection/control unit.

Therefore, the robot apparatus 1 has a bite detection/control unit having a structure as shown in FIG. 37. This bite detection/control unit has a command device 160, a control device 161, and a hold detection device 162. This structure can be expressed as a function carried out when the CPU 10 performs the bite detection algorithm. A joint command value issued from the command device 160 is sent to the control device 161 and the hold detection device 162. Based on the detection result from the hold detection device 162, the command device 160 changes the joint command value.

The control device 161 provides control signals for a drive device 163 and the hold detection device 162 based on the joint command value. The drive device 163 generates drive force in accordance with the control signals, to drive the operation unit 164.

The hold detection device 162 sends a detection result to the command device 160 upon detection of something held by the mouth. The command device 160 generates a joint command value, based on the detection result, and sends the command value to the control device 161.

The control device 161 calculates the size and direction of external torque applied to the joint of the mouth, from the PWM duty ratio, mouth joint angular velocity, and angular acceleration. Further, the control device 161 determines that something is bitten when torque of a certain size or more is applied in the direction in which the bone is bitten. If the control device 161 determines that something is bitten, the control device 161 immediately sends a control signal for loosing the gain to the drive device 163. This is to protect human fingers and the like from being injured. From the joint angle at this time, the control device 161 determines whether a bone or any other object is bitten. If any other object is bitten, the gain is turned off in order to prevent occurrence of injuries. If it is determined that a bone is bitten, the gain is changed to a value suitable for keeping the bone held, in order to protect the motor.

Figure 38:
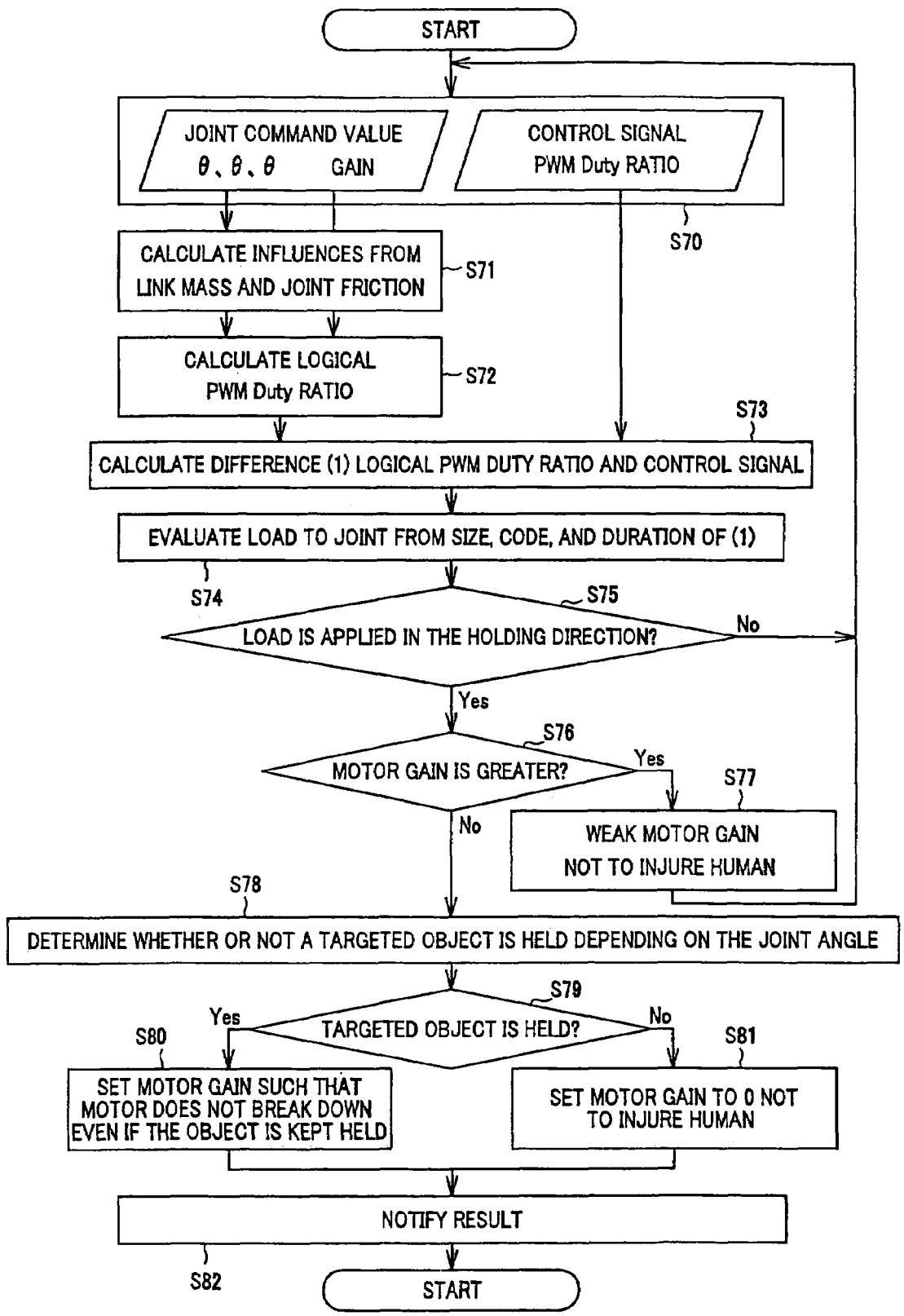
FIG. 38 is a flowchart showing a processing procedure of the bite detection/control unit.

FIG. 38 shows a procedure of the processing in the bite detection/control unit. The biting mechanism is the mouth structure shown in FIG. 32 to FIG. 36. That is, an object is held by rotating the lower jaw unit 151 in the direction to close toward the upper jaw unit 154. The joint defines the angle between the upper jaw unit 154 and the lower jaw unit 151. The motor generates the drive force to rotate the lower jaw unit 151.

At first, the control device 161 receives a joint command value and a PWM signal (duty ratio) (step S70). In step S71, influences from link mass and joint friction are calculated from the joint command value. Next, in step S72, a logical PWM duty ratio is calculated from a motor model. This calculation is carried out, based on the gain and the influences from the link mass and joint friction calculated in step S71.

The control device 161 calculates the difference between the logical PWM duty ratio and the control signal, in step S73. This calculation is carried out using the logical PWM duty ratio obtained in step S72 and the PWM signal (duty ratio) of the control signal which has been received in advance. In step S74, load to the joint is evaluated from the size, code, and duration time of the difference between the PWM signals which is obtained in step S73.

Next, in step S75, the control device 161 determines whether or not load is applied in the direction in which the object is bitten, based on the load evaluated by step S74. If load is applied in the direction in which the object is bitten, the procedure goes to step S76 and determines whether the motor gain of the drive device 163 is greater than a predetermined value or not. This predetermined value is a threshold value which is provided to prevent damages to human, generating such force that would not cause pain. If the motor gain is determined to be greater, the drive device 163 is supplied with a control signal for weakening the motor gain so that human might not be damaged, in step S77. Otherwise, if the motor gain is determined as not being greater, the procedure goes to step S78, and whether or not a targeted object or bone is held is determined from the joint angle between the upper jaw part 154 and the lower jaw part 151.

If it is determined in step S79 that the targeted object is held, the procedure goes to step S80, and the motor gain is set to such a value that would not damage the motor even after the object is held continuously. Otherwise, if it is not determined that the targeted object is held, the procedure goes to step S81, and the motor gain is set to zero so that human might not be damaged. Step S82 is informed of the result and the processing ends.

As has been described above, the robot apparatus 1 according to the present embodiment executes the image recognition processing program, the bone-bite detection program, and the bite detection program, thereby to recognize a special toy, go up to the place where the toy is placed, bite the toy, carry the toy held in the mouth, or roll holding the bone. It is thus possible to make richer and livelier actions.

Figure 39:
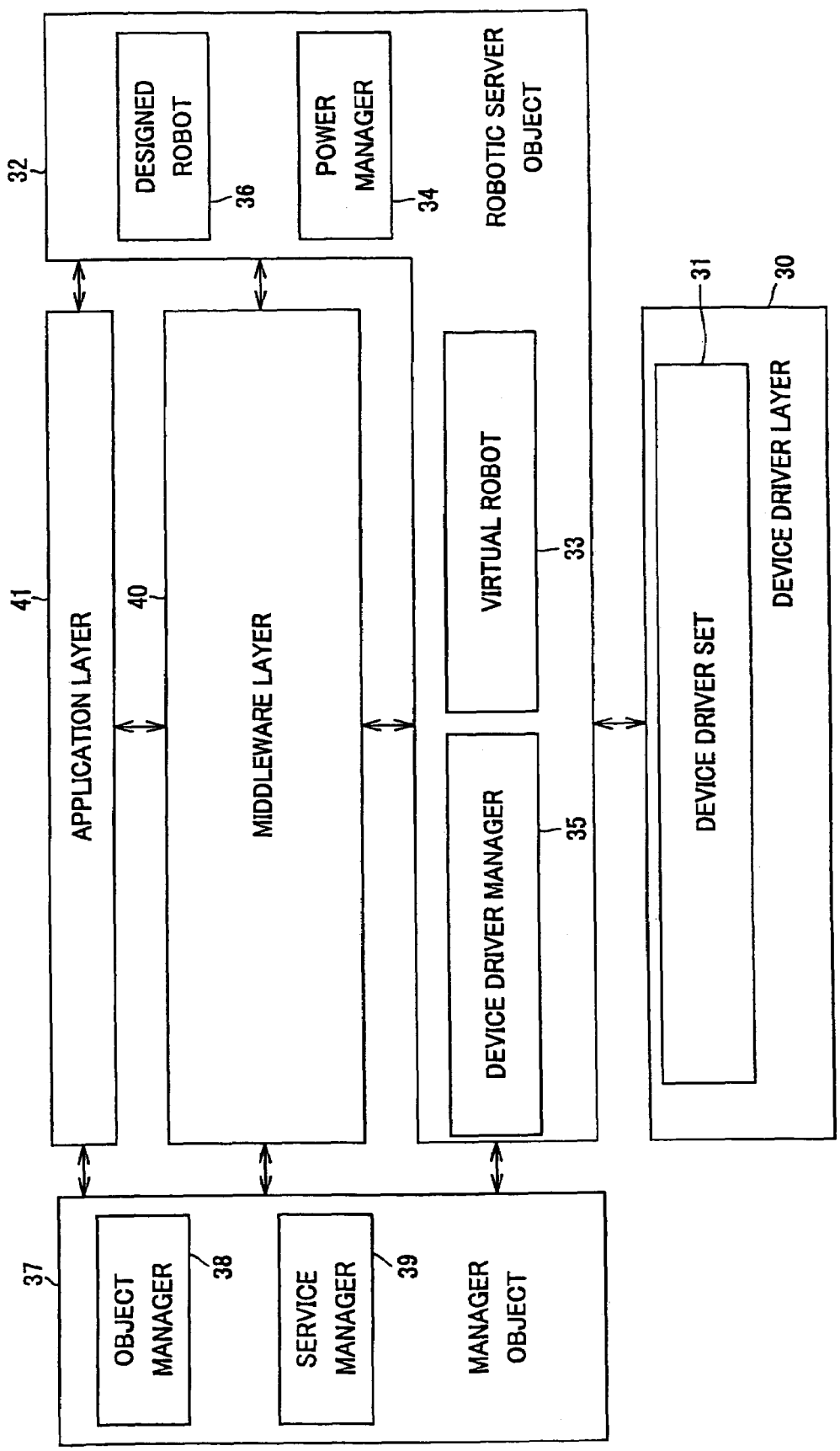
FIG. 39 is a block diagram showing the software configuration of the robot apparatus.

Next, the software configuration including the above programs to be executed by the robot apparatus 1 will be described. The software configuration in the robot apparatus 1 is as shown in FIG. 39. In FIG. 39, the device driver layer 30 is positioned in the lowermost layer of the programs, and is constituted by a device driver set 31 including plural device drivers. In this case, the device drivers are objects such as a CCD camera 20 (FIG. 1 and FIG. 2), a timer, and the like each of which is allowed to access directly hardware used in ordinary computers. The device drivers each executes processing in response to an interruption from corresponding hardware.

A robotic server object 32 is positioned above the device driver layer 30, and is constituted by a virtual robot 33 consisting of groups of software programs which provide interfaces to access hardware such as various sensors described above, actuators $25_1$ to $25_n$, and the like, a power manager 34 consisting of groups of software programs which manage switching of the power supply and the like, a device driver manager 35 consisting of groups of software programs which manage other various device drivers, and a designed robot 36 consisting of groups of software programs which manage the mechanism of the robot apparatus 1.

A manager object 37 is constituted by an object manager 38 and a service manager 39. The object manager 38 consists of groups of software programs which manage start-up and termination of software programs included in a robotic server object 32, a middleware layer 40, and an application layer 41. The service manager 39 consists of groups of software programs which manage connections of respective objects, based on connection information between the objects described in a connection file stored in the memory card 29 (FIG. 2).

The middleware layer 40 is positioned above the robotic server object 32 and is constituted by groups of software programs which provide basic functions such as an image processing or audio processing of the robot apparatus 1.

Also, the application layer 41 is positioned above the middleware layer 40 and is constituted by groups of software programs which decide the actions of the robot apparatus 1, based on processing results processed by the groups of the software programs constituting the middleware layer 40.

Figure 40:
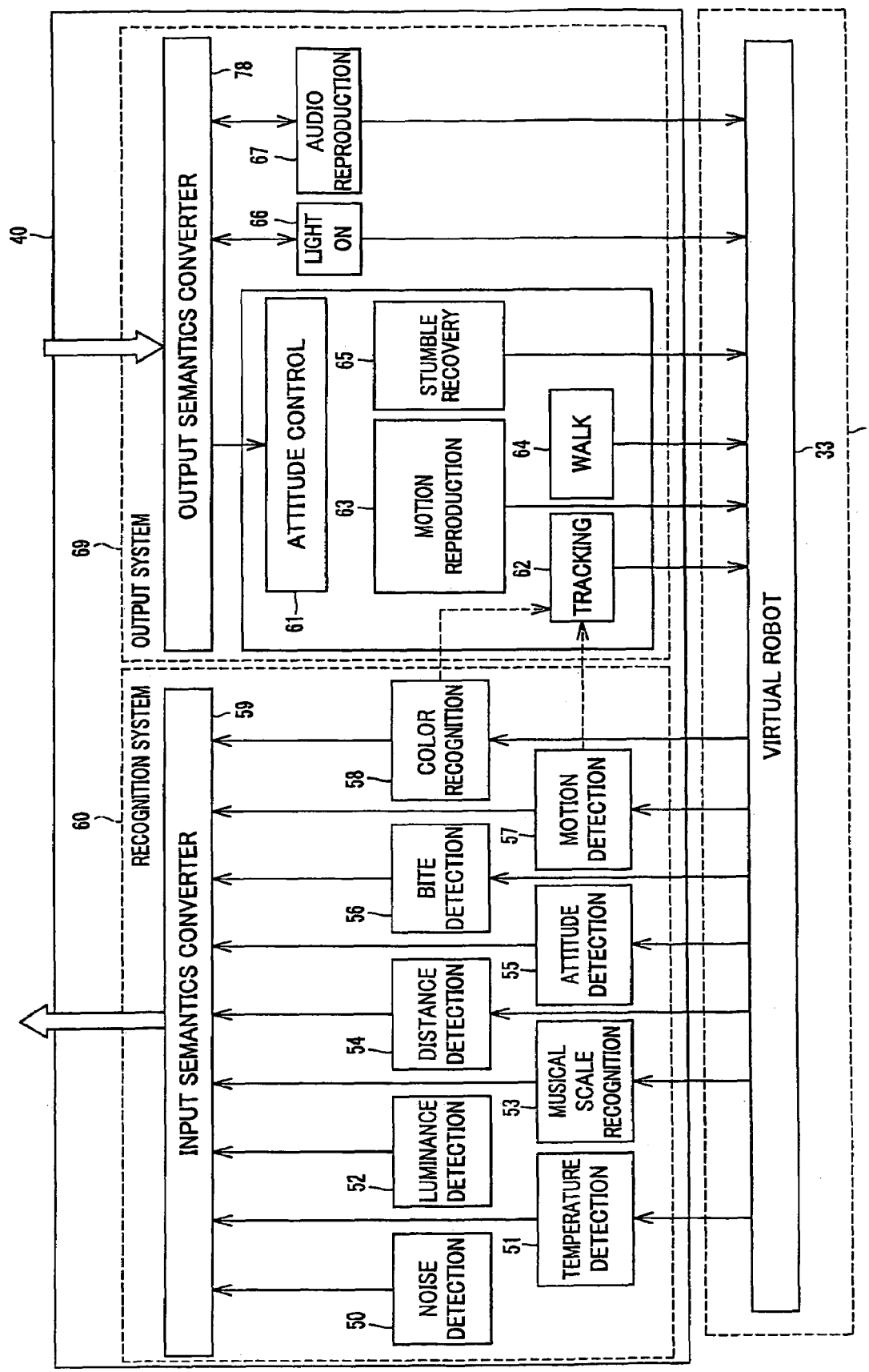
FIG. 40 is a block diagram showing the configuration of a middleware layer in the software configuration of the robot apparatus.
Figure 41:
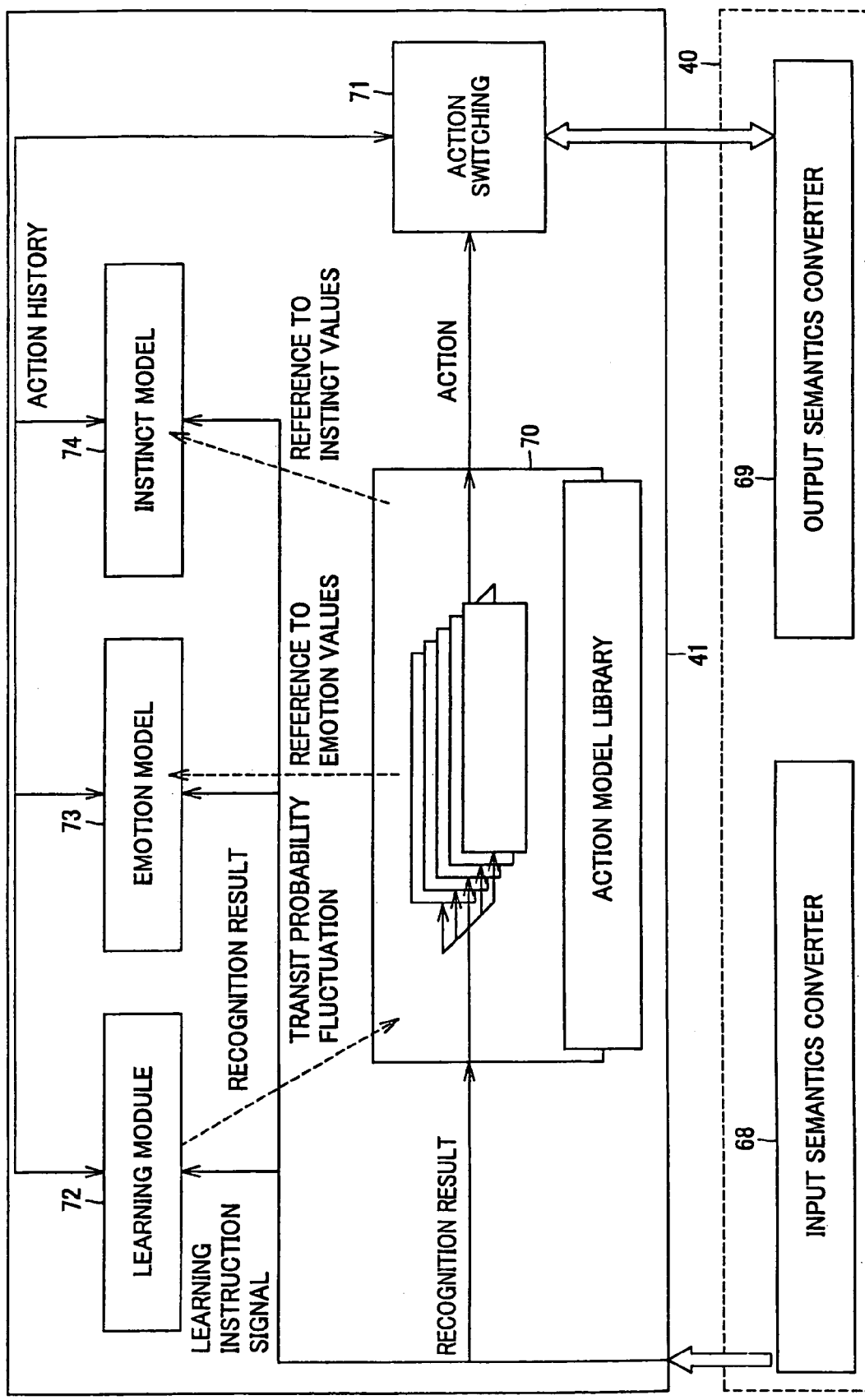
FIG. 41 is a block diagram showing the configuration of an application layer in the software configuration of the robot apparatus.

Specific software configurations of the middleware layer 40 and the application layer 41 are shown in FIG. 40 and FIG. 41, respectively.

As shown in FIG. 40, the middleware layer 40 is constituted by a recognition system 60 which includes signal processing modules 50 to 58 for noise detection, temperature detection, luminance detection, musical scale recognition, distance detection, attitude detection, bite detection, motion detection, and color recognition, and an input semantics converter module 59 and the like, and an output system 69 which includes an output semantics converter module 68, signal processing modules 61 to 67 for attitude control, tracking, motion reproduction, walking, stumble-recovery, light on, and audio reproduction, and the like.

The signal processing modules 50 to 58 in the recognition system 60 take in corresponding data among sensor data, image data, and audio data read from the DRAM 11 (FIG. 2) by the virtual robot 33 of the robotic server object 32. These modules then perform predetermined processings, based on the data taken in, and supply the processing results to the input semantics converter module 59. In this case, for example, the virtual robot 33 is constituted as a part which transmits/receives or converts signals, according to predetermined communication rules.

In particular, the bite detection module 56 loosens immediately the gain after it is determined that something is bitten, as described previously with reference to FIG. 37. This is to protect human fingers and the like from being injured. From the joint angles at this time, whether a bone or any other object is bitten is determined. If any other object is bitten, the gain is turned off to prevent occurrence of injuries. If it is determined that a bone is bitten, the gain is changed to a value suitable for keeping the bone held in the mouth in order to protect the motor.

The input semantics converter module 59 recognizes the conditions of the robot apparatus 1 itself and the environmental conditions (internal and external conditions), e.g., "noisy", "hot", "bright", "ball is detected", "stumble is detected", "rubbed", "hit", "a musical scale of "do", "mi", and "so" are heard", "a moving object is detected", "an obstacle is detected", "an object is bitten", or the like based on the processing results supplied from the signal processing modules 50 to 58, and also recognizes commands and actions from the user. The input semantics converter module 59 then outputs the recognition results to the application layer 41 (FIG. 40).

As shown in FIG. 41, the application layer 41 is constituted by five modules, i.e., an action model library 70, an action switching module 71, a learning module 72, an emotion model module 73, and an instinct model module 74.

Figure 42:
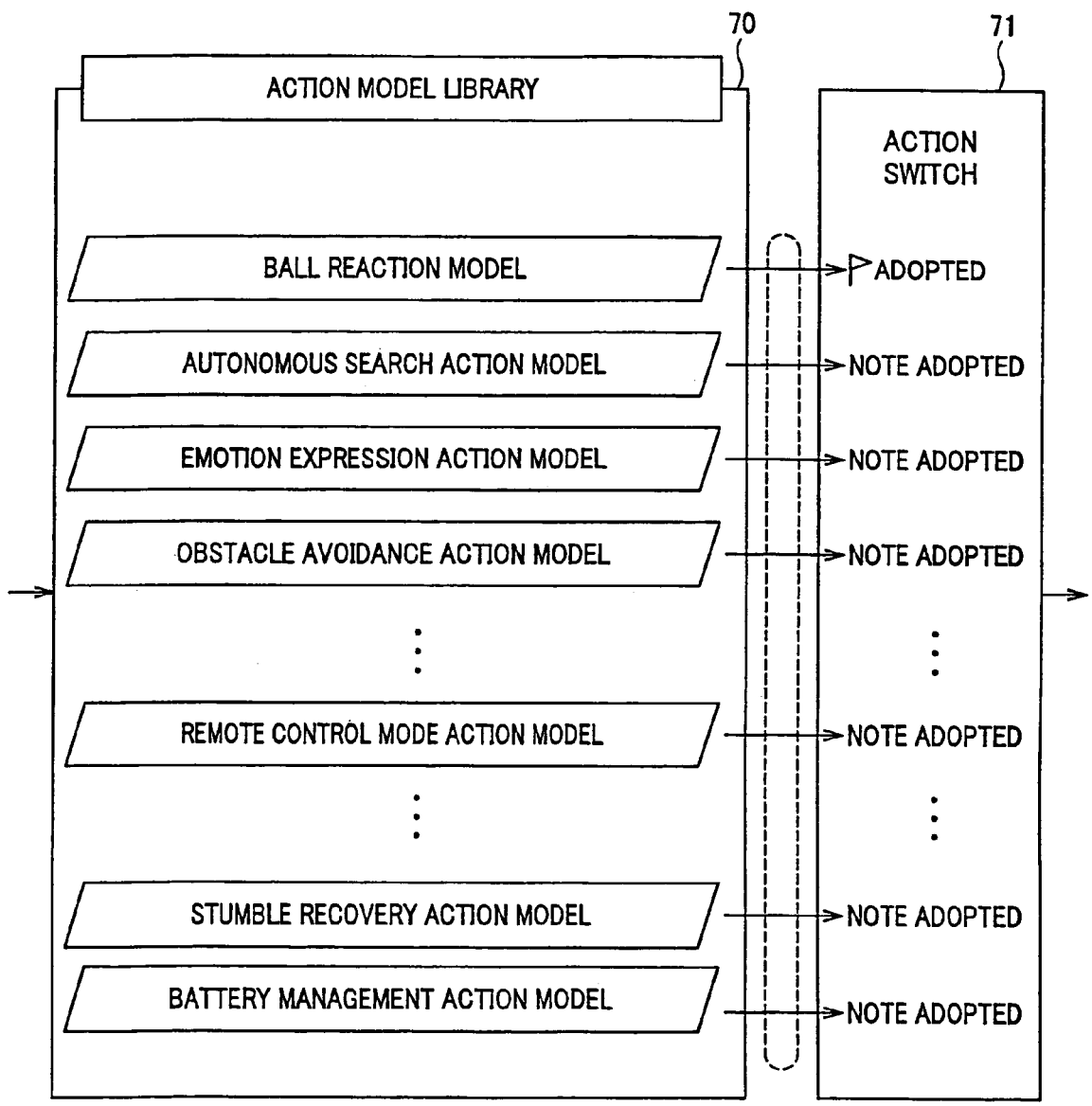
FIG. 42 is a block diagram showing the configuration of an action model library in the application layer in the software configuration of the robot apparatus.

As shown in FIG. 42, the action model library 70 is provided with respectively independent action models $70_1$ to $70_n$ in correspondence with several condition items selected in advance, such as cases of "small residual battery", "recovery from stumbling", "avoiding an obstacle", "expressing emotion", "having detected a ball", "biting a horizontally placed bone", "biting a vertically standing bone", "laying down a vertically standing bone by the head", and the like.

Further, when a recognition result is supplied from the input semantics converter module 59 or when a constant time period has passed since the last recognition result was supplied, the action models $70_1$ to $70_n$ each determines a subsequent action, if necessary, referring to the parameter value of a corresponding emotion held by the emotion model module 73 and the parameter value of a corresponding desire held in the instinct model module 74, as will be described later. The determination result is outputted to the action switching module 71.

Figure 43:
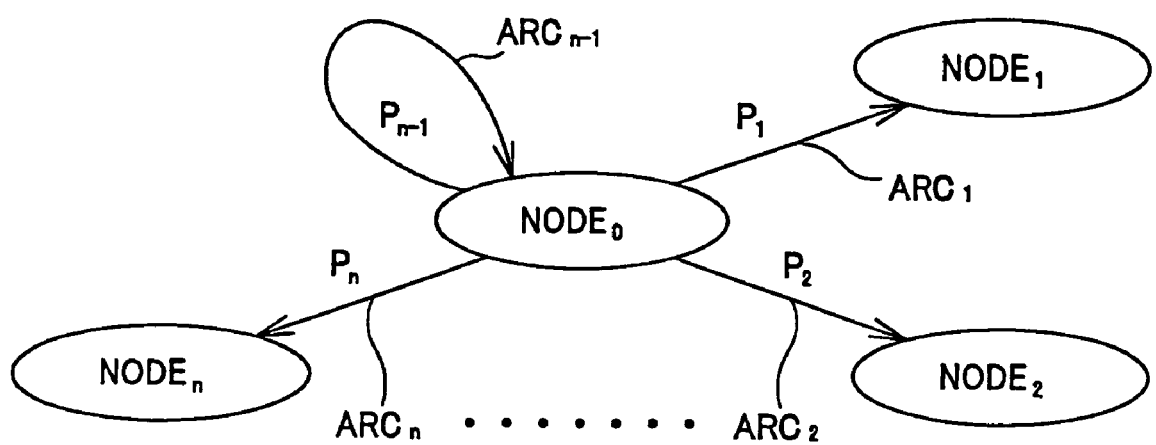
FIG. 43 is a view used for explaining definite probability automaton which is the information for determining actions of the robot apparatus.

In the case of this embodiment, each of the action models $70_1$ to $70_n$ uses algorithm called a definite probability automaton, as a method of determining a next action, in which how one of nodes $NODE_0$ to $NODE_n$ (states) as shown in FIG. 43 transits to any other one of these nodes is determined probabilistically based on transit probabilities $P_1$ to $P_n$ set for the arcs $ARC_1$ to $ARC_n$ connecting the nodes $NODE_0$ to $NODE_n$ between each other.

More specifically, the action models $70_1$ to $70_n$ are assigned to the nodes $NODE_0$ to $NODE_n$ forming their own action models $70_1$ to $70_n$, respectively. A state transit table 80 as shown in FIG. 44 is provided for every one of the $NODE_0$ to $NODE_n$.

In this state transit table 80, input events (recognition results) which are transit conditions at the $NODE_0$ to $NODE_n$ are cited in the columns of "input event name" in the priority order, and further conditions concerning the transit conditions are written in corresponding lines in the columns of "data name" and "data range".

Therefore, if a recognition result of "detection of a ball (BALL)" is given to the $NODE_{100}$ whose transit table 80 is shown in FIG. 44, transit to any other node needs to satisfy a condition that the "size of the ball (SIZE)" informed together with the recognition result is within the range of "0 to 1000". Alternatively, if a recognition result of "detection of an obstacle (OBSTACLE)" is given, transit to any other node needs to satisfy a condition that the "distance (DISTANCE)" to the obstacle is within the range of "0 to 100". Of course, if a recognition result of "detection of a bone", "detection of pink", and "detection of biting of an object" are given, transit to any other node needs to satisfy conditions that the "distance", "area", and "gain" given together with the recognition results are within predetermined ranges, respectively.

At the node $NODE_{100}$, even when no recognition result is inputted, transit to any other node can be allowed if any one of the parameter values of "joy (JOY)", "surprise (SURPRISE)", and "sadness (SADNESS)" held by the emotion model module 73 among the emotion and desire parameters held by the emotion model module 73 and the instinct model module 74 which are periodically referred by the action models $70_1$ to $70_n$, is within the range of "50 to 100".

In the state transit table 80, the names of nodes to which transit is possible from the nodes of any of $NODE_0$ to $NODE_n$ in the row of "it destination node" in the column of "transit probability to other nodes". The probabilities of transit to other nodes of $NODE_0$ to $NODE_n$ each of which are allowed to transit when all the conditions written in the corresponding columns of the "input event name", "data value" and "data range" are written in the corresponding portions in the column of the "transit probability to other nodes", respectively. The actions to be outputted when transiting to the other nodes of $NODE_0$ to $NODE_n$ are written in the row of the "output action" in the column of the "transit probability to other nodes", respectively. The sum of the probabilities of transit to the other nodes in each row in the column of the "transit probability to other nodes" is 100(%).

Therefore, if the "detection of a ball (BALL)" and the "size (SIZE)" of the ball is within the range of "0 to 1000" are given as recognition results, for example, at the node $NODE_{100}$ expressed in the state transit table 80 shown in FIG. 44, transit to the "NODE120 (node 120)" is possible with probability of "30(%)". At this time, the action of "ACTION 1" is outputted.

Each of the action models $70_1$ to $70_n$ is constructed by connecting several of the nodes $NODE_0$ to $NODE_n$ each written in form of a state transit table 80. When a recognition result is given from the input semantics converter module 59, each of the action models $70_1$ to $70_n$ determines a next action probabilistically, using the state transit table of the corresponding one of the nodes $NODE_0$ to $NODE_n$, and outputs the determination result to the action switching module 71.

The action switching module 71 shown in FIG. 42 selects an action having the predetermined highest priority among actions outputted from the action models $70_1$ to $70_n$ of the action model library 70, and outputs a command (hereinafter called an action command) indicative of duty of executing the action to the output semantics converter module 68 in the middleware layer 40. In the present embodiment, the priorities of the action models $70_1$ to $70_n$ are set to be higher in the order toward the bottom side of FIG. 42.

Based on action completion information supplied from the output semantics converter module 68, the action switching module 71 notifies the learning module 72, emotion model module 73, and instinct model module 74 of completion of a corresponding action.

Meanwhile, the learning module 72 inputs those instructive recognition results such as "hit", "rubbed", and the like that are received as actions from the user, among recognition results supplied from the input semantics converter module 59.

Based on a recognition result of this kind and the notification from the action switching module 71, the learning module 72 further lowers the occurrence probability of a corresponding action, for example, in case of being "hit (scolded)". Alternatively, in case of being "rubbed (praised)", the occurrence probability of the corresponding action is increased. The learning module 72 thus changes the corresponding transit probabilities of the action models $70_1$ to $70_n$ in the action model library 70.

On the other side, the emotion model module 73 maintains parameters expressing the strengths of emotions with respect to six types of emotions "joy", "sadness", "anger", "surprise", "disgust", and "fear". Further, the emotion model module 73 cyclically updates these emotional parameter values, based on specific recognition results such as "hit", "rubbed", and the like supplied from the input semantics converter module 59, elapsed time, notifications from the action switching module 71, and the like.

More specifically, where $\Delta E[t]$ is fluctuation of an emotion calculated by a predetermined calculation formula based on a recognition result supplied from the input semantics converter module 59, the action of the robot apparatus 1 just at this time point, and the elapsed time from the last update, $E[t]$ is the current parameter value of the emotion, and $K_e$ is a coefficient expressing the sensitivity of the emotion, the emotion model module 73 calculates the emotion parameter value $E[t+1]$ of the emotion in a next cycle by the following expression (2). This is substituted for the current emotion parameter value $E[t]$, to update the parameter value of the emotion. Also, the emotion model 73 updates all the emotion parameter values in a similar manner.

$$E[t+1]=E[t]+ke \times \Delta E[t] \qquad (2)$$

How much the recognition results and the notifications from the output semantics converter module 68 influence the fluctuations $\Delta E[t]$ of the parameter values of the emotions are predetermined. For example, a recognition result of being "hit" influences greatly the fluctuation $\Delta E[t]$ of the parameter value of the emotion "anger", and a recognition result of being "rubbed" influences greatly the fluctuation $\Delta E[t]$ of the parameter value of the emotion "joy".

The notifications from the output semantics converter module 68 are so-called feedback information (action completion information), i.e., information indicative of results of occurrence of actions. The emotion model module 73 changes the emotion, based on information of this kind. This means, for example, a decrease in the anger emotion level which is caused by the action of "barking". The notifications from the output semantics converter module 68 are inputted also to the learning module 72 described previously, and the leaning module 72 changes corresponding transit probabilities in the action models $70_1$ to $70_n$, based on the notifications.

Note that the feedback of an action result may be made depending on the output from the action switching module 71 (e.g., actions added with emotions).

On the other side, the instinct model module 74 maintains parameters respectively expressing the strengths of four desires for "exercise", "affection", "appetite", and "curiosity" which are independent from each other. The instinct model module 74 cyclically updates these desire parameters, based on the recognition results supplied from the input semantics converter module 59, elapsed time, the notifications from the action switching module 71, and the like.

More specifically, as for "exercise", "affection" and "curiosity", where ΔI[k] is fluctuation of a desire at a time point which is calculated by a predetermined operation formula on the basis of a recognition result, elapsed time, and a notification from the output semantics converter module 68, I[k] is the current parameter value of the desire, and ki is a coefficient expressing the sensitivity of the desire, the instinct model module 74 calculates the parameter value I[k+1] of the desires "exercise", "affection", and "curiosity" in the next cycle, with use of the following expression (3) in a predetermined cycle, and substitutes the calculation result for the current parameter value I[k] of the desire, thereby to update the parameter value of the desire. Also, the instinct model module 74 updates the parameter value of each desire except the desire "appetite", in a similar manner.

$$I[k+1]=I[k]+ki \times \Delta I[k] \quad (3)$$

How much the recognition results and the notifications from the output semantics converter module 68 influence the fluctuations ΔI[k] of the parameter values of the desires are predetermined. For example, a notification from the output semantics converter module 68 influences greatly the fluctuation ΔI[k] of the parameter value of "fatigue".

In the robot apparatus 1, the parameter values of the emotions and desires (instincts) are each regulated to fluctuate within the range of 0 to 100. The values of the coefficients ke and ki are set for every emotion and instinct.

On the other side, as shown in FIG. 40, the output semantics converter module 68 in the middleware layer 40 supplies a corresponding one of the signal processing modules 61 to 67 of the output system 69 with an abstract action command such as "go forward", "joy", "yelp", "tracking (a ball)", or the like which is supplied from the action switching module 71 in the application layer 41 as described previously.

Further, when an action command is supplied, these signal processing modules 61 to 67 generate servo command values to be supplied to corresponding actuators $25_1$ to $25_n$ necessary to make the action, audio data of a sound to be outputted from the loudspeaker 24 (FIG. 2), and drive data to be supplied to the LEDs of the "eyes" and based on the action command supplied. The modules 61 to 67 send orderly these data items to corresponding actuators $25_1$ to $25_n$, the loudspeaker 24, or the LEDs, sequentially through the virtual robot 33 of the robotic server object 32 and the signal processing circuit 14 (FIG. 2).

The image recognition processing, control processing, and bite detection processing used in the present invention are constructed by the middleware layer 40, application layer 41, and virtual robot 33 described above.

The signal processing modules 50 to 58 for noise detection, temperature detection, luminance detection, musical scale detection, distance detection, attitude detection, bite detection, motion detection, and color recognition in the recognition system 60 in the middleware layer 40 supply processing results to the input semantics converter module 59.

The input semantics converter module 59 recognizes the conditions of the robot apparatus itself and the environmental conditions (internal and external conditions) such as "noisy", "hot", "bright", "ball is detected", "stumble is detected", "rubbed", "hit", "a musical scale of 'do'", "'mi'", and "'so' is heard", "a moving object is detected", "an obstacle is detected", "an object is bitten", or the like, and commands and actions from the user, based on the processing results supplied from these signal processing modules 50 to 58. The input semantics converter module 59 then outputs the recognition results to the application layer 41 (FIG. 40).

The five modules in the application layer 41, i.e., the action model library 70, action switching module 71, leaning module 72, emotion model module 73, and instinct model module 74 correspond to the action selection unit 101 in the action control system 100.

In particular, when a recognition result is supplied from the input semantics converter module 59, if necessary, the action model library 70 determines a next action, referring to the parameter value of a corresponding emotion held in the emotion model module 73, and the parameter value of a corresponding desire held in the instinct model module 74. The action model library 70 then outputs the determination result to the action switching module 71. More specifically, for example, when a recognition result is supplied from the input semantics converter module 59, the action models $70_1$ to $70_n$ probabilistically determine a next action, with use of the state transit tables of corresponding ones of $NODE_0$ to $NODE_n$. The action models $70_1$ to $70_n$ then output the determination result to the action switching module 71.

For example, after a bone is recognized by the image recognition processing described previously, the robot apparatus 1 walks up to the place where the bone is placed. At this time, the robot apparatus expresses the feel of joy or changes the walking speed. Alternatively, after the robot apparatus bites a bone on the basis of the bone-bite control algorithm and the bite detection algorithm which have been described previously, an action of rolling over, holding up its hands (in the form of BANZAI), or touching the bitten bone with legs is determined, as shown in FIG. 31A to FIG. 31D.

The invention claimed is:

1. A robot apparatus which autonomously makes actions, based on external environment, comprising:
   image pick-up means for picking up an image of an object in the external environment;
   calculation means for calculating a circularity of a label included in image data based on the image picked up by the image pickup means; and
   distinguish means for distinguishing a characteristic part of the object, depending on the circularity calculated by the calculation means, wherein
   when the object is a bone-shaped toy having a rod-like bite part to be bitten and held by a mouth part formed in a head unit of the robot apparatus, and two side parts each formed in a substantially triangular shape and both formed respectively at two ends of the toy with the bite part interposed between the two side parts, circularities of labels based on a color applied to predetermined areas of the bite part and the two side parts are calculated by the calculation means, and the distinguish means distinguishes the bite part and the side parts from each other, based on the circularities, wherein
a circularity in the range of 0.55 through 0.6 indicates one of the two ends of the toy and a circularity in the range of 0.15 through 0.5 indicates the rod-like bite part of the bone.

* * * * *